United States Patent
Wanke et al.

(10) Patent No.: US 11,285,372 B2
(45) Date of Patent: Mar. 29, 2022

(54) SYSTEMS, DEVICES, AND METHODS EMPLOYING THE SAME FOR ENHANCING AUDIENCE ENGAGEMENT IN A COMPETITION OR PERFORMANCE

(71) Applicants: Todd Wanke, Palos Verdes Estates, CA (US); James Scott Nolan, Del Mar, CA (US)

(72) Inventors: Todd Wanke, Palos Verdes Estates, CA (US); James Scott Nolan, Del Mar, CA (US)

(*) Notice: Subject to any disclaimer, the term of this patent is extended or adjusted under 35 U.S.C. 154(b) by 0 days.

(21) Appl. No.: 16/812,216

(22) Filed: Mar. 6, 2020

(65) Prior Publication Data
US 2021/0060404 A1     Mar. 4, 2021

Related U.S. Application Data

(63) Continuation-in-part of application No. 16/533,640, filed on Aug. 6, 2019, which is a continuation of
(Continued)

(51) Int. Cl.
*A63B 71/06*     (2006.01)
*A63F 13/798*     (2014.01)
(Continued)

(52) U.S. Cl.
CPC .......... *A63B 71/06* (2013.01); *A63B 24/0062* (2013.01); *A63F 13/798* (2014.09);
(Continued)

(58) Field of Classification Search
None
See application file for complete search history.

(56) References Cited

U.S. PATENT DOCUMENTS 7,587,214 B2    9/2009   Inselberg
8,442,424 B2    5/2013   Socolof
(Continued)

FOREIGN PATENT DOCUMENTS

EP        2916273 A1    9/2015
WO    2017130039 A1    8/2017

OTHER PUBLICATIONS

Chiuo Aachen, Aachen 2015, https://itunes.apple.com/us/app/aachen-2015/id1014414655?mt=8, retrieved Jan. 18, 2019, 4 pages.
(Continued)

*Primary Examiner* — Jason T Yen
(74) *Attorney, Agent, or Firm* — James Scott Nolan

(57) ABSTRACT

This document presents devices, systems, and their methods of use for content generation, engagement, and distribution by which a user can interact with collected content in a variety of different manners. Generally, a content engagement platform is provided, where the platform may be implemented on one or more computing devices, such as one or more of: a remote server, a desktop computer, a tablet computer, a handheld mobile computing device, for instance, a mobile phone or personal digital assistant, a smart accessory, such as a watch or eyeglasses, and the like. The platform allows a user to annotate and distribute video content.

30 Claims, 34 Drawing Sheets

Related U.S. Application Data application No. 16/425,831, filed on May 29, 2019, now Pat. No. 10,653,934, which is a continuation of application No. 16/115,559, filed on Aug. 29, 2018, now Pat. No. 10,322,330.

(60) Provisional application No. 62/829,345, filed on Apr. 4, 2019, provisional application No. 62/814,832, filed on Mar. 6, 2019, provisional application No. 62/667,505, filed on May 5, 2018, provisional application No. 62/620,452, filed on Jan. 22, 2018, provisional application No. 62/567,362, filed on Oct. 3, 2017.

(51) Int. Cl.

| | | |
|---|---|---|
| *A63F 13/87* | (2014.01) | |
| *A63F 13/828* | (2014.01) | |
| *A63F 13/86* | (2014.01) | |
| *A63B 24/00* | (2006.01) | |
| *G06K 9/00* | (2022.01) | |
| *H04W 4/21* | (2018.01) | |
| *G06Q 30/02* | (2012.01) | |
| *G06Q 50/00* | (2012.01) | |
| *G07C 13/00* | (2006.01) | |
| *H04L 51/52* | (2022.01) | |
| *H04L 67/306* | (2022.01) | |
| *H04L 67/131* | (2022.01) | |
| *H04N 21/475* | (2011.01) | |
| *H04W 12/00* | (2021.01) | |
| *H04L 67/50* | (2022.01) | |
| *H04W 4/02* | (2018.01) | |

(52) U.S. Cl.
CPC ............ *A63F 13/828* (2014.09); *A63F 13/86* (2014.09); *A63F 13/87* (2014.09); *G06K 9/00751* (2013.01); *G06Q 30/0203* (2013.01); *G06Q 30/0245* (2013.01); *G06Q 30/0252* (2013.01); *G06Q 50/01* (2013.01); *G07C 13/00* (2013.01); *H04L 51/32* (2013.01); *H04L 67/22* (2013.01); *H04L 67/306* (2013.01); *H04L 67/38* (2013.01); *H04N 21/4758* (2013.01); *H04W 4/21* (2018.02); *H04W 12/00* (2013.01); *A63B 2024/0025* (2013.01); *A63B 2024/0056* (2013.01); *A63F 2300/558* (2013.01); *A63F 2300/8023* (2013.01); *G06K 2209/27* (2013.01); *G06Q 2230/00* (2013.01); *G06T 2207/30221* (2013.01); *H04W 4/02* (2013.01)

(56) References Cited

U.S. PATENT DOCUMENTS

| | | | |
|---|---|---|---|
| 8,678,899 | B2 | 3/2014 | Hu |
| 9,009,194 | B2 | 4/2015 | Lang et al. |
| 9,033,781 | B2 | 5/2015 | Steir et al. |
| 9,044,183 | B1 | 6/2015 | Karam |
| 9,066,144 | B2 | 6/2015 | Yerli |
| 9,165,073 | B2 | 10/2015 | Kiraz et al. |
| 9,462,030 | B2 | 10/2016 | Lueth et al. |
| 9,751,018 | B2 | 9/2017 | Colony et al. |
| 10,220,290 | B1 * | 3/2019 | Podolosky ............. G06Q 50/34 |
| 2002/0165630 | A1 | 11/2002 | Arthur et al. |
| 2004/0171381 | A1 | 9/2004 | Inselberg |
| 2007/0018952 | A1 | 1/2007 | Arseneau et al. |
| 2008/0126197 | A1 * | 5/2008 | Savage ................. G06Q 50/01 705/319 |
| 2008/0154625 | A1 | 6/2008 | Serbanescu |
| 2008/0242271 | A1 | 10/2008 | Schmidt et al. |
| 2008/0311996 | A1 * | 12/2008 | Belton ............... H04N 21/4758 463/42 |
| 2012/0022918 | A1 | 1/2012 | Ross |
| 2012/0126973 | A1 | 5/2012 | DeAngelis et al. |
| 2012/0179557 | A1 | 7/2012 | Gross |
| 2013/0185802 | A1 | 7/2013 | Tibeica et al. |
| 2013/0203499 | A1 | 8/2013 | Oh |
| 2014/0004959 | A1 | 1/2014 | Kahrs et al. |
| 2014/0089960 | A1 * | 3/2014 | Farah ..................... H04H 60/33 725/24 |
| 2014/0100007 | A1 | 4/2014 | Kelly |
| 2014/0156752 | A1 | 6/2014 | Fetyko |
| 2014/0164075 | A1 | 6/2014 | Trujillo |
| 2014/0164954 | A1 | 6/2014 | Romanowski |
| 2014/0278834 | A1 | 9/2014 | Lautz et al. |
| 2014/0364981 | A1 | 12/2014 | Hofstetter et al. |
| 2014/0365573 | A1 | 12/2014 | Gass et al. |
| 2015/0165320 | A1 * | 6/2015 | Perlman ........... H04N 21/23805 463/31 |
| 2015/0251095 | A1 * | 9/2015 | Perrin ..................... G06F 9/452 463/31 |
| 2015/0302850 | A1 | 10/2015 | Lebrun |
| 2015/0334529 | A1 * | 11/2015 | Jain .......................... H04W 4/20 455/456.6 |
| 2015/0350733 | A1 | 12/2015 | Persidis |
| 2016/0004724 | A1 | 1/2016 | Har-Noy et al. |
| 2016/0105782 | A1 | 4/2016 | Barbulescu et al. |
| 2016/0171514 | A1 | 6/2016 | Frank et al. |
| 2016/0180282 | A1 | 6/2016 | Basalamah et al. |
| 2016/0224565 | A1 | 8/2016 | Hardas et al. |
| 2016/0234556 | A1 * | 8/2016 | Berridge ............ H04N 21/4758 |
| 2016/0287987 | A1 * | 10/2016 | Onda ...................... A63F 13/86 |
| 2016/0381306 | A1 | 12/2016 | Yang et al. |
| 2017/0025152 | A1 | 1/2017 | Jaime et al. |
| 2017/0087468 | A1 | 3/2017 | Jayaraman |
| 2017/0147277 | A1 * | 5/2017 | Carney ................. G06F 3/1462 |
| 2017/0223415 | A1 | 8/2017 | Jeon |
| 2017/0282077 | A1 * | 10/2017 | De La Cruz .......... A63F 13/537 |
| 2018/0004966 | A1 | 1/2018 | Chan et al. |
| 2018/0345149 | A1 * | 12/2018 | Farudi ................ A63B 71/0622 |
| 2019/0371273 | A1 * | 12/2019 | Benedetto ............... A63F 13/52 |

OTHER PUBLICATIONS

CrowdScores Ltd, CrowdScores—Live Scores, https://itunes.apple.com/app/apple-store/id773137002?mt=8, retrieved from Web Jan. 18, 2019, 3 pages.

Daley et al. "System for audience participation in event scoring at the 2004 Olympic Gams." In: CHI'04 Extended Abstracts on Human Factors in Computing Systems. Apr. 29, 2004 (Apr. 29, 2004) Retrieved from entire document.

Fastest Live Scores; FastestLiveScores, https://fastestlivescores.com/about-fastest-live-scores/, retrieved Jan. 18, 2019, 3 pages.

Hippo data GmbH; WIHS 2015 Audience Judge—WIHS Equitation Finals, https://appadvice.com/app/wihs-2015-audience-judge-wihs-equitation-finals/1044336809, retrieved Jan. 18, 2019, 4 pages.

ISA/US, International Search Report and Written Opinion for PCT/US18/048415, dated Nov. 1, 2018, 24 pages.

Ribeiro, et al, Crowdmos: An Approach For Crowdsourcing Mean Opinion Score Studies, University de Sao Paulo, Brazil and Microsoft Research, Redmond, WA, 4 pages.

Scorestream, Inc., Scorestream, https://scorestream.com/about, retrieved from Web Jan. 18, 2019, 5 pages.

Tokbox, Datasheet: Interactive Broadcast API, https://tokbox.com/interactive-broadcast, retrieved Jan. 19, 2019, 4 pages.

* cited by examiner

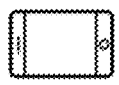
Device Identity
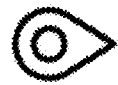
Users Location
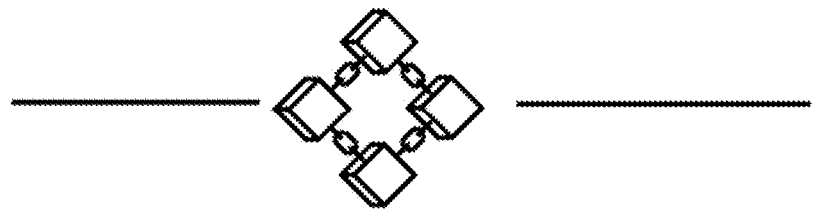
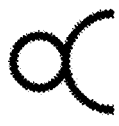
Users Identity
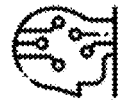
Artificial Intelligence
FIG. 2

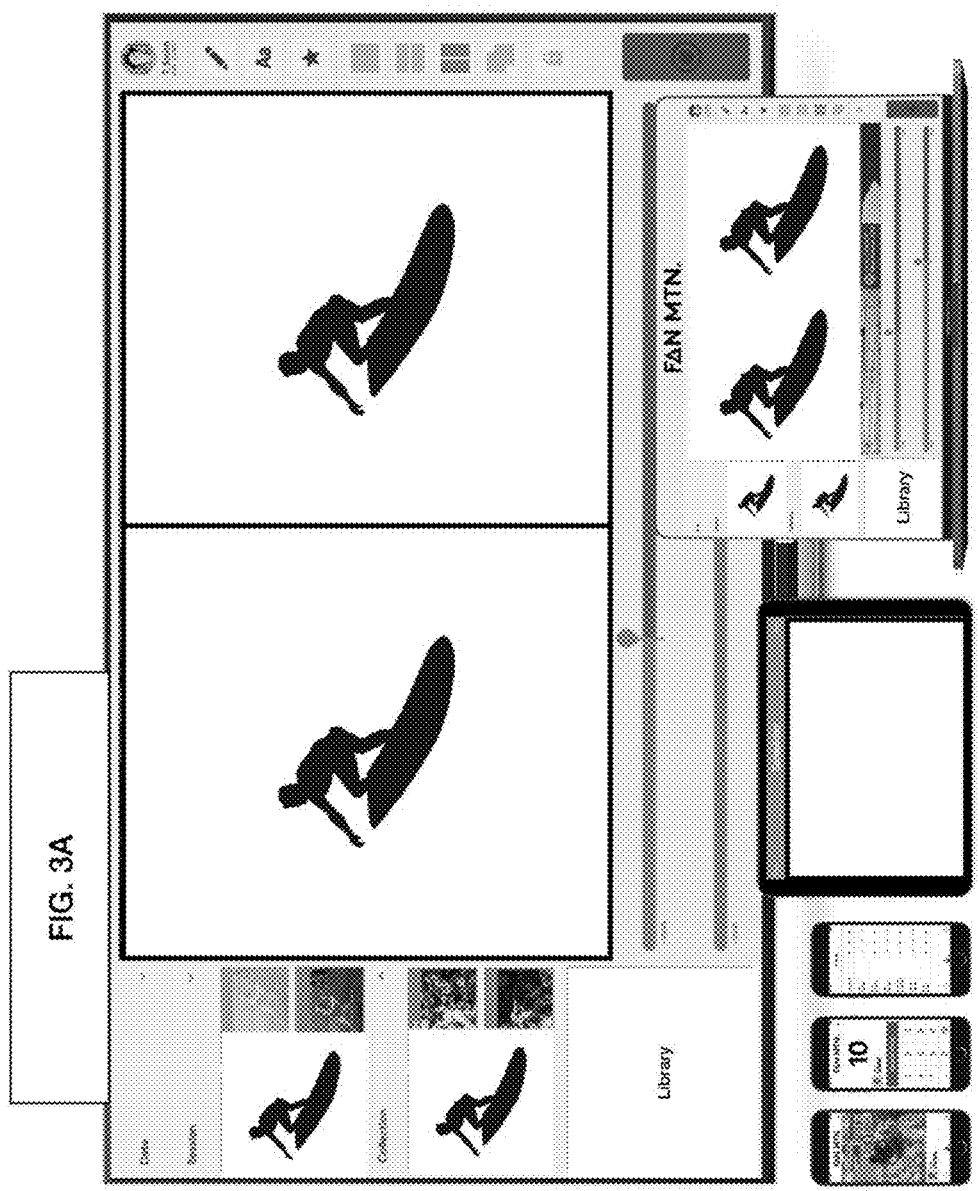
FIG. 3A
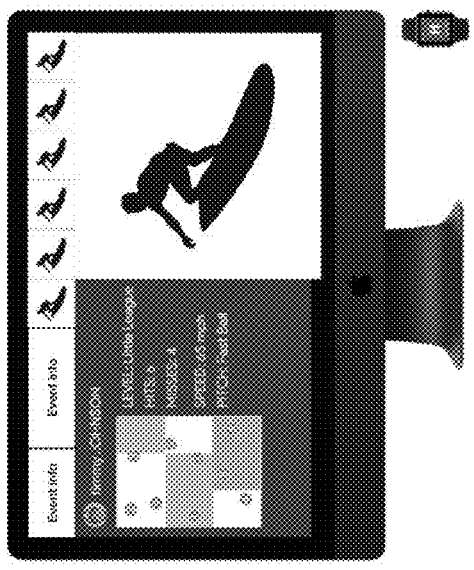

FIG. 4
Wearables
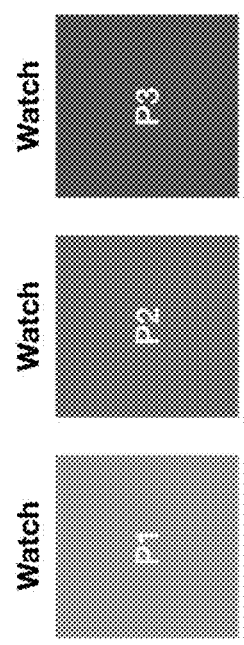

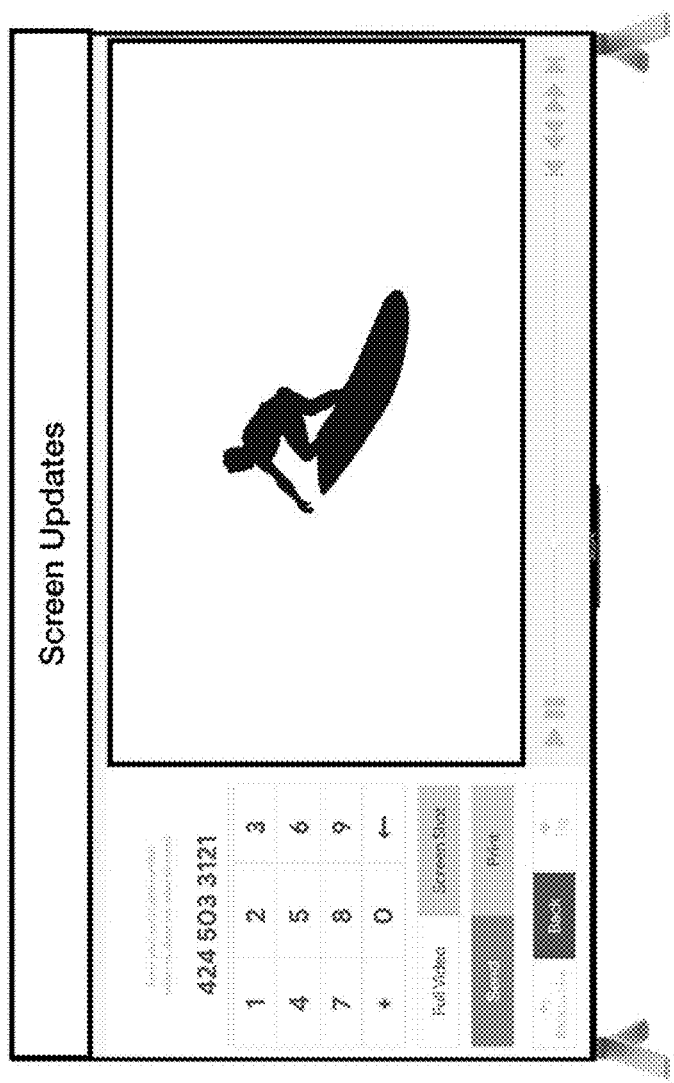
FIGS 5A / 5B

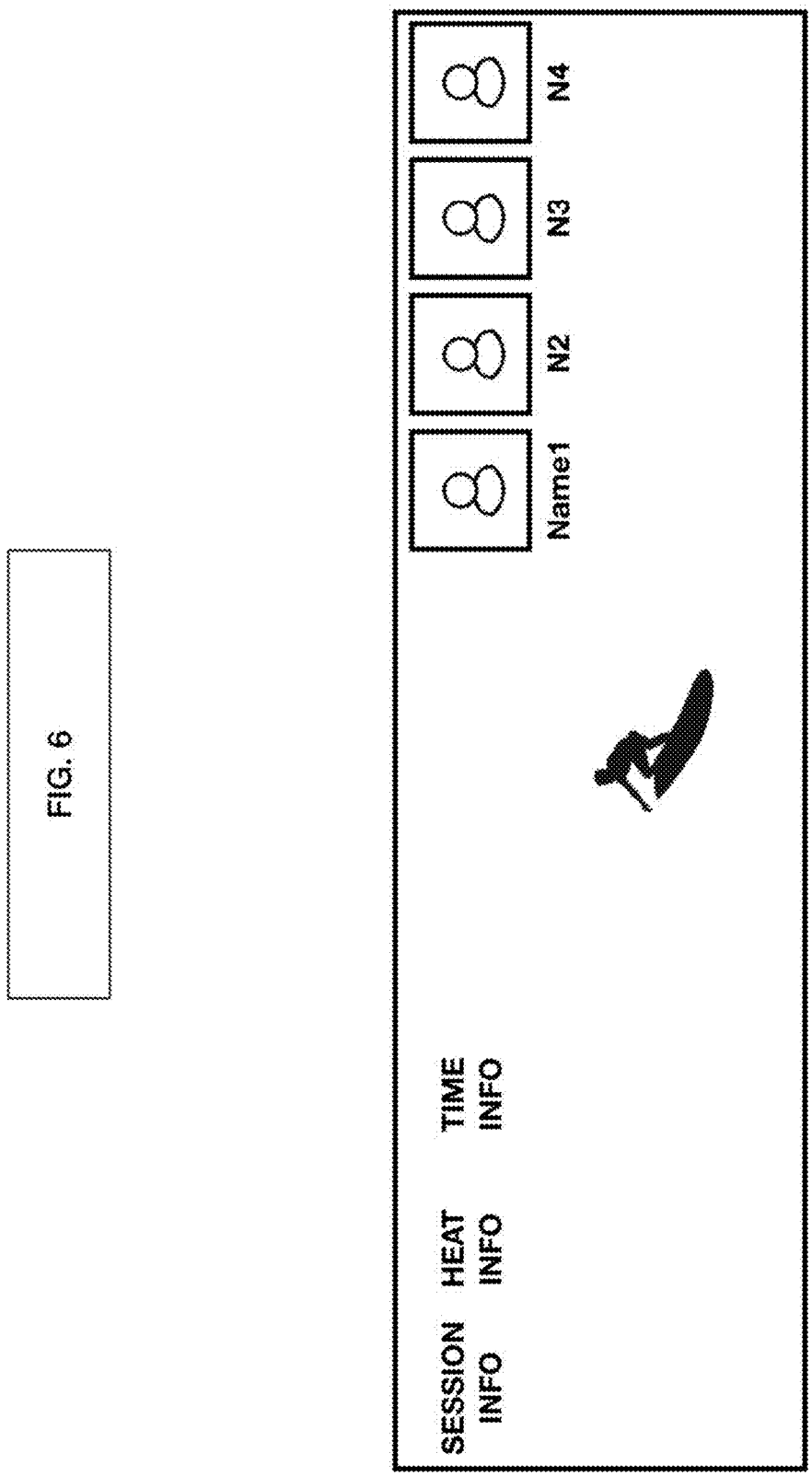

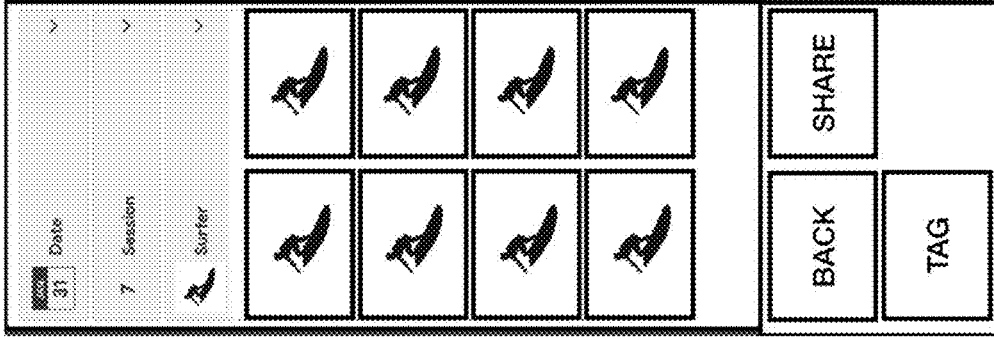
FIG. 8A

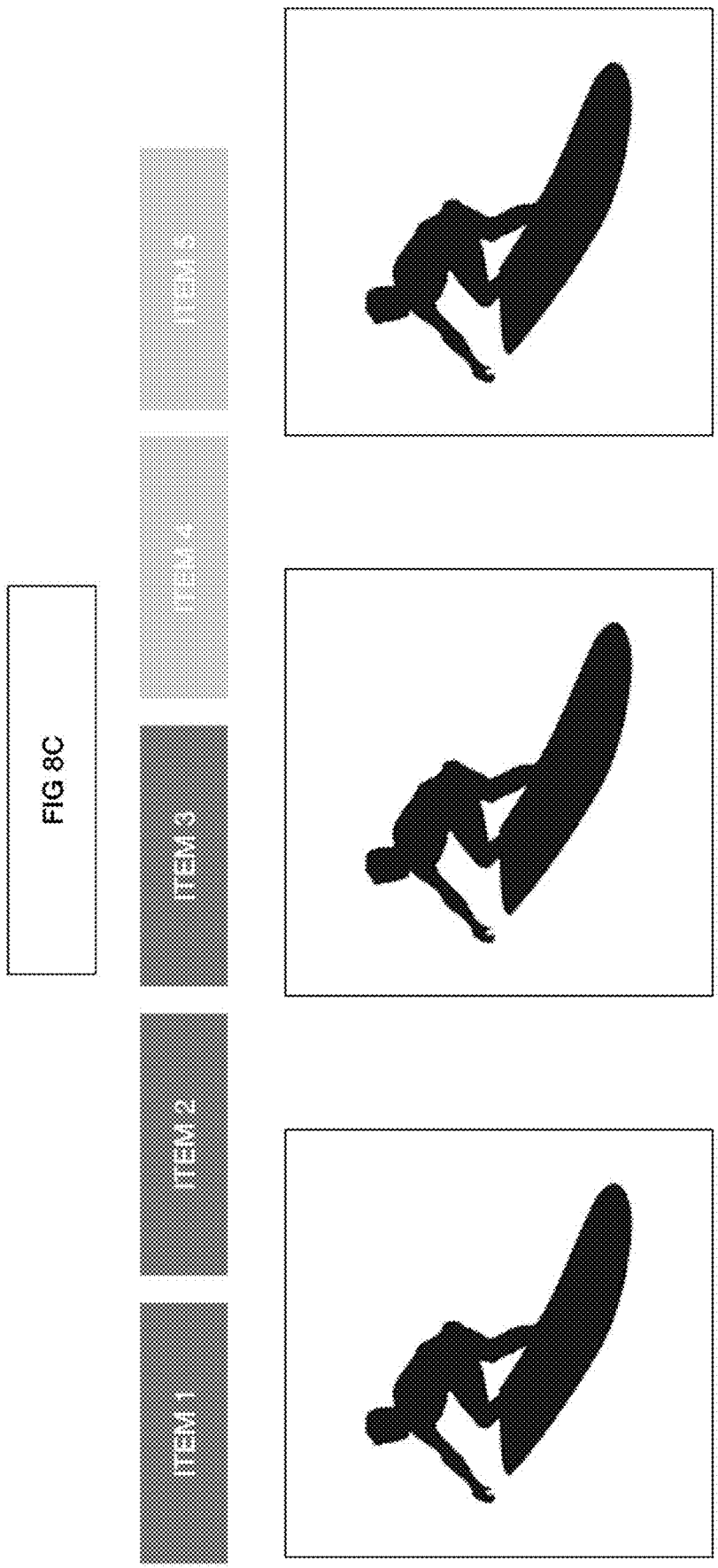

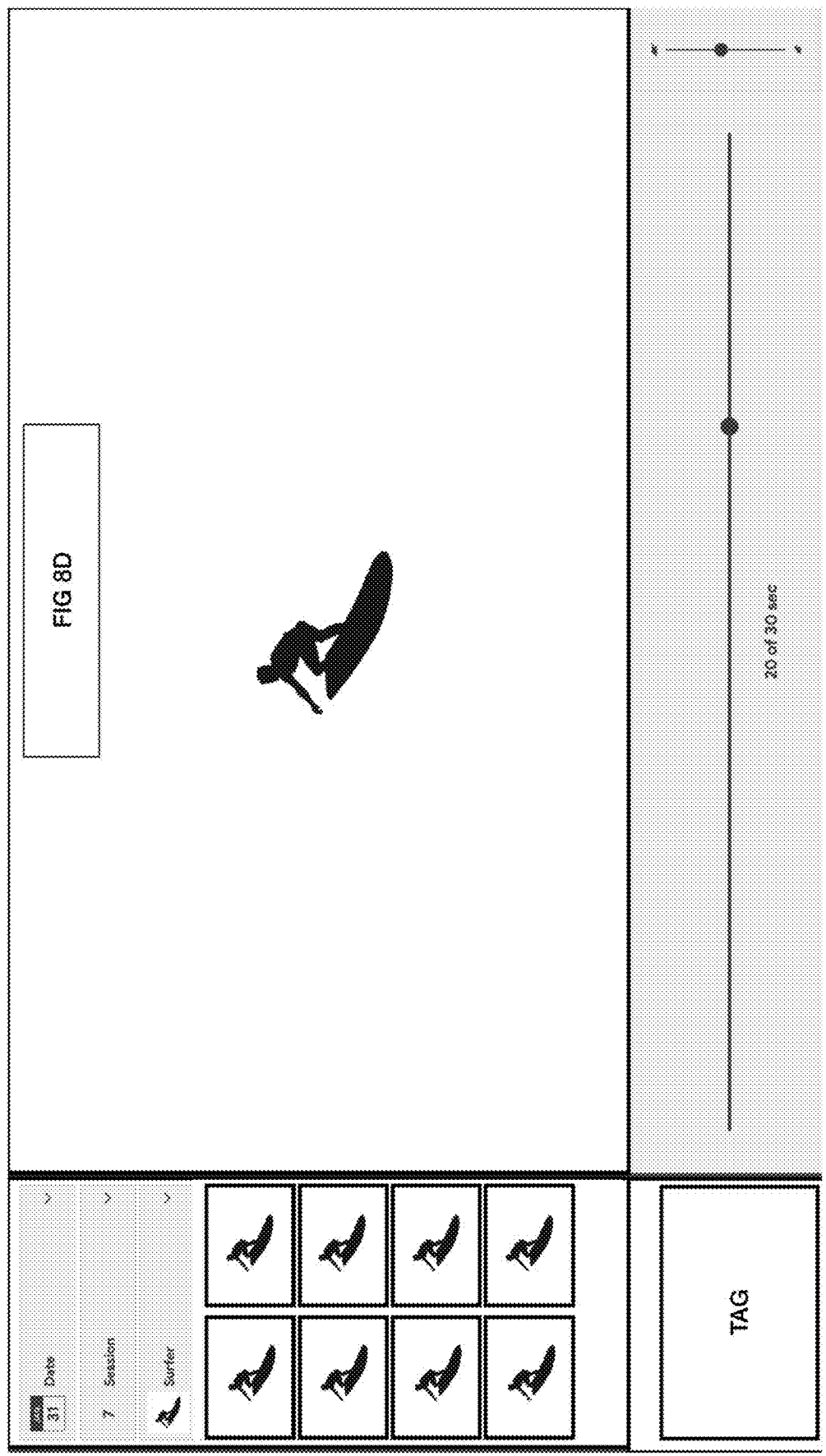

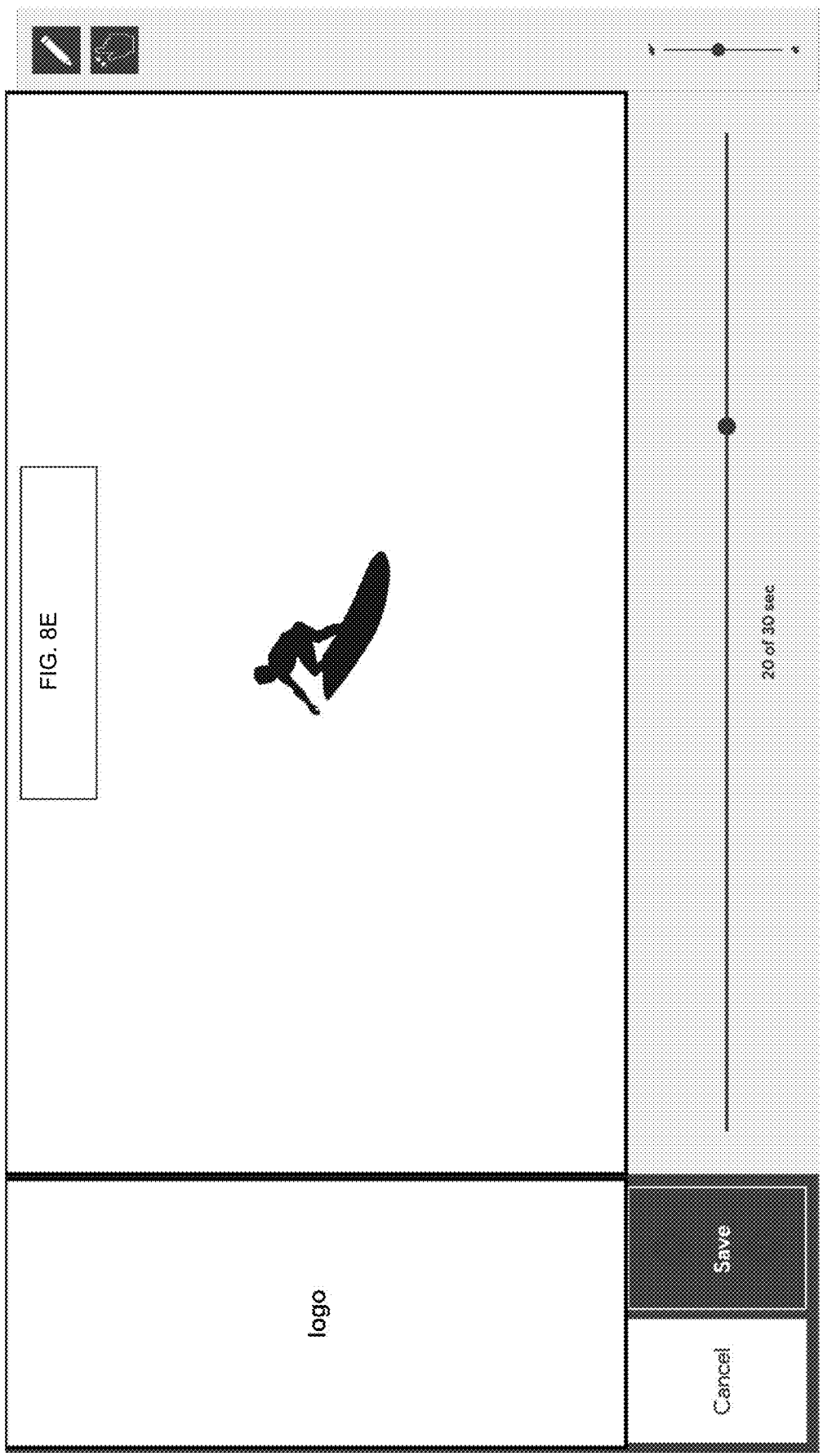

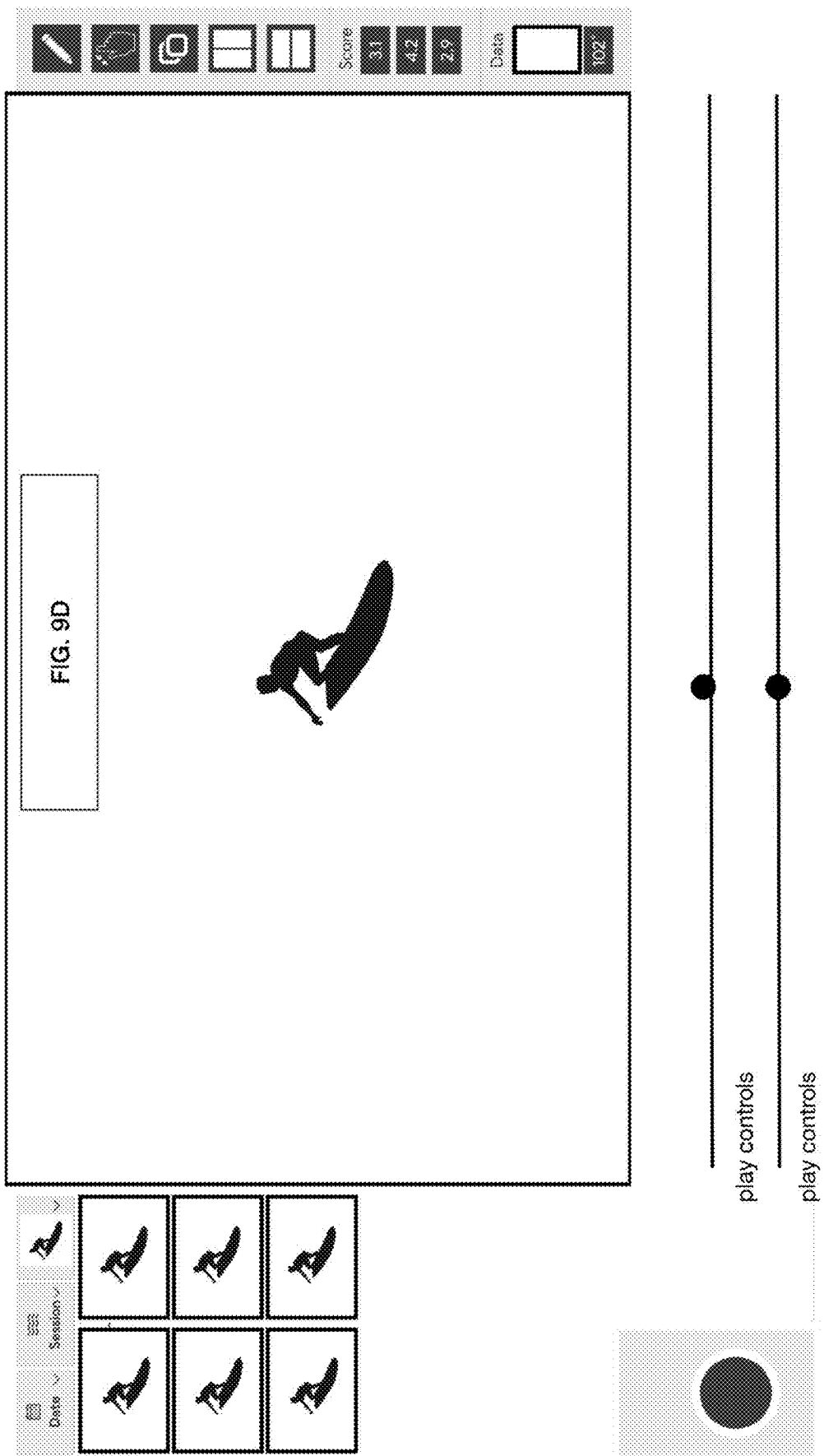

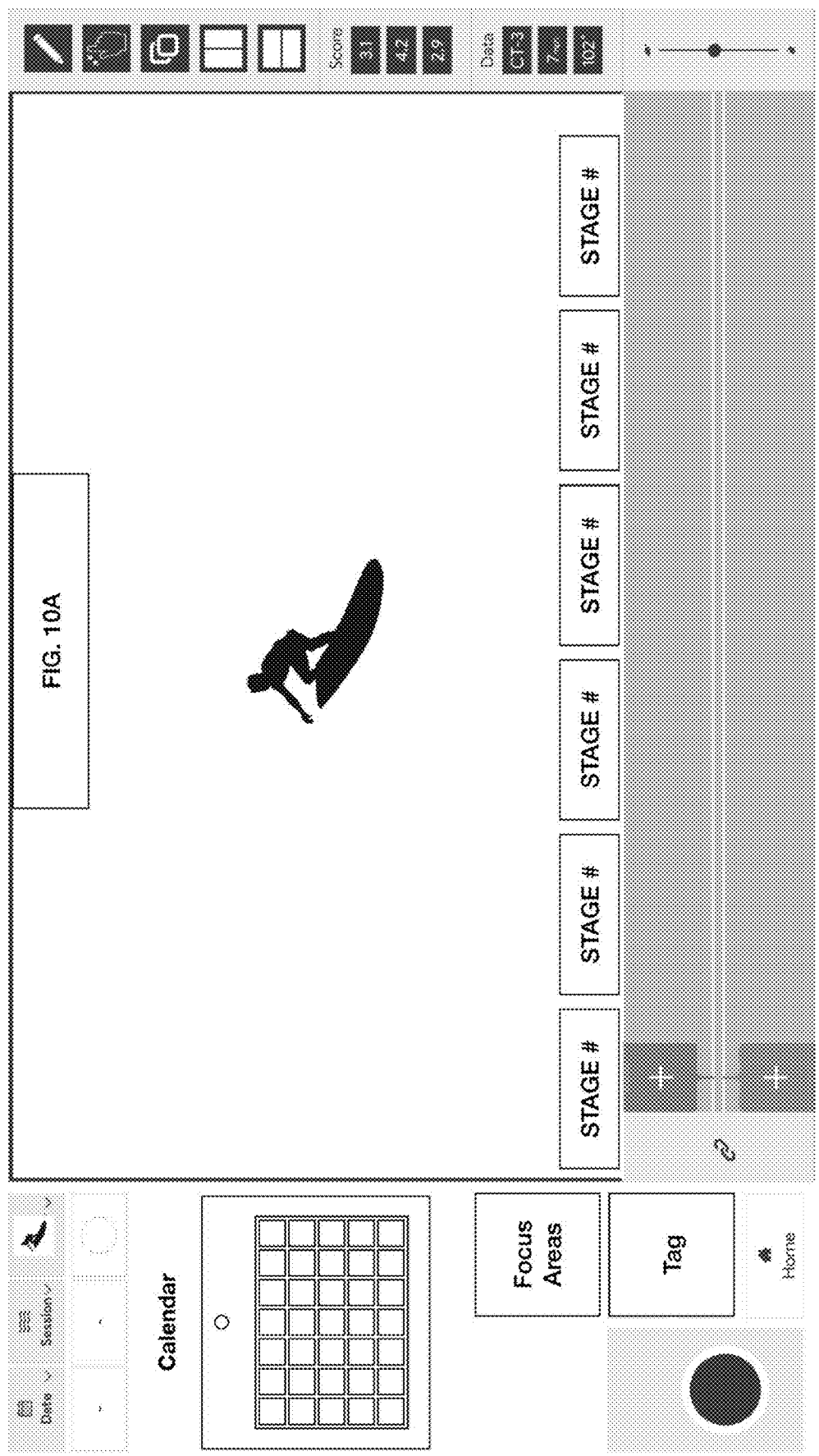

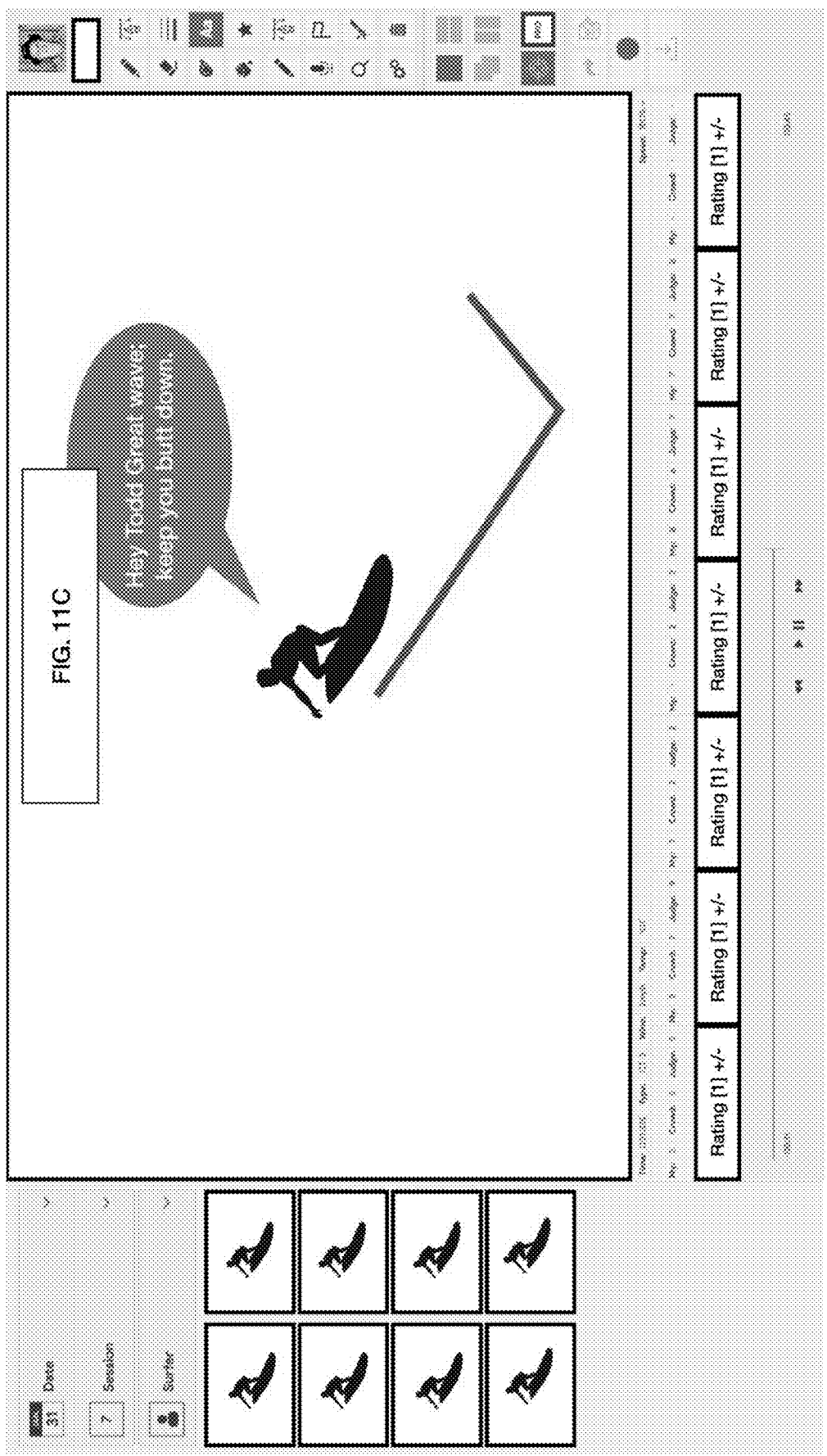

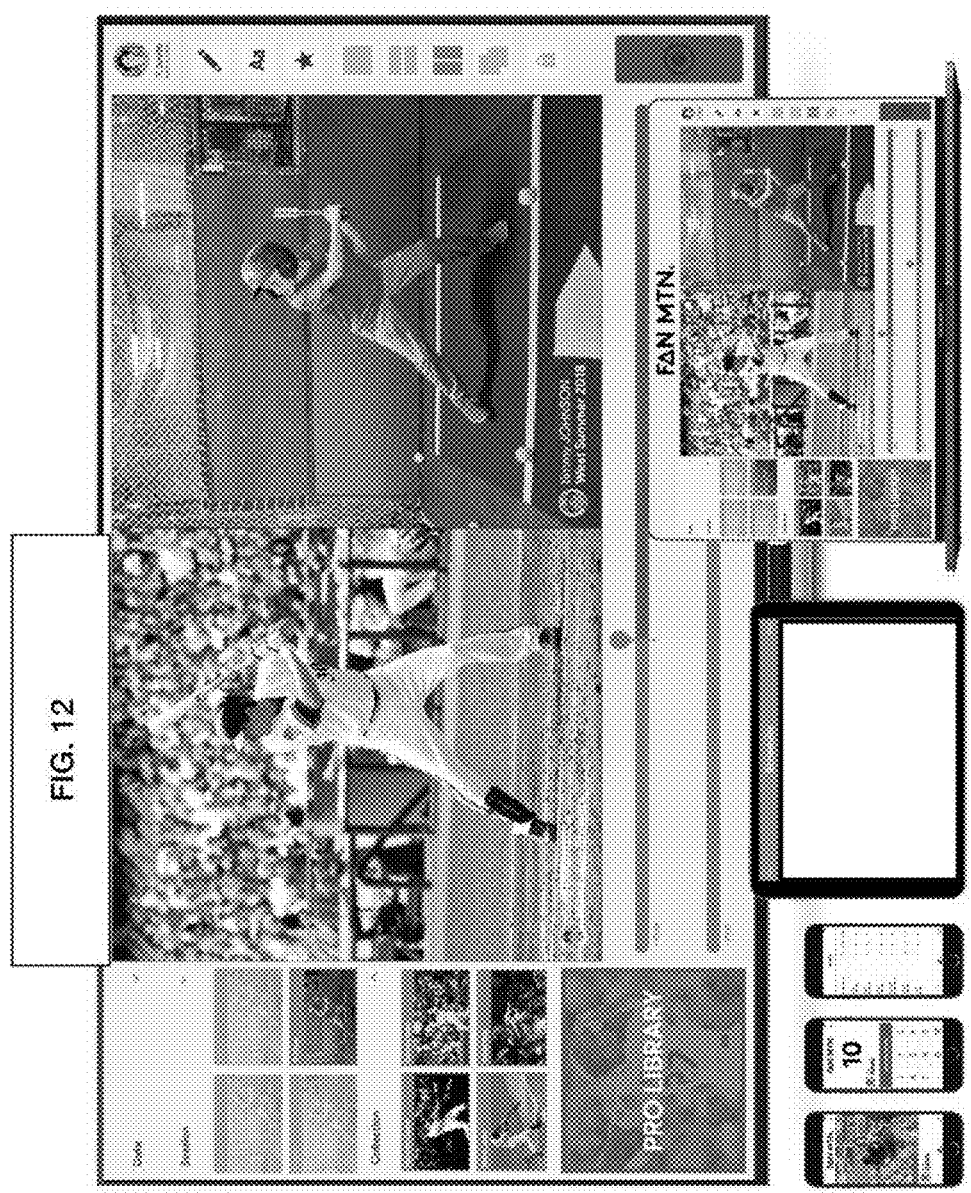
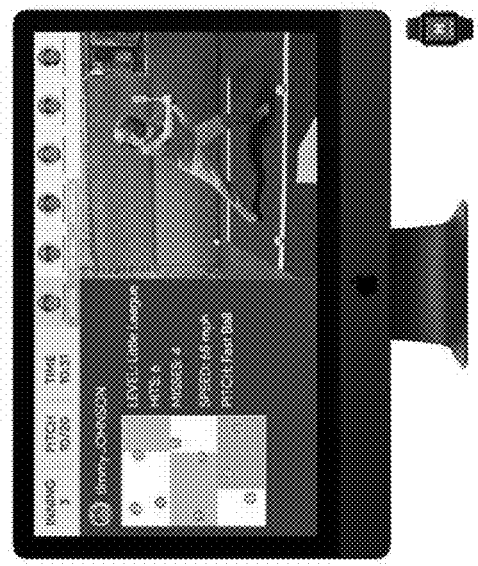
FIG. 12

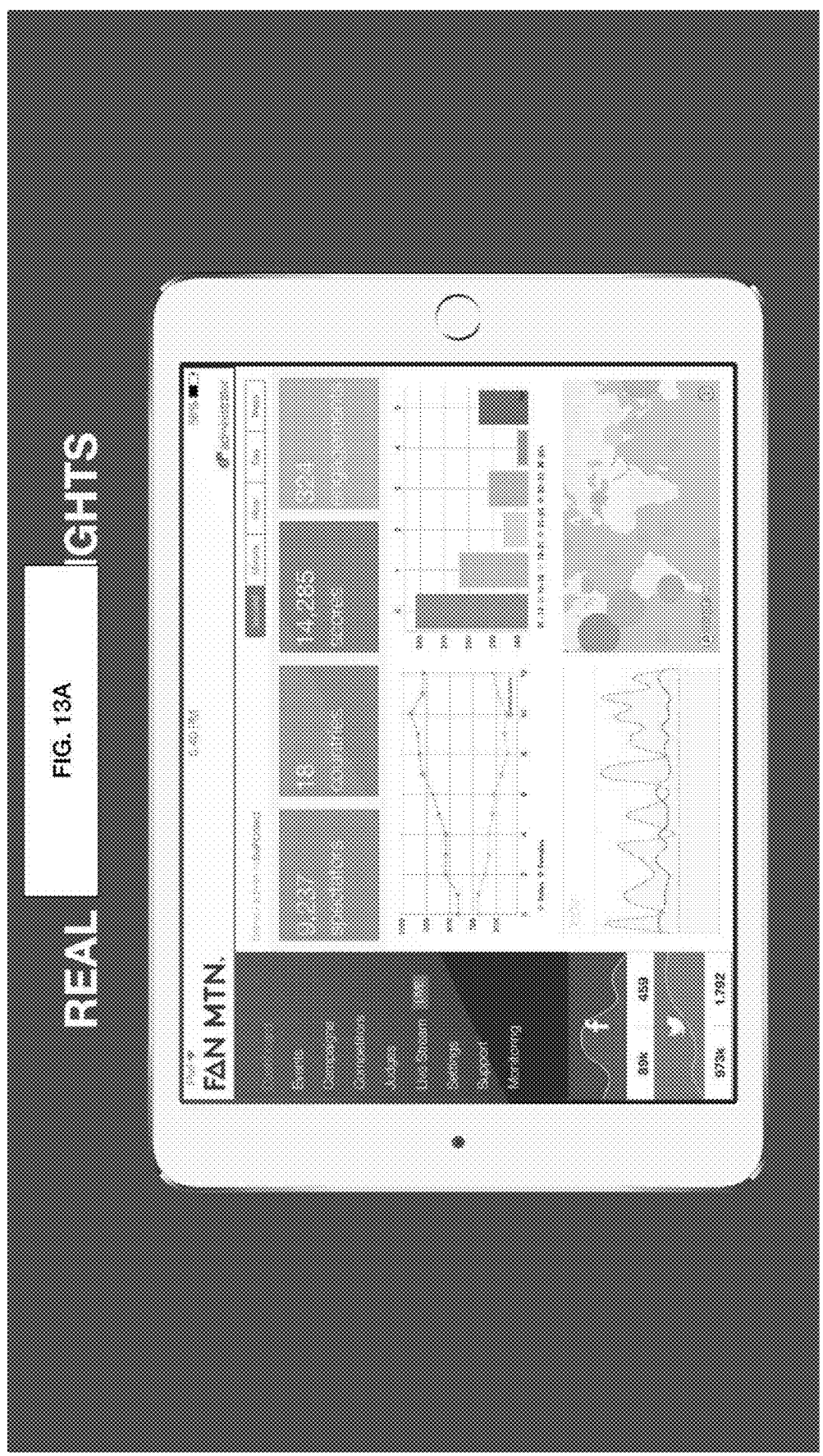

SYSTEMS, DEVICES, AND METHODS EMPLOYING THE SAME FOR ENHANCING AUDIENCE ENGAGEMENT IN A COMPETITION OR PERFORMANCE

CROSS REFERENCE TO RELATED APPLICATIONS

The present application claims the benefit of U.S. Provisional Patent Application No. 62/814,832, filed Mar. 6, 2019, entitled "SYSTEMS, DEVICES, AND METHODS EMPLOYING THE SAME FOR ENHANCING AUDIENCE ENGAGEMENT IN A COMPETITION OR PERFORMANCE", and U.S. Provisional Application No. 62/829,345, filed Apr. 4, 2019, entitled "ELECTRONIC PLATFORM FOR FAN ENGAGEMENT AND COACHING";
this application is a continuation-in-part of Ser. No. 16/533,640, filed Aug. 6, 2019, entitled "SYSTEMS, DEVICES, AND METHODS EMPLOYING THE SAME FOR ENHANCING AUDIENCE ENGAGEMENT IN A COMPETITION OR PERFORMANCE", which is a continuation of U.S. patent application Ser. No. 16/425,831, filed May 29, 2019, entitled "SYSTEMS, DEVICES, AND METHODS EMPLOYING THE SAME FOR ENHANCING AUDIENCE ENGAGEMENT IN A COMPETITION OR PERFORMANCE", which is a continuation of U.S. patent application Ser. No. 16/115,559, filed Aug. 29, 2018, entitled "SYSTEMS, DEVICES, AND METHODS EMPLOYING THE SAME FOR ENHANCING AUDIENCE ENGAGEMENT IN A COMPETITION OR PERFORMANCE" (now U.S. Pat. No. 10,322,330, issued Jun. 18, 2019), the disclosure of which is incorporated herein by reference in its entirety.

FIELD OF DISCLOSURE

This document presents devices, systems, and their methods of use for content generation, engagement, and distribution by which a user can interact with collected content in a variety of different manners. Generally, a content engagement platform is provided, where the platform may be implemented on one or more computing devices, such as one or more of: a remote server, a desktop computer, a tablet computer, a handheld mobile computing device, for instance, a mobile phone or personal digital assistant, a smart accessory, such as a watch or eyeglasses, and the like. The platform allows a user to annotate and distribute video content.

BACKGROUND

With the rise of social media, the generation, production, and dissemination of content have become a huge moving force within society. In view of this overwhelming rise of interest in content, large companies have been spawned, each focusing on different aspects of the process of generating and disseminating content, amongst friends and acquaintances, between business operators and consumers, and/or amongst consumers. Such content includes events occurring in the daily lives of individuals, descriptions of the advantages of products, as well as commentary on various socially significant issues prevalent in society today. A unique feature of the emergent global infrastructure that has led to the advancement of such content generation is the combination of high internet bandwidth capabilities and speeds, the prevalence of video cameras becoming ubiquitous within mobile phones, and the rise of downloadable apps for engaging with platforms facilitating the transference of data from one user to another.

However, with the proliferation of a variety of social media platforms, various problems have arisen making content generation and its dissemination difficult to engage in. For instance, among these problems is that the various different social media platforms do not communicate well with each other. Particularly, there are limited tools amongst social media platforms for facilitating content generation, and no platform for engaging with generated content prior to its dissemination. And even though there is a platform for disseminating messaging content, there are other platforms for disseminating imaging content, such as a first platform for disseminating static image content, but a second platform for disseminating video content. Further, once the content has been disseminated, there is limited ability to engage with that content and/or the content providers.

Hence, if a content generator or provider wants to create content, they must engage a suite of different generation tools, and save that content within a local environment. Next, if they desire to edit the generated content a further suite of tools must be engaged with. Then, in order to disseminate that content, depending on the type of content and how they want it to be disseminated, a variety of different platforms have to be interacted with. This fragmented hodgepodge of different tools being monopolized by different entities makes the process of communicating very difficult for the content generator. Likewise, as only a few, absurdly megalithic platforms own the means of dissemination, content providers remain at the mercy of the biased rules and regulations by which content can be transmitted on their platform. Hence, various content providers are constantly under the threat of being de-platformed, and thereby losing their voice within society.

Problems within each of the various existent tools are also pervasive. For instance, one set of tools may be used for capturing content, but these tools offer a very limited ability to engage with the content, and while there are tools that allow users to engage with content, these tools are often very expensive, are complicated to use, and frequently have problems engaging with various of the technical features of the actual content media provided to the editing suite. Likewise, once the content is generated and edited, it must be uploaded into a mechanism for dissemination, which can be problematic with respect to formatting the content to the various different application programming interfaces (APIs) of the various different dissemination platforms. Often times, each platform requires use of its own software developer kit (SDK) for processing the content prior to its upload and dissemination. Additionally, even once disseminated there are often problems, such as bandwidth and other resource problems that cause difficulty in the content being rendered and/or viewed once sent.

SUMMARY

Accordingly, in view of the above, what is needed is a holistic platform that provides for the easy and intuitive capturing, transference, and engagement with content, from its capture to its distribution, in a manner that allows an entire suite of new tools that are readily accessible and controllable by the content generator or others. The technologies presented herein meet these and other such needs. Particularly, in various aspects, provided herein is an interactive, crowd-source communication platform, such as for judging, commenting on, and/or coaching an activity, e.g., a sporting event, by one or more participants of an event having the activity.

The platform may be implemented on a computing device, for instance, one or more of a remote server, a desktop computer, a tablet computer, mobile phone, personal digital assistant, smart watch or ring, and the like. Specifically, in various embodiments, the platform may be implemented by a client application program, such as a downloadable application or other executable, which may include instructions that direct the actions of one or more processing engines of the computing device on which it is implemented, such as in the performance of one or more tasks, for instance, the judging, scoring, commenting on, coaching, and/or like activities of an observer observing an activity engaged in by a performer of an event. More particularly, the computing device may include a processing engine that is configured for generating a graphical user interface into which the observer's judging, commenting, coaching, and/or other activities regarding describing one or more characteristics of one or more activities by a performer in the event may be entered.

For example, in one embodiment, the graphical user interface may include a plurality of different interfaces, or panels, which may include one or more drop down menus, presentation screens, and/or interactive performance displays, such as an interactive display screen that is configured for allowing an observer or viewer, such as a coach, to view and comment on one or more activities of one or more performers in one or more events, such as at a display of the computing device. Additionally, in various embodiments, a "tools" menu may be presented whereby one or more tools is made accessible to the viewer so as to allow the user to interact with a presentation, such as a video clip or sequence of photos, e.g., digital photos, such as to allow the viewer to comment on the content of the presentation. Particularly, the interactive display of the graphical user interface may present a filmed clip, e.g., of a performer performing an activity in an event, and further present a tools menu, whereby the tools menu provides a number of tools by which the viewer can use to interact with, e.g., comment on, a performance of the activity by the performer in the event.

In certain instances, the tools menu may include a pen or marker feature, such as for annotating selected content, and an eraser feature for erasing annotations. A variety of other tools may also be provided such as a paint brush feature, e.g., for making colorful swaths, a letter and/or font feature, an underline, italicize, or bold feature, a microphone, a flag, a zoom in or out feature, a systems preference feature, a discard feature, and the like. In various instances, a repository may be provided for storing the annotated video, such as where the video may be stored based on an associated one or more identifiers and/or tags. Additionally, at a later time, the one or more videos may be configured for being distributed from the computing device, such as based on a user selection of at least one of the one or more identifier tags.

Consequently, the graphical user interface may allow an observer or viewer, such as a coach, to view a menu of content and to select a video, e.g., a video clip, for review and commenting on by the viewer. In such an instance, one or more videos may be selected from a selection of videos presented to a user of the computing device, such as at an electronic display thereof. The selection of videos may be collected from one or more video collection systems that are in communication with the electronic display, and which, upon selection may be formatted, e.g., by a formatter of the system, for display in the interactive graphical user interface. Particularly, the selection of videos may be represented as a thumbnail image in a video selection region of a panel, e.g., a menu screen, of the interactive graphical user interface. In such an instance, an individual may select one or more videos to review, which videos may then be presented in one or more additional presentation screens. In various embodiments, the video selection may be built from a number of different videos having a common them amongst them, such as where each of the selection of videos has been tagged by the computing device with one or more classification and/or other identifier tags.

In particular instances, the clips to be presented may be from a variety of sources, captured at a variety of different times, from a variety of different activities, in a number of different events from a number of different dates. Hence, the graphical user interface may present an event menu for selecting a type of event, such as from a database storing a variety of different events from which to select. A date menu may also be presented for selecting a date during which the one or more events, e.g., in the selected event category, was conducted. Likewise, a heat or sessions menu may be presented so as to allow the viewer, e.g., coach, to select from a number of sessions, or performances, such as from a number of different performances that were performed during the selected date and/or for the selected event category. Another selection option that may be presented at the GUI is a listing of participants that perform in the selected event category and/or during the selected event and/or event date. It is to be noted that these different menu items may be interactive and self-limiting, such that a selection from one menu, such as an event or activity menu, limits the available selectable content of the other menus. In a manner such as this, it will not matter from which menu the viewer makes a first selection, the fact that they make one selection can serve to better narrow down the other viewable selections in other menus, thus, making navigation easier.

Once an event has been selected, a date identified, a session designated, and/or a performer chosen, a listing of the clips, e.g., video clips, meeting the search criteria available to be viewed, may be presented. For instance, a list of video clips may be presented whereby the video clips are presented demarcating the various different performances from the various different participants in the events or a selected heat, or the list of videos may be presented demarcating all the video clips from a selected participant in the event from a number of different heats.

In any instance, the graphical user interface may present a number of different clips from which the viewer, e.g., a coach may select one or more content items, e.g., videos, for interaction therewith. Once one or more videos have been selected, the GUI may then display the selected clip(s) at an engagement screen interface wherein the presented videos can then be commented on, or otherwise interacted with, via one or more available tools interfaces. For example, where the clip is a video clip that may be presented at a display screen interface of the GUI, a view panel showing the performance of a competitor in an event may be displayed, and a control panel for controlling the displaying of the video may also be presented. Using the control panel, the coach can control the playing of the video, and using the engagement tools, the coach can interact with the contents of the video, such as to annotate the video with respect thereto. Specifically, the control panel may display the time period during which the performance occurs, and may include one or more toggles so as to allow a viewer to toggle through the performance, moving forwards and backwards and/or stopping or pausing, as desired.

One or more further viewer panels may also be presented, such as where characteristic data describing one or more characteristics of the event, heat, and/or athletic performance may also be presented. For instance, a score panel allowing a viewer to score an event and/or showing the scores previously given to the performance may also be presented. In particular instances, the score panel may further include one or more score frames, which score frames may be presented so as to display one or more, e.g., an average, of viewers scores, crowd scores, and/or the judges scores reflecting the various different evaluations of the performance.

Various condition indicators may also be presented such as ambient or water temperatures, wind speed, weather and water conditions, event conditions, e.g., wave size, and the like. Likewise, one or more predetermined scoring categories can also be provided such as demarcating one or more activities, e.g., maneuvers or routines, engaged in by the performer, such as indicating a performance start, e.g., takeoff, a paddle characteristic, such as paddle speed or efficiency, a stand or pop up, a stance, a trim, a barrel, an air, or other activity or trick menu can be presented, so as to show a previous viewers scoring in this regards, and/or allowing the present viewer, e.g., coach to score the performance for the first time or to adjust previous entered score, such as via a toggle. A speed of replay may also be selected, such as to allow the clip to be played back in a slower or faster mode than the actual speed at which the event occurred.

In this manner, the viewer, e.g., coach, can control the playing of the clip, and can then interact with the clip so as to provide feedback, such as to the performer. For instance, the coach may view the performance, e.g., of a participant, and use the tool bar to select a tool by which to interact with the clip. For example, a pen or pencil tool may be used to allow drawing on the display interface, a type tool can be used for the typing of comments, e.g., by the viewing coach, and a highlight or graphics feature may be used to highlight or otherwise demarcate a feature about which to be discussed. Particularly, in various instances, one or more graphical tools may be generated by the interactive graphical user interface, where each of the one or more graphical tools may be configured to receive an input from the user for annotating the one or more video clips of the performance of the activity presented by the interactive graphical user interface so as to generate an annotated video based on the input from the user.

In various instances, the display screen can actually be a split display screen so as to allow one clip from one performer to be viewed, commented on, and/or compared on one screen part, against a performance by another performer being displayed on another screen part. In this manner, the performance of one performer can be easily compared against the performance of another user. In particular instances, the performances to be displayed and compared may be from the same performer, however, at different times and/or at different events or heats. In such instances, a plurality of screens may be provided, and a corresponding plurality of control interfaces may be presented. In this manner, the flow and/or control of one performance may be viewed and/or controlled independently of another, or the plurality of performance may be configured such that they may be compared along the same timing.

In various embodiments, the graphical user interface may be presented on a multiplicity of different computing devices, such as at a first device being employed by a viewer, e.g., a coach, to comment on the performance of a performer in an event, and may further be presented at a second device being employed by a viewer, such as a performer, who is interested in receiving input on their performance, such as by the first viewer, e.g., coach. In this manner, the interactive, crowd-source communication platform may be employed in a method so as to allow a performer to view their performance, such as at a GUI presented on a first computing device, at a first time, and at the same or a later time, the performance may be viewed by a second viewer, where the second viewer may be a coach or other commenter who views the event and takes one or more actions with respect thereto, such as by engaging the tools menu so as to interact with the displayed clip, such as to demarcate actions that can be highlighted so as to give feedback to the performer with respect to their performance.

Consequently, in particular embodiments, as described herein below, a system for providing comments or coaching on a performance of a performer in an event is provided, whereby the system includes a plurality of computing devices. The system may include a plurality of client application programs distributed to a corresponding plurality of computing devices, e.g., mobile devices, having an interactive display, such as where each client application program is configured to present a graphical user interface, e.g., at an interactive display, of the computing device. Specifically, a coaching graphical user interface may be presented at a display of a first and second computing device whereby the display of the presentation is configured to correspond between the two different devices in such a manner that an interaction performed at one display is displayed at the second display, such as substantially contemporaneously so as to thereby allow for the distributed and real-time coaching of the performance of a performer of the event, such as via corresponding client applications running on the respective first and second computing devices.

Likewise, as indicated, the client application may present a set of application tools for one viewer of the event to communicate, such as through one or more inputs with another viewer, such as via the presented graphical user interface. Accordingly, in addition to a first and second computing device, the coaching platform may include a suitably configured server system connected with the plurality of client application programs, such as via a communication network. In such an instance, the server may be configured to synchronize the displaying of the events on the two or more different computing device, such that transmission at a graphical user interface of an action entered at one display at one computing device may be seen, substantially contemporaneously, on the screen of the second computing device, such that presentation to each of the plurality of client application programs for display, e.g., in the interactive display, is viewable by each device at substantially the same time.

In view of the above, in one aspect, the present disclosure is directed to devices, systems, and the methods of using the same for generating, engaging with, and distributing content, such as media rich, video graphic content. Particularly, in one aspect, provided herein is a computing system for evaluating a performance of an activity being performed by a competitor in a competitive event. For instance, in various embodiments, the system may include a computing device, e.g., configured as a studio system server, for generating an electronic display that is adapted to provide an interactive graphical user interface to a user of the computing device. In various instances, the graphical user interface may be configured for generating one or more presentation screens, within which screens one or more actions may be taken, such as for searching for content for display, for displaying selected content for engagement, and for presenting tools and controls by which to engage with the selected content.

Consequently, provided herein is a studio system sever that is configured for generating the aforementioned interactive graphical user interface. The system may include or otherwise be associated with a repository for storing one or more videos of a performer performing an activity. The videos may each be stored based on one or more identifiers by which they have been tagged, such as by one or more activity-related identifiers. In particular embodiments, the server may include one or more of a library builder, a presentation builder, e.g., of a presentation module, a tool module, a compiler, a formatter, and/or a distribution engine.

For instance, in one embodiment, the server includes a library builder that generates and/or otherwise presents a search menu for accessing and/or retrieving content from a repository. Particularly, as indicated, the server may be coupled with another computing device, such as via a network connection, and may be configured for generating a graphical user interface at a display screen of the client computing device. The GUI, in turn, may be configured for generating one or more engagement panels for presentation at the display screen, whereby a user of the computing device may interact with the engagement panels so as to search for content, view the content, and/or engage with the selected content.

For example, a first engagement panel may be configured as a search screen, whereby the user can be presented one or more search menus by which to enter one or more searches for content, such as based on one or more activity-related identifiers, and in response to a search query, the system server may identify a selection of one or more videos related to the search query. In response to the search query, the server may access the repository, identify search related content, and then retrieve the same for the building of a structured library, such as a structured library. In various embodiments, the structured library may present a representation of a selection of identified videos for display in the library panel, such as where each of the selection of the videos is available for selection by receiving an input at the interactive graphical user interface.

Further, a presentation module may also be provided, such as where the presentation module is configured for generating one or more other panels, such as one or more interactive presentation panels, such as in the interactive graphical user interface. Accordingly, once a search result has been returned, and a selection made, the selected video may be retrieved from the structured library for presentation in one or more of the interactive presentation panels. Likewise, a tool module may be provided, such as where the tools menu presents one or more graphical tools, such as in a tools panel in the interactive graphical user interface. In various instances, each of the graphical tools may be configured to receive an input for controlling the presentation of the selected video. In a particular instance, at least one of the graphical tools may be adapted for annotating the selected video being presented at the interactive presentation panel. Hence, in various embodiments, a compiler may be provided such as for receiving the user annotations to the selected video and for generating an annotated video, such as for distribution and/or storage of the video, e.g., in the repository, such as in accordance with one or more activity-related identifiers.

In a further aspect, provided herein is a studio system that includes one or more server computers, such as where the studio system is configured for receiving digital image content, such as via a network. In various embodiments, the server may be configured for individually tagging the collected digital media content, such as with one or more tags, e.g., of an event identifier, a participant identifier, and a viewer identifier. The studio system may further include a memory for storing the tagged digital media content, such as in a structured library. Furthermore, the studio system server may further be configured to receive a search request for accessing the structured library and retrieving the search results.

For instance, in response to a request from a client computing device, the server may access one or more libraries so as to identify and retrieve the digital media, e.g., image content, such as based on a requested identifier, such as an event identifier, a participant identifier, a viewer identifier, and the like. The identified content may then be presented, via the network, to the client computing device for display thereby. In such an instance, the server system may be configured for receiving feedback data regarding the content presented at the GUI of the client computing device, such as where the feedback data represents user interactive data entered at a display of the computing device using one or more graphical tools that are presented so as to annotate the digital image content. Accordingly, in particular embodiments, the user interactive feedback may include annotations to the selected portions of the digital image content, which content can then be stored along with the feedback data and annotations, such as in the memory, and in accordance with one or more identifiers.

Accordingly, in an additional aspect, provided herein is a studio system that includes one or more client computing devices that are configured for communicating with a studio system server computer, e.g., via a network interface. In various embodiments, the one or more client computing devices are configured for receiving selected portions of digital image content from a structured library, such as where the selected portions have been requested by each respective client computing device, e.g., based on an identifier such as one or more of an event identifier, a participant identifier, a viewer identifier, and the like.

In such an instance, each of the one or more client computing devices may have a client application and an interactive graphical user interface for respectively rendering and displaying the received selected portions of the digital image content. In certain instance, the client application may provide one or more tools to control the displaying of the selected portions of the digital image content. Accordingly, via the provided tools, each client computing device may be configured for receiving user feedback data that is related to the displayed selected portions of the digital image content, such as where the feedback is provided in the form of user interactions provided via a window in an interactive graphical user interface of a display of the client computing device. Hence, in particular instances, the user interactions may include annotations to the selected portions of the digital image content, which user interactions and annotations may be communicated back to the server via the network.

The details of one or more embodiments are set forth in the accompanying figures and the description below. Other features and advantages will be apparent from the description and drawings, and from the claims.

DESCRIPTION OF THE FIGURES

FIG. 2 presents a diagram of exemplary applications of the system of FIG. 1 for determining one or more identities of the disclosure.

FIGS. 3A and 3B presents a diagram of another exemplary embodiment of the system of FIG. 1, as configured in the conducting of an event.

FIG. 4 presents a diagram of an exemplary mobile computing device for use in accordance with one or more use models of the system of FIG. 1.

FIGS. 5A and 5B presents an exemplary display of a graphical user interface of a computing device for viewing a video of a performance in an event in accordance with one or more methodologies of the system, whereby once viewed the video may be distributed via a text message to a user's smart phone.

FIG. 6 presents another exemplary display of a graphical user interface of a computing device for use in viewing a video of a performance, whereby the video is displayed at an interactive display panel of the graphical user interface.

FIG. 8A presents a further exemplary interactive display panel of a graphical user interface of the system where the interactive display panel includes a tool configured for tagging and sharing one or more participants captured in a displayed video.

FIG. 8C presents an exemplary interactive display panel of a library presenting the results of a search of videos of a database of the system.

FIG. 8D presents an exemplary interactive display panel of a library presenting the results of a search of videos of a database of the system, and an interactive display panel displaying a selected video, where a control panel allows a user to tag one or more competitors captured in a displayed video.

FIG. 8E presents an exemplary interactive display panel of a library presenting the results of a search of videos of a database of the system, and an interactive display panel displaying a selected video, where a control panel allows a user to send the displayed video.

FIG. 9D presents exemplary interactive display panel displaying a plurality of selected videos, where a control panel allows a user to control the displaying of the presented videos separately and individually.

FIG. 10A presents an exemplary interactive display panel displaying a selected video, where a tools panel sets forth various tools by which to interact with the displayed video.

FIG. 11C presents an exemplary interactive display panel similar to FIG. 11A, where the display panel displays a video having been annotated.

FIG. 12 presents another illustration of the system in accordance with the disclosure.

FIG. 13A presents a representative output of an analytics computation having been generated by the system.

FIG. 13B presents a representative output of an analytics computation having been generated by the system.

DETAILED DESCRIPTION

In view of the above, provided herein is an interactive, crowd-source communication engagement platform, such as for capturing, interacting with, manipulating, commenting on, evaluating, scoring and/or judging one or more images captured in one or more content mediums. In various embodiments, the images of the captured content are directed to the performance of an activity, such as by an actor and/or competitor in a routine, such as in a theatrical presentation or athletic competition, for instance, where the engagement of a user with the content may be within the context of evaluating the captured performance, such as for the purpose of scoring and/or coaching the performer. The platform may be implemented on a computing device, such as one or more of a remote server, a desktop computer, a tablet computer, mobile phone or personal digital assistant, smart watch, ring, glasses, and the like.

Figure 1:
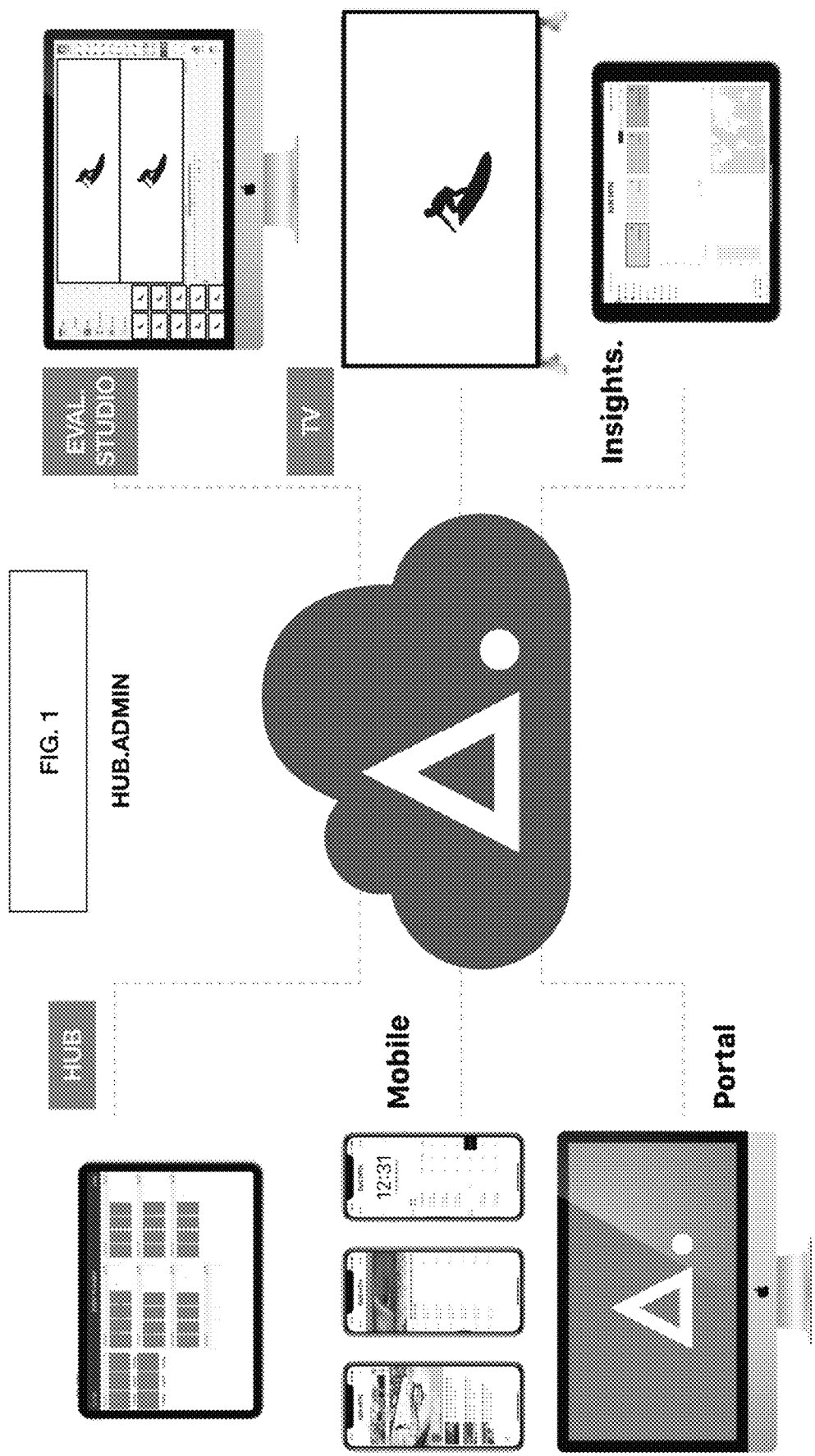
FIG. 1 presents a diagram of an exemplary system of the disclosure.

Accordingly, as can be seen with respect to FIG. 1, in one aspect a system is provided for performing one or more of the following operations related to the capturing, engaging with, and distributing content. The system may include one or more, such as a plurality, of computing devices that may be interconnected over a network connection via the operation of an application running on one or more of the attendant devices. For instance, one or more of the devices of the system may include an image capturing device, a desktop computer, a heads up display (HUD), a tablet computing device, a handheld, mobile computing device, a coaching or evaluation interface, an analytics interface, as well as one or more displays.

Particularly, in particular embodiments, the system may include one or more of the following components. For example, the system may include an image capturing device, such as a camera, e.g., a still or video camera, which image capturing device is configured for capturing or otherwise collecting one or more images, such as of a performer and/or competitor engaging in an activity in an event. The activity may be any form of activity such as presented as a formal or informal event, such as a professional or amateur competition, or a mere collection of two or more friends or acquaintances engaging in a friendly competition or other activity. In any of these instances, the engagement system can be employed so as to allow event participants and viewers to watch the event, capture images of participants, post the images, compare, and comment on the posted images.

Accordingly, the system may be configured for providing a plurality of portals through which the system, e.g., a studio server thereof, may be accessed. For example, an administrative portal, e.g., provided by an interactive touch screen display, tablet, or other computing device of the system, may be set up so as to allow a user of the system, e.g., an event organizer, to set up an event, performance, and/or competition. As indicated above, the event may be any active event or activity, such as a theatrical performance, an athletic performance, a professional or amateur sporting event, e.g., an NCAA or Olympic competition, and the like, such as where, the event organizer or other system administrator engages the system to set up parameters in an open format where by tens, or hundred, thousands, hundreds of thousands or millions of fans can watch, e.g., via the application, and can engage with the competitors or performers and each other via the platform. In other instances, where the event is a few friends engaging in a performance, such as a pick-up basketball game, little league baseball game, or even a theatrical performance or concert, the event organizer or other system user may simply be one of the competitors that accesses the system, e.g., via an administrative interface, as an administrator in order to set up a more closed event, which can only be accessed by being invited to view, in which instance, the administrator, or the system itself, can then send out invites to a select group of viewers.

The image capturing device may be any device capable of capturing or otherwise collecting one or more images, and in various instances, the image capturing device itself is a smart device, such as having an image collecting apparatus, a processor, a memory device, a power source, e.g., a battery, such as a rechargeable battery, a GPS device, a mobile device identifier, an electromagnetic signal transmitter and/or transponder, e.g., RFID, a display screen, e.g., a capacitive sensing touch-screen display, an input device for entering information into the device, a microphone, a speaker, an amplifier, and a communications module, including a receiver, a transmitter, and/or a BLUETOOTH®, low energy BLUETOOTH®, WIFI emitter, and the like, such as for transmitting one or more of the captured images, such as via a wired or wireless connection, e.g., a wireless network connection.

A unique feature of the present system, with respect to the image capturing device, is that the system is able to recognize various of a wide variety of input devices capable of transmitting data, such as image data, into the system. For instance, a central feature of the system is a client application, e.g., including machine operable instructions, which application may be downloadable, or otherwise uploaded onto a device, including an image capturing device of the system. The system may also include a server system that further includes one or more corresponding applications, whereby via the application, the system can identify and recognize any device employing the application as a potential input, or source, for data that can be entered into the system.

In a manner such as this, any device having the application downloaded and/or coupled with its processing functionality, may be queried by the server with respect to whether the device includes an image capturing facility such that the device may serve as an input source for content, such as images and videos which may then be transmitted from that device to the server. Hence, in various embodiments, the system may include a mobile computing device, such as a smart phone having a camera, whereby the camera, and/or images captured thereby may be identified and employed as an input into the system. Consequently, now anyone with a suitably configured mobile computing device may be employed by the system as a content generator.

The server may be a single server, or a plurality of servers, such as a server rack. In various embodiments, the server may be configured as a fan and/or judge or evaluator engagement server that is not only adapted for identifying and communicating with an image capturing device associated with the system, but may further be configured to communicate with a plurality of other client computing devices running the client application discussed herein so as to perform one or more of the disclosed functionalities. For instance, the client application can be downloaded or otherwise installed on a client computing device and thereby serve as a portal for a plurality of users to access the server system functionalities.

Consequently, the system may serve as an interactive, crowd-source communication and engagement platform by which to interact with, or otherwise engage with, other users and various of the collected content of the system such as through performing in an activity and/or viewing others performing in the activity. For instance, in one instance, a first user of the system may be a competitor in an event being hosted by the system, whereby the first user is associated with an image capturing device, so as to capture images of their performance in an event such as through a first person point of view, such as where the image capturing device is running the executable application or is otherwise associated with the system, such as via a network connection. Likewise, a second user may be an observer in the crowd with a mobile phone who is watching and engaging with the event through the application, and may further be filming the event through the phone's associated camera. In such an instance, the system may recognize both the camera of the user and the phone of the observer, may identify them individually as inputs, and may then start receiving the captured images of the performers camera and observer's phone, and thus, the first and second user may be enabled to transmit captured images from their image capturing device's to the system, via the application, such as from a performer and/or fan perspective.

As indicated, the event can be viewed by being at the event, or can be viewed via the application. For instance, the event may be one where there are official cameras capturing images in a variety of locations in a variety of positions at a variety of angles. In such an instance, the system may include one or more, e.g., a plurality, of Heads Up Displays, which may be positioned throughout the event environment whereby observers of the event can interact with the HUD to watch the event, score the event, comment on the event, scroll through one or more menus displaying various event particulars, and the like. Particularly, the HUD may present a user all the information that pertains to the event, its participants, sponsors, organizers, and its organization. It is to be noted that where there are a plurality of cameras, filming a variety of different but related fields of views, associated with a plurality of display screens, one or more immersive, virtual reality hubs or rooms or other interface may be provided, so as to put a user of the system in the middle of an event.

In some embodiments, the event may be an informal event, and the capturing of images may be via a handheld camera, such as a mobile phone having a camera, whereby the client application accesses the phone's endogenous camera to capture the images of the various performers in the event and to transmit the captured images to the engagement system server. In any instance, the server system may include a plurality of application programming interfaces (APIs) that are configured for allowing an administrator, event organizer, or other user of the system to permit an image capturing system, whether it be a high-tech camera system, e.g., at a major league event, or a camera of a handheld mobile computing device of a spectator, to access the system and transmit to the server, via a suitable network, e.g., internet, connection, the captured images, which images may then be broadcast, e.g., via the client application, to other system users for viewing thereby.

In addition to the image capturing device and/or server system, the fan engagement system may include a client computing device, such as a mobile telephone or tablet or desktop or box set computing device, for instance, where the type of computing device is selected or otherwise depends, at least in part, on the types of engagement by which the various diverse users will interact with the platform. For instance, an Official judge may engage with the platform via a laptop or tablet computer, such as for viewing and/or scoring various different competitors in their performances in the event, e.g., via a scoring module of the system. In such an instance, the judge may employ an interface, e.g., a dashboard interface, presented at a graphical user interface of the computing device, so as to enter one or more judgments or evaluations of one or more performers participating in the event.

In another instance, an observer of the event may engage the platform via a handheld mobile device, such as to film, score, and/or comment on the performances. Likewise, a coach may engage with the platform via a tablet or desktop computing device. Further, at the event itself, there can be one or more, e.g., several, large flat screen T.V.s, or other displays, e.g., HUDs, that may have a capacitive sensing touchscreen interface that allows a variety of different users to watch the events and engage with the system via the touch screen monitors. Additionally, the system may include a smart watch, bracelet, ring, or even smart glasses that are configured for being worn, e.g., by a competitor or observer of the event, so as to both indicate when a performance is to take place, what type of activities should be performed, and other performance data, as well as to measure various competitor characteristics, bio-physiology data, and the like that can then be fed into the system, and/or displayed to the viewers of the system, as explained herein.

In any of these instances, the platform may be presented as a graphical user interface at a screen of one or more devices of the system, such as generated by a client application running on the device. Particularly, in various embodiments, the platform may be implemented by a client application program, such as a downloadable application, or other set of executable instructions, which instructions direct the actions of one or more processing engines of the computing device in the performance of the functioning herein described, such as for judging, evaluating, commenting on, coaching, and/or like activities of an observer observing the activity of the event. More particularly, the computing device may include one or more, e.g., a set of, processing engines that are configured for generating a graphical user interface into which the observer's judging, commenting, coaching, and/or other activities regarding describing one or more characteristics of one or more activities by a performer in the event may be entered.

As indicated above, in various instances, the event may be a filmed event, and thus may have one or more cameras positioned at one or more locations in the performance of such filming. Alternatively, or in addition, one or more users of the system may engage their computing device, e.g., a camera thereof, to also film the event. Accordingly, the platform may include a server system that is configured for not only receiving the scores, comments, or other inputs from users of the platform, but to also receive one or more video feeds, such as a plurality of video feeds from a wide variety of users of the system.

As such, the system may be configured for receiving a video feed, evaluating the quality of one or more of, e.g., each of the feeds, determining the most salient features of the feeds, e.g., based on a number of characteristics, scoring the received video feeds, and then based on the score of each video feed, distributing the images out to one or more recipient devices for viewing thereby, such as where the video selected to be distributed or otherwise broadcast is based on the scoring. Hence, in such an instance, regardless of whether the event has an official image capturing system, the platform may be configured for receiving both official and non-official video feeds, and selecting which one of the feeds to broadcast to various other of the recipient devices of the system.

As can be seen with respect to FIG. 1, each of the various components of the system may be interconnected, such as via a network interface, for instance, via a cloud based interface. In a manner such as this, the system may be configured for capturing and/or distributing and/or displaying a video of a performer in an event whereby the video has been selected so as to be the most salient to the viewers, such as with respect to one or more characteristics thereof. These characteristics may include clarity, actionality, viewability, exemplary features, maneuvers and/or routines performed, and the like.

In various embodiments, the characteristics to be used in determining which videos to distribute may be selected by the system, such as by a suitably configured AI module thereof, and/or may be voted upon by the participants or observers of the event. In such instances, identifiable characteristics may then be used to score the incoming images and/or videos, and select one or more feeds that best represents the collective's desired viewing characteristics, which videos may then be distributed and/or broadcast to the various different users of the system. Hence, the system may be configured for not only providing a scoring platform by which the viewers, e.g., users of the system, may score the performance of the various different competitors in the event, but may also be configured for allowing the users to score the various different video feeds, so as to select the best images to be broadcast and viewed.

Accordingly, in various instances, the system may be configured for collecting content, such as image, e.g., video, content. As explained herein below, the system may include a database, such as a structured database, that includes one or more libraries of content. As indicated, the content may be image and video content that can be stored in a structured library that can then be presented for engagement as a menu of selectable items by a user of the system, e.g., an evaluator of the content and/or a coach of the performer. In such an instance, a user of the system may engage a computing device of the system to perform a search of a database so as to access stored content within a categorized library. Once accessed, a dashboard interface may be generated and presented at a display screen of the computing device, or HUD, and through the dashboard interface, the selected content can be presented for viewing and/or engagement. Accordingly, in various embodiments, the system may be configured for generating a dashboard workspace that may allow a user of the system to engage with collected content in one or more manners discussed herein. Further, as can be seen with respect to FIG. 1, the system may include one or more analytics modules, such as for running one or more analysis on collected data, from the results of which analyses one or more insights may be determined.

As explained herein below with reference to FIG. 2, a wide variety of analyses may be performed so as to determine one or more salient features by which the system may be configured, events organized and run, scores analyzed and/or determined, and winners identified. Accordingly, in various instances, the system provides for an analytics platform that may be configured for recognizing one or more relationships between data points entered into the system, from which relationships one or more conclusions may be inferred, and one or more predictions made. For instance, once one or more predictions and/or inferences have been made, such as by an inference engine of the system, the system may then employ a machine learning module, to test the success of the predictive models, which results thereof can be fed back into the inference engine so as to better train and improve on the predictive capabilities of the system.

For instance, as can be seen with respect to FIG. 2, the system may include an artificial intelligence module that contains an inference engine and/or a machine learning unit together which form an AI learning platform that may be employed by the system to drive one or more analytics tasks of the various methods herein described. Particularly, the system may be configured to determine various relationships between data points, to weight the identified relationships based on the number of instances of occurrence between the data points, and from this weighting make one or more predictive calls based on an inference derived from the relationship. The one or more predicative calls may be made with respect to generating one or more rules for configuring one or more of the operations of the system.

The system may then collect or otherwise receive content, receive feedback regarding the collected content, including: comments, scores, and other relevant input from the various different users of the system, and then it may evaluate the received content, extracting therefrom the most salient features, scoring and/or weighting the features, and then using the results of the feature extraction and scoring to refine the rules of the system so as to better determine the most pertinent rules by which to perform the various methodologies herein described. These methodologies may be related to one or more of identifying salient features of a performance, including who is performing and when, what is being performed, the content and quality of what is being performed, the scoring of what is being performed, such as with reference to another performer or a model of performance, the quality of one or more images being collected and/or images, e.g., video feeds, being distributed. Hence, the system may be configured for both learning and selecting the best rules and/or examples for use in evaluating content of the system, such as image content, video content, video feeds, etc. of all the content received, evaluated, and/or scored by the system, which content may then be selected by the system to broadcast out to the various client devices of the system.

For example, in one implementation, the system is configured for organizing and running an event, and in so doing may be configured for identifying one or more performers and/or observers of the event, such as through an application running on a device of the system associated with the participant and/or observer, such as a smart watch or ring, or mobile phone, and the like. From this device, and/or from an image captured of the participant or observer, the user may be identified, their presence tagged, and their actions analyzed, such as by the analytics module of the system. Geolocation data may also be generated and used to identify the user based on the GPS of their associated device. This data may then be employed by the system in the performance of one or more of the functionalities herein described, such as for the evaluating of the performance, a determination of the fairness of that evaluation, for the provision of instructions and coaching, as well as for making one or more predictions with respect thereto.

Additionally, as indicated, the AI module may be configured for receiving various system data, such as content and/or analytic input data, such as bio-physical data of the competitors or other performers in the event. For example, with respect to image or other data collected by the system, the various data may be input or otherwise retrieved by the system, may be analyzed so as to be broken down into various different data points, which data points may then be mined so as to define relationships between data points, so as to form a knowledge graph that can be employed by the inference engine of the system to perform a predictive analyses so as to generate one or more predictions and/or inferences by which the system may be organized and/or one or more queries can be run and answered.

Such analyses may be performed for the purpose of determining bias in an event, predict an outcome of a performance, and/or forecast a potential winner of the event. The predictive analyses may also be employed for the purpose of facial and/or identity recognition, to tag identified participants or viewers, to define exemplary or non-exemplary performances, as well as to judge subsequent performances based on identified exemplary performances. Analytic feed back, such as biometric data from various of the performers in the event can also be collected and analyzed.

For example, with respect to bio-analysis, various of the competitors in the event may be wearing a smart device that both provides information to competitors regarding the conditions of their performance in the event, such as when to compete, where the performance is to take place, the time to the beginning of the performance, the time to the end of the performance, the priority of performances, their ranking in the event, what activities or actions they need to perform, the score they need to achieve, and the like. The smart device may further be configured for sensing, monitoring, and/or determining one or more biological and/or physiological conditions of the competitors, such as heart rate, blood pressure, blood glucose levels, body temperature, and the like, which data from a variety of performers in a variety of events may be fed into the system and may be evaluated by the learning platform, so as to allow the system to better determine the ability of the performer to continue in the performance, and/or to predict success and failure, and/or determine health risks. These characteristics and the outcome of the system's analyses may be displayed by the system and/or may be used in determining odds, e.g., real time, so as to allow the system to more accurate organize, mediate, and run a betting regime.

Accordingly, the system is configured for receiving input, evaluating that input, and then generating an output, such as an output with respect to content and/or its evaluation, which can then be broadcast, or otherwise distributed, to a plurality of different system users, regardless of the type of device by which the users engage with the system. In a manner such as this, the system may be configured for tracking the health and physiological status of the athletes or performers over time, so as to determine one or more trends in the performer and/or performance. The determined trends may be employed to give feedback to the performer on their health and/or status during the performance, so as to ensure the health and/or safety of the performer, for adjusting predictions of the scoring and/or performance outcome, and/or for adjusting and/or determining betting odds, such as where a betting functionality is included in the client application.

Figure 3B:
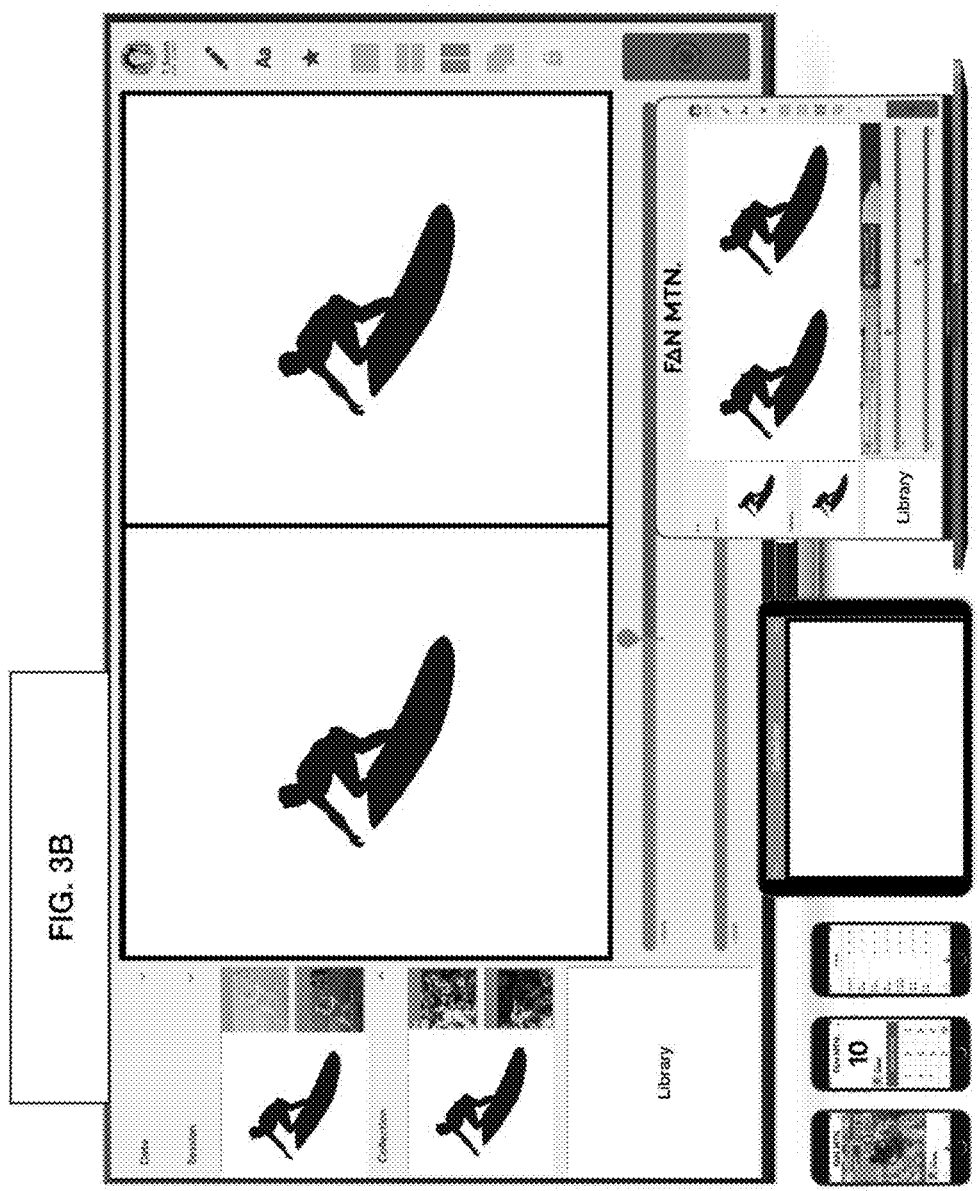

In view of the above, as can be seen with respect to FIGS. 3A and 3B, the system may be configured as a sports, entertainment, and/or personal/team activity engagement and/or coaching platform. The system includes a server having a plurality of engagement engines for organizing, moderating, facilitating and/or generating fan engagement, as well as for producing, collecting, interacting with, and distributing content, and for connecting and coordinating the functionalities of a multiplicity of client computing devices networking with the server via the fan engagement client application, such as a computing device, for instance, a laptop, tablet, mobile phone, or smart watch computing device, and/or one or more display screens, such as a heads up display that includes an interactive touch screen display.

For instance, the system may include a client application running on a computing device, whereby the client application is configured for performing a variety of different functions designed to more fully engage both fans and performers in a competition or performance, as well as to provide a platform by which coaches, commentators, and/or fans can engage with one another via the platform. Particularly, FIG. 3A presents a summary of one exemplary engagement embodiment of the system. In this instance, presented is a waterproof smart watch, for use in competing in a performance of an event, one or more smart phones, such as for allowing an observer of the event to capture, comment on, and/or evaluate, e.g., score, content pertaining to the performer competing in the event, and a tablet computing device, which may be used to setup, organize, and run the event, and which may be employed by one or more official judges so as to judge the event. Further included may be a variety of displays, such as one or more heads up displays, which can be positioned in a variety of positions throughout an event space so as to allow event goers to view the event from a wide variety of angles and view points, such as where each HUD may display a different input, e.g., from a different video in feed, and allowing carious users to individually interact with a HUD to engage with the event, all through the client application. Additionally, set-box computer may be provided so as to allow a user to receive, or otherwise retrieve, collected content, to engage with that content, such as through an evaluation module generated by the system, can be presented a suite of tools by which to interact with the collected content, e.g., so as to provide commentary and/or coaching, by engaging with the collected content.

More particularly, as can be seen with respect to FIG. 3B, the system may include a real-time coaching module that will allow a user, such as a coach and/or commentator to receive an input of a feed, such as a video feed, which feed may be presented, e.g., live streamed, at a dashboard interface of a client computing device, whereby the performance of one or more actors in an event may be presented, such as at real time. In such an instance, the system may generate an evaluation interface, such as a coaching workspace, whereby the online coach may engage with various tools of the dashboard so as to provide contemporaneous commenting on the performance. Specifically, the coach, commentator, or other evaluator may live stream one performance on one panel of the workspace, and further select a previous performance, such as from the same or a different performer, and can provide commentary of the first performance, and further, can show how the present performance compares with a previous performance. Of course, where multiple heats or rounds are being conducted at the same time, then both panels can live stream both performances, and if desired, the coach or commentator can individually engage with either panel separately or collectively.

In such an instance, one or more of the actions taking place on the workstation panels may be transmitted to one or more of the other computing devices of the system, such as for substantially contemporaneous viewing of the commenting or other engagement by the coach or evaluator. For instance, while the commentator or coach is interacting with the captured content on a desktop workstation, the engagements he has with the content on the screen, e.g., the actions he takes with respect thereto, can be streamed or otherwise output to one or more of the HUDs for viewing by the other attendees of the event space, or to a remote third party client device. In a manner such as this, a performance of one or more competitors can be filmed and streamed such that an audience, e.g., at an event, can both view the performance and an evaluator's in depth analysis of the performance. In various instances, the one or more panels of the work station may be distributed to one or more users smart phones or other devices, such as a smart watch, for viewing and/or subsequent engagement therewith.

In this regard, the system includes one or more handheld mobile computing devices, such as a mobile phone or tablet computing device, by which to view and/or engage with the platform and other users, e.g., coaches, evaluators, or other spectators thereof. For instance, as discussed above, various of the users may engage with the platform via their mobile computing device, such as by videoing the performance, commenting on the performance, scoring the performance, and the like. These engagements can be sent to the system server, over a suitably configured network connection, can be processed by the system and distributed and/or displayed or otherwise posted by the system, such as on an electronic communications board, e.g., HUD, that may be presented at a touch screen interactive monitor of the system. Additionally, a laptop and/or desktop computer may be used to engage with the system and various of the other system users such as for the purposes of posting, commenting, and/or coaching on one or more activities performed by one or more performers.

Additionally, as can be seen with respect to FIG. 4, an athlete or performer may be associated with one computing device, e.g., by wearing a smart watch, whereby the system will indicate to the performer where to go to engage in the performance or an activity thereof, who has priority in performing (such as in a group competition), when the performance is to begin, and how long until the performance is to end. Specifically, the system can readily indicate this to each of the performers via the client application down loaded and/or running on the smart watch or bracelet. Likewise, via the coaching module, the system may provide substantially contemporaneous coaching, direction, or evaluation to the performer, such as by transmitting data from the worktop evaluation module to the performer via the smart watch or bracelet being worn by the performer or competitor.

For instance, as indicated, the smart watch and/or bracelet, or other device, may have a display with an interactive screen and/or one or more light emitting diodes (LEDS). For example, each competitor in a competition may be provided a watch, such as a waterproof smart watch with the ability to display one or more of a color, a number, a time, a timer, and other pertinent competition or performance data. In such an instance, the color can denote a number of different things, such as a marker as to where to begin in the competition, such as where each competitor is designated a color, and the competition area may have another designated colored region (such as demarcated by a colored flag) indicating where each performer is to begin his or her performance. The displayed number may indicate a number of things, such as the priority and/or order by which the competitors are to perform.

Hence, the competitor, here in red, has a P indicating priority position, and the starting point or area would be the red flag or red marked area. Likewise, the blue designated competitor would be up next and to being in the blue designated area, and then likewise for the green designated area. Of course, the numbers and colors can dynamically change, based on the nature of the event, such that where at one time one competitor has priority and begins from the read area, at a later point in time, they may have priority but start from the blue or green marker. In a manner such as this control and direction can be given to an otherwise fluid or otherwise dynamic competition area.

Further, as the competitors are getting ready to compete, the same color and number screen can be displayed on the client devices of the other competitors, official judges, as well as the viewing spectators engaging with the activity. Particularly, in one embodiment, as can be seen with respect to FIG. 4, the client application, regardless of the device it operates upon, may be configured to generate a graphical user interface, such as on a smart watch, mobile phone, tablet computing device, and/or a display screen, e.g., interactive display screen, of the system, by which interface the judge, spectator, and/or coach can view and/or engage with the engagement platform and/or performer and/or competitor in the event. In this manner, the competitors and/or performers in the event can get real time updates as to event particulars, such as who is winning, their rankings, what scores our routines they need to pass on to the next round, and the like.

For example, in various instances, a coach can analyze the previous performance by the present performer and/or one of his or her competitors, and the coach can give real time direction to the present competitor via the client application running on an associated smart watch, bracelet, mobile phone, and the like, such as with regard to what activities the present performer should engage in and/or what scores they will need to achieve in order to get advanced to the next round and/or to win the round or competition. Particularly, regardless of the computing device, in such instances, the display, e.g., on the coach's and/or competitor's device, may include a plurality of different interfaces, which may include one or more drop down menus, presentation screens, and/or interactive performance displays, such as an interactive display screen that is configured for allowing a coach, a performer, an observer or viewer, such as a commentator or spectator, to view and comment on one or more activities and/or request one or more activities or functions be performed, such as at a display of the computing device. In one embodiment, the application may generate a microphone interface to allow the competitor to record a message that can then be transmitted back to another user via the app, so as to ask for pertinent instructions and/guidance needed. And of course, during the performance one or more images may be captured and/or relayed to a coach, who can then annotate the images and send them back, e.g., substantially real time, to the competitor or other users of the system, so as to allow the users of the system to view the performance along with the annotations.

Accordingly, FIG. 5 presents a heads up display (HUD) for presenting and/or otherwise displaying one or more activities or performances in an event by one or more participants. In this instance, the event can be any active performance, such as an official institutional event or a un-official pick up event, which is filmed and transmitted to the engagement system server for analysis, distribution, and/or display thereby, such as provided to a dashboard studio presented at a graphical user interface of a client computing device of the system. With respect to distribution, the system may be set up to display the filmed activity or performance, e.g., at a HUD or other device of the system, and then the system may allow the user to view the filmed or otherwise captured images, and to transmit or distribute the captured images system wide, e.g., to all system users or those involved, or to only those engaged in the event, or for posting the images on to the system communications board, and/or the like. Additionally, the system may be configured for only transmitting the filmed activity to particular, identified users, such as one or more system identified, e.g., tagged, performers or to an identified user, or the like.

For instance, the system may include an image capturing device, such as a video camera, that may be configured for capturing images and identifying the salient features of the activity or performer of the activity. Particularly, in various embodiments, the AI module may be configured for collecting images of the performers face, body, actions, comparing the collected images to a database of prior images of the performer in the same or different activities, and thereby identifying and tagging the performer. In other instances, the identity of the performer may be presented directly to the system by data entry, and a given identifier, such as a colored jersey and/or number or other identifier, such as when the performer is associated with a smart device in communication with the system components, whereby the performer and his or her activities may be tracked and images of their performance may be captured and stored by the system. In various instances, the captured images may be displayed, and identification of the performer may be made by querying an image or identifier database, in situations where the performer does not have an official identifier, in which case the performer can be identified by their visible appearance, e.g., facial recognition, and/or by their movements or actions, or their image can be displayed and one or more other users of the system, e.g., spectators, can then identify the performer.

In particular instances, one or more of the collected images of the identified performer may be transmitted to the performer and/or anyone designated by the performer. For example, the system may include within its database a profile for the performer, which may include the contact information of the performer, and once an image, e.g., a photograph or video, is captured it may be transmitted to the performer, who can then view the image(s), edit it, and/or authorize its display, posting, and/or further transmission. For instance, as depicted in FIG. 5, the performer, or other user wanting the captured images, can add their telephone or email or social media account(s) or other identifier to their profile on the system, and may further authorize the system to transmit captured images to them.

Consequently, once an image of an identified or tagged performer or other system user is captured, it may be sent directly to the user and/or to anyone else identified by the user, coach, event organizer, or system itself, for receipt of the collected images. The images may then be commented on, edited, or otherwise manipulated and be transmitted back to the system for posting and/or display thereby. Of course, in certain embodiments, the raw unedited images may be presented to the user for authorization and posting in a non-editable manner.

Further, where authorized by performers, other users of the system, e.g., observers and/or fans, can tag the performer such that one or more captured images of the performer may be collected and sent to the observer for viewing and/or commenting. For instance, commenting, or otherwise annotating, the content may be performed for a number of reasons, such as for posting, e.g., with an added comment, by the user, such as on the system communications board, or for a coach or judge to view and comment on, such as for scoring and/or coaching, for either posting or sending back to the performer so as for them to receive feedback as to their performance thereof. In some instances, the captured images need not be transmitted, but rather can be printed out by an associated printing functionality of the system. Furthermore, as indicated, the system may be configured so as to collect images, but in other instances, the performer or other user may be the one capturing the images, such as when in filming mode. In such an instance, the GUI may include a user record button that can be selected so as to allow a user of the system to capture images that can then be collected by the system so as to be stored and/or displayed thereby. The raw captured images may be collected, tagged, and/or commented on, so as to produce an annotated image, e.g., containing content from the image capturer or other commentator, which commentary may be written, voice, or graphic or image commentary, may be collected and/or transmitted and displayed.

FIG. 6 provides an exemplary embodiment of an intelligent display, such as a heads up display, of an engagement system, which intelligent display may include one or more processing functionalities in addition to a communication module and an onboard database, along with various other electronics of a computing device herein described. The HUD may be positioned throughout an event space, in accordance with the devices and methods disclosed herein, and may be configured for accessing the studio hub of the system. Particularly, in one embodiment, the engagement and/or studio platform provides a graphical user interface by which a user of the system may navigate through a menu of tools that may be employed for a variety of purposes, but notable herein, for performing one or more evaluation and/or coaching operations, as described in detail below.

Accordingly, FIG. 6 presents a heads up display (HUD) that provides a graphical user interface by which a user of the platform, e.g., an event organizer, a coach, advisor, commenter, or even a spectator, and the like, can engage with the system in a manner so as to set up, organize, view the event, and/or can engage with collected content from the event. Hence, in various embodiments, a set of menus may be generated whereby numerous particulars of the event, performers in the event, and performances may be navigated through, and from which one or more options may be selected.

Likewise, once a subject has been selected, the content may further be engaged with via the interactive screen, such as to score the content or provide commentary thereof, or just to learn more about the event particulars and participants. For instance, a coach or commentator may engage the HUD to give instructions, directions, comments on one or more activities of a performer, such as an athlete, in an event, such as a sporting event, e.g., surfing, UFC, MMA, and the like. It is to be noted that although given sporting events have been described, such as a representative example of the system and a variety of its uses, the system can be used as a platform by which to judge, score, compare, comment on, and/or otherwise provide instructions on the performance of one or more tasks, such as at any event or performance.

As depicted, in this instance, the interactive touch screen display of the HUD is showing an event in progress, whereby the event is a surfing event, having a plurality of different sessions, where each session includes a variety of different rounds. In this instance, each round is represented by a wave on which the surfer surfs, but in other instances, a round can represent any periodic occurrence in which a competitor must repeats his or her performance in order to compete in the competition. A time left in the round and/or session is also presented for display. Additionally displayed are the other various competitors in the session, whereby an interactive graphic of the competitors are set forth in the order of their schedule of performance.

For instance, in the presented event, there is a determined order of performance within which order the performers must compete. The system, therefore, may be configured to correspond to the event structure such that it uses the determined order in its presentation format, and can even, as described in FIG. 5, engage with an electronic device worn by the competitors so as to indicate what order the competitors are to compete in, who has priority in the competition, where and when to begin the performance, and the like. In addition to indicating the priority of performance for each performer, the graphic may be interactive and can thereby be engaged with so as to allow a user to view various data pertaining to the selected performer, such as including statistics pertaining to that competitor, which upon selection can be pulled by the system and presented for viewing by the user. A variety of other tools may be provider to the HUD, or other computing device of the system, whereby the user can engage with the selected and/or displayed content.

Accordingly, the HUD, or any suitably configured display of the system may be configured for allowing a user of the system to access a studio engagement hub. The studio engagement hub provides a suite of tools by which to engage with the various content of the system. For instance, in one embodiment, the engagement hub may be configured for generating a dashboard and workspace that along with an associated database may form a studio whereby a user may search for content, select the content to be displayed, and/or can engage with that content, such as to manipulate, comment on, or otherwise interact therewith. For example, FIGS. 7A-7B and 8A-8E, present exemplary embodiments of a dashboard interface of a content studio of the disclosure. As can be seen with respect thereto, the studio dashboard may include a database, which in these instances makeup a library of competitors and/or performances thereof.

Particularly, the system studio may be configurable such that a structured library containing identified content relevant to one or more criteria can be generated and presented to a user for selection thereby for viewing and/or engagement thereof, such as at a workspace of the studio dashboard. Specifically, for engagement with the studio, a graphical user interface of a computing device of the system may present a dashboard interface, which dashboard may further generate a workspace whereby a user may view and/or engage with various content collected by the system. In an exemplary embodiment presented at FIGS. 7A and 7B, the dashboard may include one, two, three, or more designated sections or panels, such as an archive section that will allow a user to search one or more databases and/or generate one or more libraries therefrom, e.g., an architectured library, which libraries may be created so as to present content to a user that is of identified type. For instance, in generating a library, a user search of various databases of the system may be made, whereby the search may be structured based on a date limiter, an event and/or a session or round limiter, a name or performer limiter, and the like.

Figure 7A:
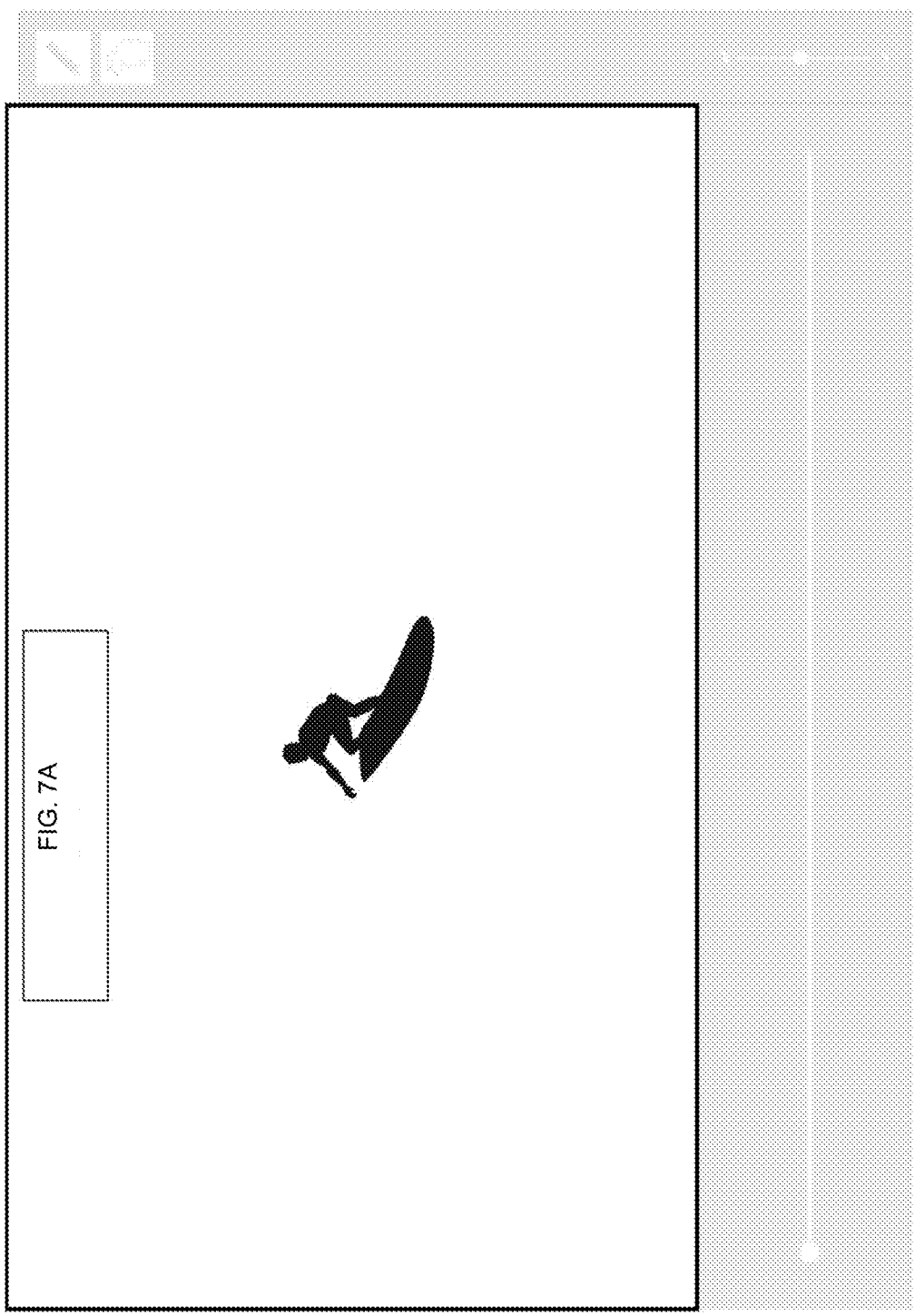
FIG. 7A presents a further exemplary display of a graphical user interface of a computing device for use in one or more methodologies of the system, whereby one or more messages may be recorded and embedded or otherwise associated with the video.
Figure 7B:
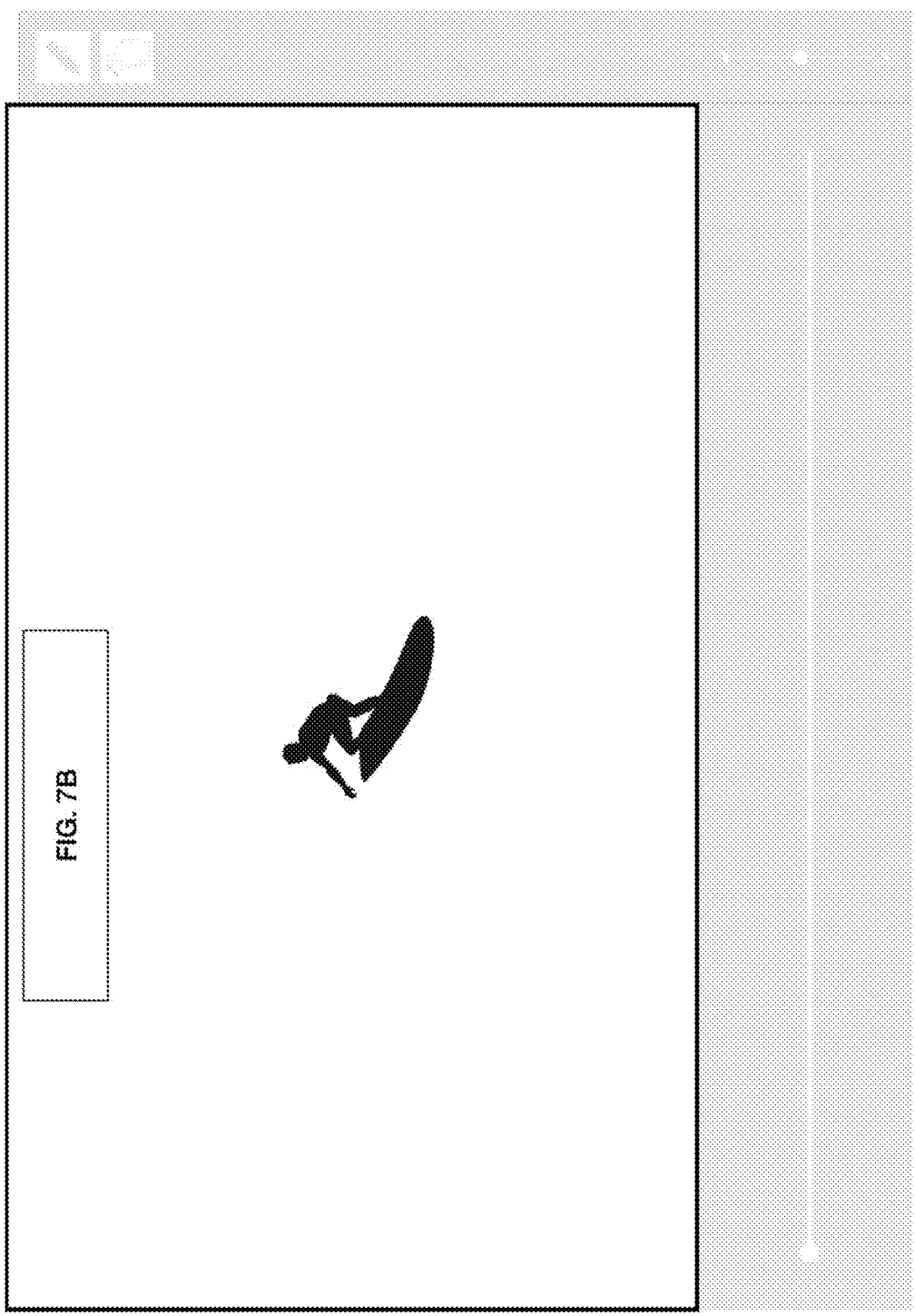
FIG. 7B presents an additional exemplary display of a graphical user interface configured for loading a video selected from a presented library panel at the interactive display panel.

The results of the search can then be presented to the user for selection thereby, which in the instances of FIGS. 6 and 7A-7B are represented by graphics of various competitors in a given heat of an event. FIG. 6 represents the results of a search whereby a performance of an identified performer of an identified session of an identified heat of an identified event are being displayed. FIG. 7A, on the other hand, represents search results just prior to actual selection of the performer and performance having been made. FIG. 7B represents the moment after a performer has been selected, and the content, e.g., performances, pertaining to that performer have been presented at a dashboard panel for selection to a user of the system, whereby a performance of interest has been selected and is presented at a workspace of the studio.

For example, as depicted in FIG. 7A, a search of a database of the system may be made, a library of search results, in this case competitors in an identified event, can then be displayed, and a user can then select the performer who they want to see. In such an instance, once selected, as depicted in FIG. 7B, all of their performances in the designated event within a selected range, e.g., a date range, by that performer will be presented for further selection. Once selected, the content can then be shown at the workspace viewer of the studio dashboard, such as by selecting the chosen content, in this instance, a video, and selecting load, so as to load the content onto the workspace and/or video, such as depicted in FIG. 7A.

Specifically, with respect to the content studio platform, a dashboard interface may be generated at the hub whereby the dashboard includes a workstation space. The workstation space of the studio platform may be employed so as to allow a user of the system, such as a coach or commentator, to engage with various content of the system, such as for the purpose of providing coaching or otherwise commenting on a performance, such as of an athlete in an athletic event. The athletic event may be any event that various participants engage and/or compete, which may be filmed or otherwise used to generate content, such as a surfer in surfing heat, a pitcher or batter or fielder in a baseball game, a quarterback or receiver or other player performing an assigned task in a football game (or practice), a golfer, e.g., practicing their swing, or other athlete performing in a sport (e.g., basketball, soccer, volleyball, wrestling, jujitsu, martial arts, tennis, or other sporting event, including an amateur (NCAA, etc.) or Olympic event, a semi-pro or pro event, and the like. However, in other instances, the event need not be a formal or otherwise sanctioned event. For instance, the event may be a selection of friends competing in an impromptu competition, or a variety of people separated by space and/or time who want to use the client application to form a group or collective and compete against each other while filming each performer's activities.

Accordingly, as described herein, the system, in a basic form, includes a data collector, which in various instances, may be an image capturing device, such as a camera for capturing an image of an actor or other performer performing the various tasks in the event, and a processing unit, such as a server, for processing the images. Typically, a plurality of image capturing devices may be employed so as to capture the performer's or actor's actions from a number of different angles. The imaging devices may be official cameras, e.g., video cameras, or other user's, e.g., spectators' personal cameras, which images may be captured and/or automatically transmitted to the system or a designated user thereof, such as a coach or other evaluator.

Consequently, as depicted in FIG. 7A, a graphical user interface of a computing and/or display device of the system may present a database of collected material, e.g., from a professionally conducted or informal event, and thereby allow an observer or viewer, such as a viewer, performer, commenter, or coach using the system to select content, e.g., a clip, for review and commenting on by the viewer. As explained above, the available content, e.g., video or other image clips, to be presented may be from a variety of sources, formal or informal, at a variety of different times, from a variety of different activities, in a number of different events, from a number of different dates. Hence, the graphical user interface may present one or more menus, such as an event menu for selecting a type of event, such as from a database storing a variety of different events from which to select, and a date menu may also be presented for selecting a date during which the one or more events, e.g., in the selected event category, was conducted. A performer menu may also be presented for selection from.

As can be seen with respect to FIGS. 7A and 7B, these images may be captured and then be immediately processed or may be transmitted to a remote processing unit, such as a server rack of the system, for processing thereby. Once processed, the images may then be presented in a database of selectable images that may then be presented at dashboard interface for selection by a user, such as a coach, or may be distributed and/or otherwise broadcasted directly to one or more recipient devices for display thereby, such as for the receipt of comments and/or instructions by a viewer of the performance.

Particularly, in various embodiments, a library of selectable videos may be generated and/or searched and the results presented in a menu for selection by a user of the system. More particularly, as can be seen, a variety of available content, e.g., videos, that meet the search results may be presented, whereby the videos to be selected from the library may be organized and presented by any of a number of criteria, such as based on the actor or participant, in this instance surfers, based on the event, based on the sport or activity, based on the quality, e.g. score, of the performance, or any other suitable category. In such an instance, the user, evaluator, or coach, etc. can select a video to be viewed by clicking on an image or icon of the participant, e.g., surfer, and in some instances, the selected content may be directly loaded into the workspace, or may be loaded by selecting the load button, such as in multi-screen mode, so as to bring up the selected video for viewing, sharing, commenting on, and/or coaching, and the like.

Specifically, as illustrated in FIG. 7B, a desktop workspace and/or viewer of the system can be configured to capture or otherwise obtain an image of an actor or other performer engaged in an event. Once captured, the image may then be displayed via a dashboard interface at one or more displays, e.g., HUDs, of the system, such as in substantially real time. In this instance, the activity is surfing, and the event is a surfing competition. The pertinent details of the competition can also be presented at the graphical interface of the HUD, such as in a menu or ribbon positioned along a top horizontal or vertical side portion of the display screen.

Specifically, as can be seen with respect to FIGS. 7A and 7B, the dashboard interface may present a number of panels, such as a search panel, for performing a search for content, and a view panel, such as for viewing selected content. Likewise, one or more tools panels for controlling the dashboard, such as for controlling the playing of a selected video may also be presented as part of the dashboard. More specifically, in this instance, at a left-hand panel of the dashboard, the results of an event search are displayed, where the search results have been limited by a date, e.g., of the event, demarcation, a session demarcation, a round, e.g., a wave, demarcation, and type classification are presented. Further categories specific to the competition can also be used to limit the search results. Additionally, as depicted, content fitting within all of the selected search categories that are available for selection and viewing are also presented in the left-hand panel. Additional tools are further displayed for use at a bottom portion or panel of the workspace, for use in engaging with the selected content.

In various embodiments, pertinent information that may be desired for quick access may be presented as an icon within any of a top or a bottom or even a side ribbon. In the instance of FIG. 7B, a top ribbon is presented, wherein the top ribbon displays the elements available for being accessed, which as shown include: the session or heat number, e.g., the $1^{st}$, $2^{nd}$, $3^{rd}$, $4^{th}$, etc., the number of performances, such as the wave number (in this instance), number of pitches or swings, number of swings of a golf club, number of passes thrown, number of rounds completed, and the like. The time remaining in the session or heat or performance may also be presented. Likewise, the competitors in the competition or event or heat may also be presented, such as in the top ribbon, e.g., for ease of reference. Other icons representing other categories of quick reference may also be presented, in one or more ribbons. Additionally, further useful user pertinent information may also be presented, e.g., in one or more ribbons, such as the time of day, the date, location, the nature of the event, the conditions, such as weather condition, and the like.

As set forth in FIGS. 7A and 7B, a search panel is presented, wherein the search panel displays the results of a performed search, whereby the search was delimited by one or more of a session selection, a round (wave) selection, a type selection, and a classification selection. In these instances, a variety of drop down menus are provided so as to allow the viewer, e.g., coach, commentator, or other evaluator, to select from a number of heats, rounds, sessions, or performances, such as from a number of different performances that were performed during the selected date and/or for the selected event category. A free search box may also be provided to perform one or more free language searches. The results of the search may then be displayed at a panel of the dashboard.

Particularly, as depicted at FIG. 7A, a listing of participants that perform in the selected event category and/or during the selected event and/or event date is displayed. It is to be noted that, in various embodiments, so as to help navigation through the one or more menus, the different menu items may be interactive and self-limiting, such that a selection from one menu, such as an event or activity menu, limits the selectable content of the other menus. In a manner such as this, it will not matter from which menu the viewer makes a first selection, the fact that they make one selection can serve to better narrow down the other viewable selections, thus, making navigation easier.

Particularly, once an event has been selected, a date identified, and a session designated, a search can be performed and a listing of the available content, e.g., video clips, available to be viewed, may be presented. For instance, as shown with reference to FIG. 7A, a list of performers having competed in the event, having content that can be viewed, and falling within the search parameters may be presented. Likewise, as depicted in FIG. 7B, once a given performer has been selected, the available content, e.g., video clips, may be presented whereby a thumbnail of video clips demarcating the various different performances of a competitor that can be selected from can be displayed. In this manner, a list of videos may be presented demarcating all the video clips from a selected participant in the event from a number of different heats.

Hence, the graphical user interface may present a number of different clips from which the viewer, e.g., coach or other evaluator, may select. Once selected, the GUI may display, such as at a workspace panel of the interface, the selected clip, which can then be viewed and commented on, or otherwise interacted with, at the workspace. For example, as can be seen with reference to FIG. 7B, the selected content may be presented at a display screen interface of the GUI, from which screen the performers performance in the event may be viewed and/or otherwise engaged with. A control panel showing the time during which the performance occurred and providing controls by which to control the playing of the video may also be displayed thereby allowing the viewer to toggle through the performance, moving forwards and backwards, and/or stopping or pausing, as desired.

As can be seen with respect to FIG. 7B, a ribbon positioned at the top of the display panel may be presented at the dashboard, such as where characteristic data describing one or more features of the selected event, heat, and/or competitors thereof may be presented. Specifically, the ribbon may show the particulars of the current event that is being viewed, e.g., real time, or may show the particulars of a selected result of a search query, e.g., from a past performance, that is currently being viewed. In this manner, the event ribbon may present one or more elements of the selected content that can be presented for viewing and/or engagement.

Figure 8B:
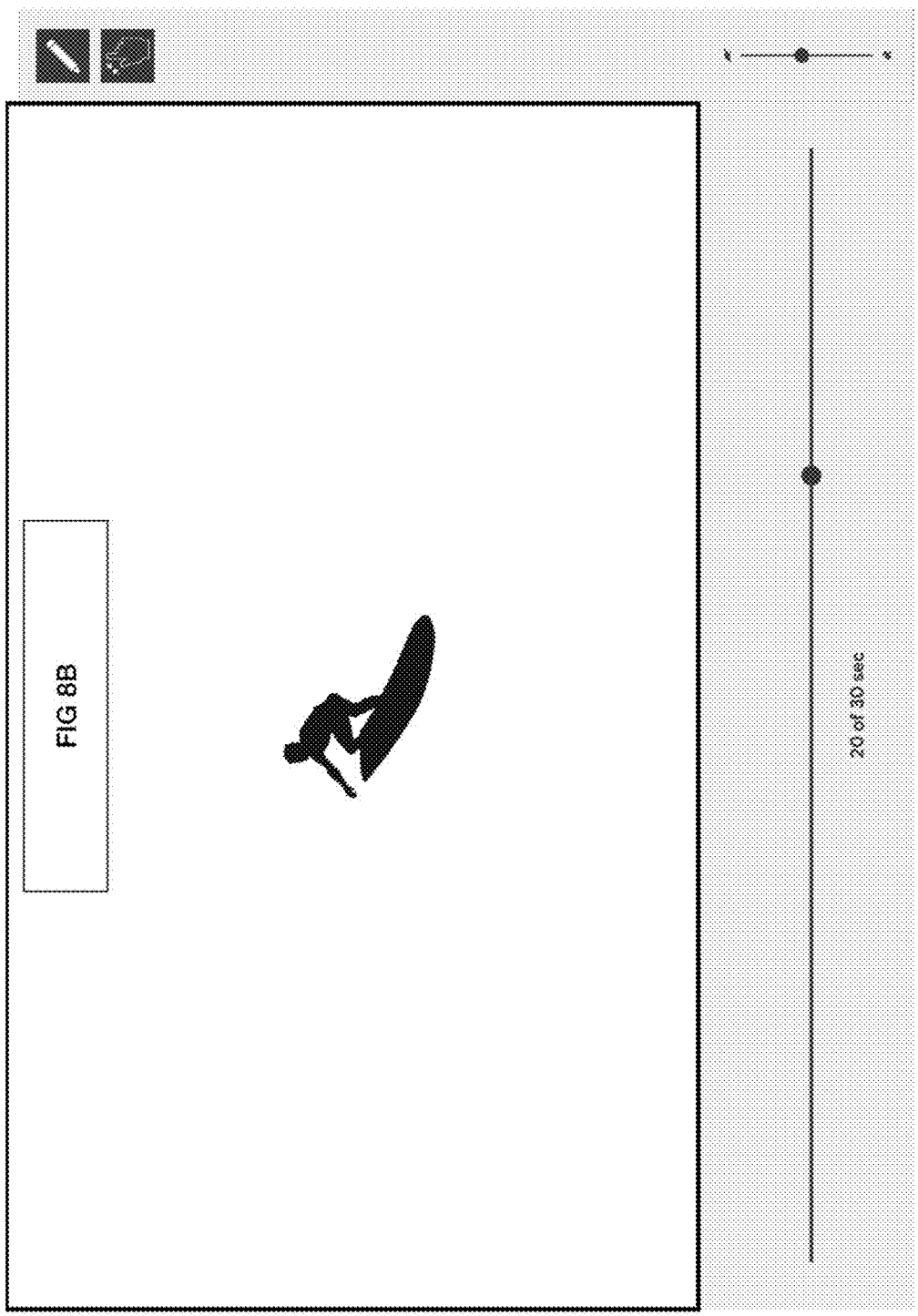
FIG. 8B presents a further exemplary interactive display panel of a graphical user interface of the system where the interactive display panel includes a tool configured for recording a message to be associated with a displayed video.
Figure 8F:
FIG. 8F provides another exemplary implementation of the graphical user interface.

Further, as can be seen with respect to FIGS. 7 and 8, the studio dashboard may generate or otherwise provide a workspace within which workspace selected content can be engaged. The engagement can range from the simple controlling of the playing of the selected content, the recording of messages to be associated with the content, the tagging of individuals or things within the content, and the sharing of the content. Particularly, FIG. 7A provides an example of a workstation interface that includes controls for loading and playing selected content, as well as for recording one or more messages that can then be embedded or otherwise associated with the selected content. And FIG. 7B provides a workstation whereby a user can play, stop, pauses, fast forward, reverse, and skip the playing of the video.

Additionally, the workstation may include an interface by which to tag one or more individuals or things within the video and/or to share the video. FIGS. 8A-8E provide a variety of other tools that may be employed so as to interact with selected content. In this manner, the viewer, e.g., coach, can control the playing of the clip, and can then interact with the clip so as to provide feedback, such as to the performer therein. For instance, the coach or other evaluator, may view the performance, e.g., of a participant, and use the tool bar to select a tool by which to interact with the clip. For example, as depicted in FIGS. 8A and 8B a pen or pencil like tool may be provided, whereby the pen, e.g., a color tool, or pencil may be used to allow drawing on the display interface, such as for providing written comments that can be embedded within the video content. In various instances, a typing tool can be used for the typing of comments, e.g., by the viewer, and a highlight or graphics feature may be used to highlight or otherwise demarcate a feature about which to be discussed. An eraser tool for erasing and/or otherwise deleting commenting may also be provided.

In particular instances, the display screen, e.g., a workstation portion thereof, can be a split display screen such as to present a plurality of panels whereby at a first panel, one clip from one performer may be viewed, commented on, and/or compared against a performance by another performer being displayed at another panel. In this manner, the performance of one performer can be easily compared against the performance of another performer. In particular instances, the performances to be displayed and/or compared and/or engaged with may be from the same performer, however, at different times and/or at different events or heats. In such instances, a plurality of screens or panels may be provided, and a corresponding plurality of control interfaces may be presented. In this manner, the flow and/or control of one performance may be viewed and/or controlled independently of one another, or the plurality of performance may be configured such that they may be compared along the same timing.

The workspace provides a panel within which to engage with selected content, which engagement may be viewed by the user, and/or may be transmitted for display at another workspace of another client computing device of the system. Accordingly, in various embodiments, the dashboard of the graphical user interface may be presented on a multiplicity of different computing devices, such at a first device being employed by a viewer that is to comment on the performance of a performer of an event, and may further be presented at a second device being employed by a viewer, such as a performer, who is interested in receiving input on their performance, such as by the first viewer, e.g., coach. In this manner, the interactive, communication platform may be employed in a method so as to allow a performer to view their performance, such as at a GUI presented on a first computing device, at a first time, and at the same or a later time, the performance may be viewed by a second viewer, where the second viewer may be a coach or other commenter who views the event and takes one or more actions with respect thereto, such as by engaging the tools menu so as to interact with the displayed clip, such as to demarcate actions that can be highlighted and/or commented on so as to give feedback to the performer with respect to their performance.

Consequently, in various embodiments, a system for providing comments or coaching on a performance of a performer in an event is provided, whereby the system includes a plurality of computing devices. Particularly, the system may include a plurality of client application programs distributed to a corresponding plurality of computing, e.g., mobile, devices having an interactive display, such as where each client application program is configured to present a graphical user interface, e.g., at an interactive display, of the computing device. Specifically, a coaching graphical user interface may be presented at a display of the first and second computing device whereby the display of the presentation is configured to correspond between the two different devices in such a manner that an interaction performed at one display is displayed at the second display, such as substantially contemporaneously so as to thereby allow for the distributed and real-time coaching of the performance of a performer of the event, such as via corresponding client applications running on the respective first and second computing devices.

Likewise, as indicated, the client application may present one or more application tools for one viewer of the event to communicate such as through one or more inputs with another viewer, such as via the presented workspace provided at the graphical user interface. Accordingly, in addition to a first and second computing device, the coaching platform may include a suitably configured server system connected with the plurality of client computers via the client application programs, e.g., over a communication network. In such an instance, the server may be configured to synchronize the displaying of the events on the two or more different computing devices, such that transmission at a graphical user interface of an action entered at one display at one computing device may be seen, substantially contemporaneously, on the screen of the second computing device, such that presentation to each of the plurality of client application programs for display, e.g., in the interactive display, is viewable by each device at substantially the same time.

In view of the above, FIGS. 8A-8E provide exemplary embodiments of an engagement system that is configured as a coaching platform in accordance with the devices and methods disclosed herein. Particularly, the coaching platform of FIG. 8 provides a workspace presented at a graphical user interface by which a user of the coaching system may navigate through a menu of tools that may be employed for a variety of purposes, but notable herein, for performing one or more coaching operations. More particularly, as can be seen with respect to FIG. 8A, a heads up display (HUD) is presented. The HUD provides a graphical user interface by which a user of the platform, e.g., a coach, advisor, commenter, and the like, can engage with the system in a manner so as to coach, give instructions, directions, comments on one or more activities of a performer, such as an athlete, in an event, such as a sporting, e.g., a surfing event.

It is to be noted that although surfing is displayed as a representative example of the system and a variety of its uses, the system can be used as a platform by which to judge, score, compare, comment on, and/or otherwise provide instructions on the performance of one or more tasks, such as at any event or performance.

For instance, as can be seen with respect to FIG. 8A, the system may be configured for presenting and/or storing a live or a pre-recorded event, which can then be played or played back and controlled via direct interaction with the display screen, e.g., through touch, or via one or more control mechanisms. Particularly, in various embodiments, a "tools" menu may be presented whereby one or more tools are made accessible to the viewer so as to allow them to interact with a presentation, such as a selected video clip or sequence of photos, e.g., digital photos, such as to allow the viewer to comment on the content of the presentation. More particularly, the workspace of the interactive display of the graphical user interface may present a filmed clip, e.g., of a performer performing an activity in an event, and further present a tools menu, whereby the tools menu provides a number of tools by which the viewer can use to interact with, e.g., comment on, a performance of the activity by the performer in the event. In certain instances, the tools menu may include a pen or marker feature, an eraser, a paint brush feature, a letter and/or font feature, an underline, italicize, or bold feature, a microphone, a flag, a zoom in or out feature, a systems preference feature, a discard feature, and the like.

For example, in one specific embodiment, as presented at FIG. 8B, a playback and/or sharing interface is presented, whereby a menu of images, such as previously recorded images of one or more actors, e.g., athletes, participating in one or more sessions of an event may be stored and presented for viewing, editing, commenting, and sharing. Accordingly, the system and its components may be configured for not only capturing an image but distributing it for display by one or more users of the system, such as at a display of client computing device, such as mobile computing device like a mobile phone or tablet computer. Hence, in particular embodiments, the event may be live, and the activities of the participants being displayed at a display of the system may be real or near real time. Consequently, the captured images may be streamed live, or may be pre-recorded and may be selected for playing through the GUI.

In either instance, the display screen may be a touchscreen whereby the user can navigate through the various menus and selections by interacting, e.g., via touch, with the screen directly. Thus, a user of the system, e.g., a viewer, can navigate through the menus and controls so as to direct the playback of the captured images, e.g., the video streaming, such as with respect to rewinding, fast-forwarding, slow motion playing, and the like. Past and upcoming events or sessions may also be accessed through this screen. It is to be noted that the images captured or being captured can be from a previous event, or a present event that is contemporaneously being viewed, filmed, recorded, and/or stored. Once recorded, the videos can be organized into libraries by one or more parameters or characteristics, such as by the various different heats or sessions of the events, the different actions taken, e.g., waves surfed, balls thrown or hit, and the like, by the type of activity, identity of the performer or group of performers, or other manners by which the events disclosed herein can be categorized.

Consequently, the graphical user interface may allow an observer or viewer, such as a viewer, performer, or coach, to select a clip for review and/or commenting on by the viewer. As illustrated in FIG. 8B, a play and pause button may be provided for playing and pausing the video, and a record button may be provided for recording one or more voice messages that can be associated with the captured video content being displayed and viewed. Once the recording has been completed, the modified video content can then be stored in the system, and/or be transmitted to another system user for viewing.

In particular instances, the clips to be presented may be from a variety of sources, at a variety of different times, from a variety of different activities in a number of different events from a number of different dates. Hence, as can be seen with respect to FIGS. 8B-8C, the graphical user interface may present an event menu for selecting a type of event from which to select content to be viewed, such as from a database storing a variety of different events. A variety of different menus from which to delimit content to be searched, such as freeform or via one or more menus, and viewed may also be provided. For example, a date menu may be presented for selecting a date during which the one or more events, e.g., in the selected event category, was conducted. Likewise, a heat, round, and/or sessions menu may be presented so as to allow the viewer, e.g., coach, to select from a number of sessions, or performances, such as from a number of different performances that were performed during the selected date and/or for the selected event category.

Another selection option that may be presented at the GUI is a listing of participants that performed, or are performing, in the selected event category and/or during the selected event and/or event date. It is to be noted that these different menu items may be interactive and self-limiting, such that a selection from one menu, such as an event or activity menu, limits the selectable content of the other menus. In a manner such as this, it will not matter from which menu the viewer makes a first selection, the fact that they make one selection can serve to better narrow down the other viewable selections, thus, making navigation easier.

Likewise, as depicted at FIG. 8C, a menu of selectable videos may be presented for selection and viewing. Particularly, a menu or table of menus of selectable videos is presented at the user interface, where the table is divided into a number of categories, such as based on the particulars of an event that is taking, or has taken, place. For instance, an event or a competition can include a number of participants performing a number of different techniques and/or maneuver's in the competition, whereby one or more judges, and/or a crowd, evaluates the performances based on each performers' ability to perform the techniques in comparison to one another. In various embodiments, each performance of the various competitors in the competition can be captured and/or otherwise be collected by the system, such as video content, whereby the content can be classified and/or stored within one more libraries of a database of the system.

For instance, the system, or a user thereof, can analyze the collected video, and can classify it in accordance with a variety categories. Particularly, the video, the performers therein, and its contents, can be analyzed and used to classify the video so as to be stored with in one or more categories of one or more structured libraries of the database. More particularly, the system can embed the video with metadata defining the video by its content, such that it can be stored and easily be searched and retrieved by the system. For example, the video can be classified based on the event, the event date, the various sessions, rounds, or heats conducted, the type of activities, e.g., maneuvers, performed, the round particulars, such as the wave number, number of at bats, number of holes played, and the like.

Hence, in accordance with the embodiment of FIG. 8C, a system generated user dashboard is provided, such as where a variety of images, in this instance videos, are presented, such as at a workspace of the dashboard. Specifically, as can be seen with respect to FIG. 8C, the database of content, e.g., video content, can be searched by one or more classifications and/or categories. In this instance, the search being performed is for the purpose of identifying all content that include an image of a surfer in a barrel of wave. As indicated, the search results may be further delimited by one or more other classifications, such as by whether the event is a professional or an armature event, whether the surfer has a regular or goofy footed stance, whether the competitor is a male or a female, whether the surfer is surfing front side or back side, performing a particular maneuver, such as a cutback, and the like. Hence, the captured content, e.g., videos, of the system can be organized and stored within a database of the system, and then the various libraries of stored content can be presented to the dashboard and can then be navigated by a number of different categories, such as by date, e.g., date of the event, the selected heat or session, or the participant performing the activity in the event, and the like.

Accordingly, once an event has been selected, a date identified, a session designated, a listing of the clips, e.g., video clips, available to be viewed may be presented. In various embodiments, the list may be a selection of thumbnails representing the videos from which a selection may be made. For instance, as depicted in FIG. 8B, a menu of video clips may be presented whereby the thumbnails of the video clips are presented at a display of the device. The presented thumbnails demarcate the various different performances from the various different participants in the events from which a selection can be made in accordance with the search criteria. For instance, the videos may be presented and selected based on a search of specific events, heats, participants, and the like, whereby all the videos that meet all of the search criteria may be presented at the dashboard interface. Hence, the graphical user interface may present a number of different clips from which the viewer, e.g., coach may select.

Likewise, as depicted at FIG. 8D, once an identified video has been selected, the GUI may display, such as at a workspace interface of the dashboard, the selected clip which can then be commented on, or otherwise interacted with. For example, in this instance, a video of a performer may be accessed by the system and presented at a display panel whereby the performers performance in the event may be viewed. An informational ribbon may also be generated at the dashboard showing various particulars of the video, such as the event wherein the performance takes place, the performance, the time during which the performance occurs, who is performing, and the like, may also displayed. Further, a control panel may be generated so as to allow the viewer to toggle through the performance, moving forwards and backwards and/or stopping or pausing, as desired.

In this particular instance, a variety of performers who were competing against one another in an event, session, and/or heat specified by a search query have been identified and are provided at the display screen. In such an instance, a user of the dashboard may then employ the tools of the dashboard interface to tag the performer and thereby embed the video with one or more particulars of the event and/or with respect to the identity of the performer engaging in the event. Once tagged the video can be stored within a categorized database of the system and/or transmitted to one or more others. Particularly, as depicted in FIG. 8E, once a video has been presented to the workspace and/or interacted therewith, the video, or other content, can then be transmitted to one or more others, such as by being distributed thereto over a network interface of the system. In various instances, the tagged video may be directly emailed and/or texted to a third party's mobile computing device, such as by entering their email and/or phone number into a distribution interface of the system.

In view of the above, in one aspect, as depicted in FIGS. 9A-9G, the system may be configured for allowing generated or otherwise captured content to be interacted with such as for the purpose of evaluating, coaching, or otherwise commenting on the content or its subject matter. For instance, in various embodiments, a dashboard workspace is provided wherein selected content, e.g., video content, may be engaged with. Particularly, in various instances, the workspace may present one or more panels, e.g., display panels, by which to view and/or engage with the content of a collected video. More particularly, at FIG. 9A a plurality of computing devices and/or displays thereof are provided, whereby one display presents a workspace within which a selected video may be viewed, while the other computing device provides a workspace whereby the same selected video may not only be viewed but may be engaged. In this instance, each view panel of the respective workspaces is provided at a separate computing device. However, in other instances, the work spaces may be generated as a plurality of display panels at a single dashboard interface of a single computing device, whereby in one view panel a selected video may be viewed, while in a second view panel an engagement operation may be performed, such as with respect to that selected view panel.

Figure 9A:
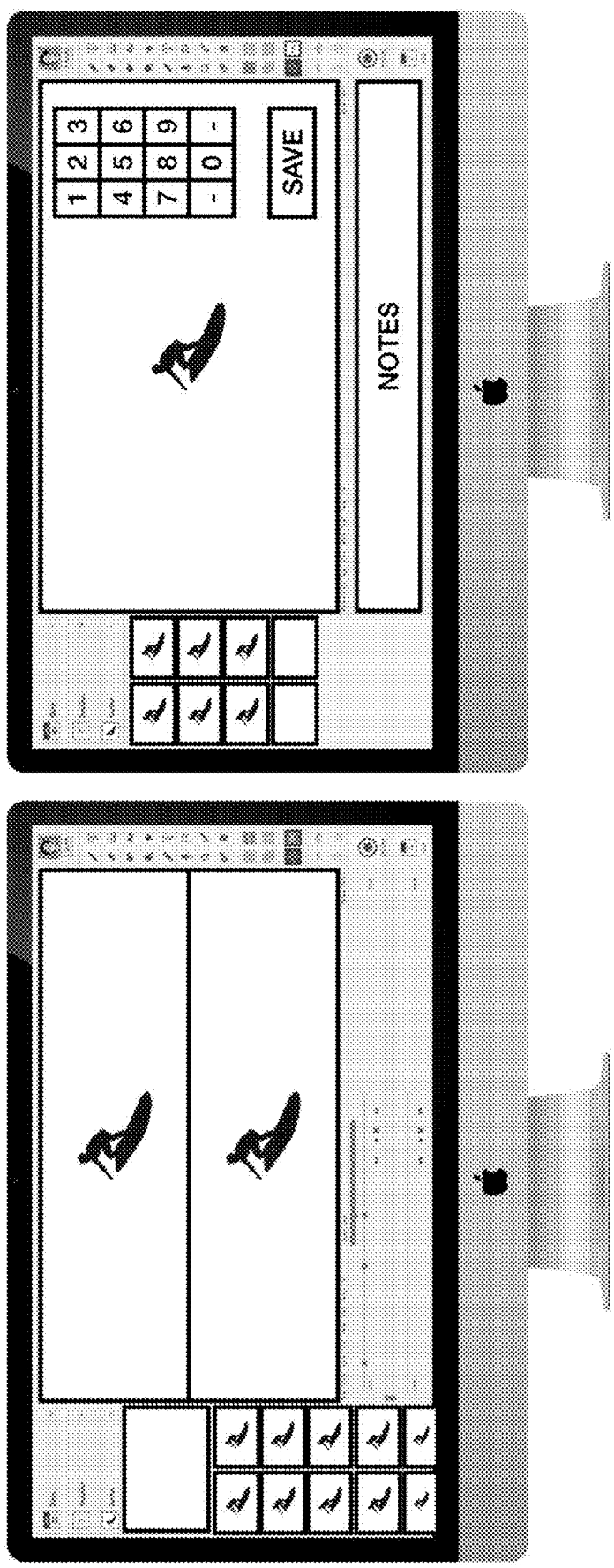
FIG. 9A presents a plurality of exemplary computing devices of the system for presenting respective graphical user interfaces, where each graphical user interface exhibits an interactive display panel displaying one or more selected videos.

Accordingly, in various embodiments, the system may be configured for providing a platform by which to view and/or engage with collected content. For instance, as depicted in FIG. 9A, the selected content may be interacted with such as to score a performer in an activity of an event. For example, a workspace may be provided whereby a performance by a participant in an event may be viewed, e.g., in one panel, while in another panel, a scoring matrix may be provided so as to score the participant's performance. A text box may be provided within which one or more comments may be posted such that the score and/or comments can then be embedded into, or otherwise associated with, the video so as to be transmitted therewith. With respect to performing one or more scoring methodologies and with regard to configuring the present system so as to perform such scoring, the present disclosure refers to U.S. Pat. No. 10,322,330, entitled: SYSTEMS, DEVICES, AND METHODS EMPLOYING THE SAME FOR ENHANCING AUDIENCE ENGAGEMENT IN A COMPETITION OR PERFORMANCE, the contents of which are incorporated by reference in its entirety for all purposes.

Figure 9B:
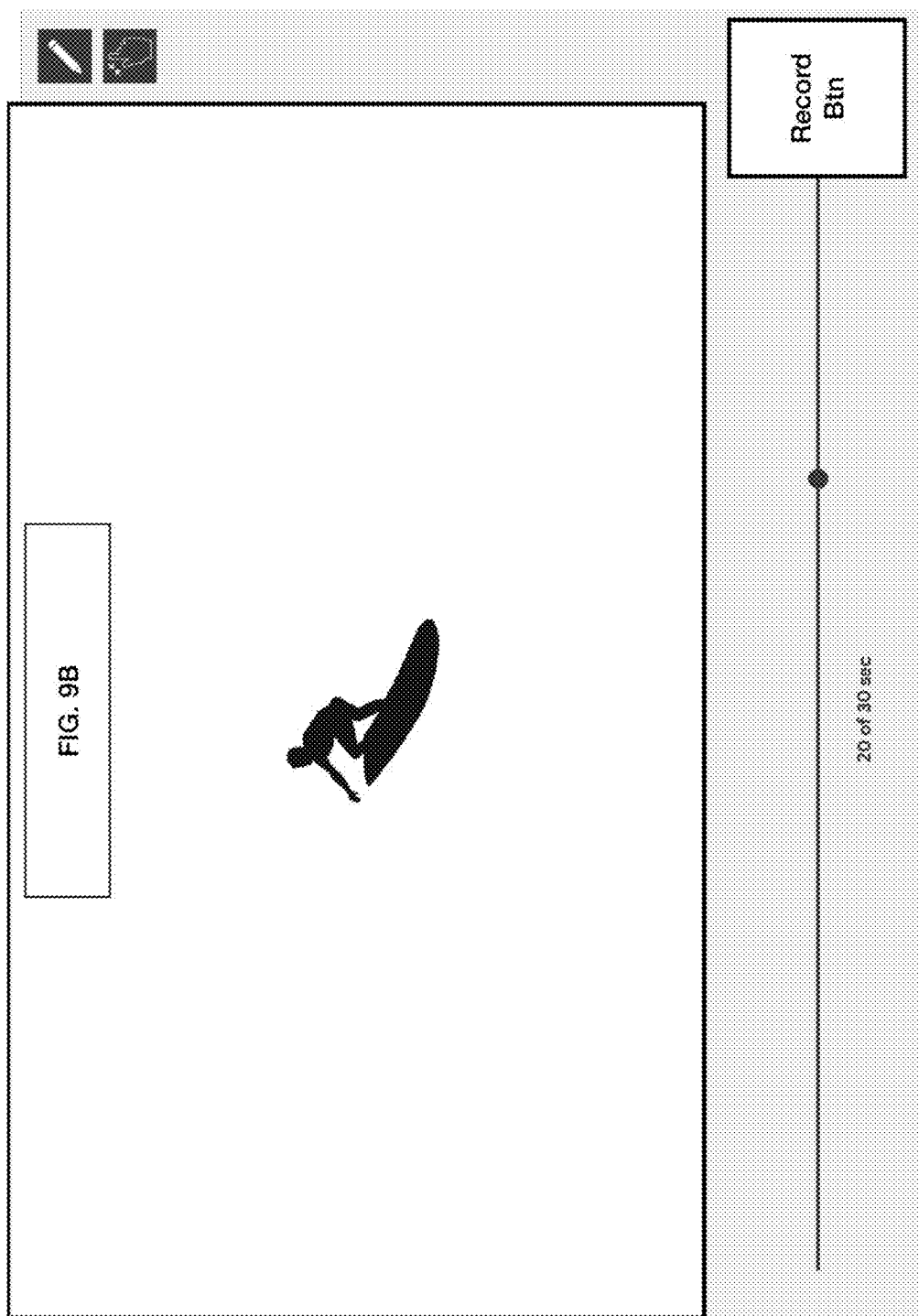
FIG. 9B presents an exemplary interactive display panel displaying a selected video, where a tools panel allows a user to interact with the displayed video.

Further, as set forth in FIG. 9B, in other embodiments, the system may be configured for providing another iteration of the platform by which to view and/or provide more specific coaching to a performer with respect to their performance of an activity. For instance, in FIG. 9B, a dashboard is provided as part of a coaching platform that may be presented to a user, e.g., a coach, employing the system to provided instruction to one or more performers in the event. As depicted, the dashboard may be divided into a variety of different panels. For example, in one panel, a search function may be provided where a variety of search criteria may be selected for performing a search function, and the results thereof may be displayed. In this instance, the search panel presents a plurality of drop down menus providing various options for searching video content, and further provides a thumbnail for each of the search results representing videos that are available to be selected for viewing and commenting.

Particularly, the system includes a library of images that can be selected to be viewed, edited, and/or otherwise commented upon. The images may be still frames or videos, and may be categorized and stored in the system based on a number of parameters. The images may be any images, but will typically be images captured by a system component or uploaded into the system by a user of the system. The images may be tagged and/or include a series of metadata for storing the images within a structured database and/or ease of searching for particular images. In this instance, the search results were limited by the event presented, by the date of the event, by the participants in the events, and/or by the activities of the event. More particularly, a variety of menus, e.g., drop down menus, are presented whereby the menus include data fields, for entry or selection, such as where the data fields include one or more delimiters, such as a date limiter, an event limiter, an activity or competition limiter, a heat or session limiter, a description limiter, e.g., waves or innings or quarters or halves or holes, etc. limiter, a performer limiter, and the like.

In various embodiments, the data used by which to organize the collected content and/or to form the menus may be entered into the system manually, such as by the event organizer or system administrator. However, in other embodiments, the system itself may collect, tag, categorize, and/or store the data, such as by recognizing the presence of various data fields of the captured images, collecting the images, and tagging them, which tagging may include adding a descriptor of all of the salient fields by which the collected and/or storable image may be identified, stored, and searched for easier pin-pointing and retrieval. Such tagging may be automatically performed by the system, by a system administrator, or by another user of the system, such as by the person actively capturing the images.

In any instance, once collected the various images may be tagged, categorized, searched, and retrieved, such as by a coach, performer, or other user of the system, such as a spectator or commentator. For instance, a coach or commentator may fill out the appropriate data fields designating the person(s) and/or events, etc. that include the images, e.g., videos, that the coach wants to comment on. Once the appropriate search fields have been filled out or otherwise entered, a listing of visible videos will then be presented from which list the coach may select the appropriate video to engage with. The selected video may then be presented in an interactive screen portion of the user interface. In such an instance, the coach can select, such as by clicking on, the video, and the selected video will be presented at a workspace of the graphical user interface of the system.

Accordingly, in another panel of the dashboard, various control options and/or tools by which to effectuate the coaching may be provided. Particularly, a menu of command or control features may be provided such as where the control features include a play button, stop, pause, fast advance, a fast reverse, a jump advance, and/or a jump reverse. A time elapsed display may also be presented to show the time or duration during which the images are taking place, e.g., sequentially. In various embodiments, a toggle may be provided so as to allow fine control and navigation of the sequence of captured images. A record button allowing the coach to record his or her voice comments during which the performance is being replayed may also be provided. In such an instance, the recording can be embedded into the images so as to coincide the comments with the actions taking place during the performance. Hence, the coaching can be performed real time between the coach and the performer, such as contemporaneous with the performance or after the performance, or the coaching of the performer may be conducted at one time, and the performer may later bring up the commented and/or coached video for review thereby at some time after the coach or commenter has made their comments.

Additionally, as depicted in FIG. 9B, a variety of control features may be presented so as to allow the coach to comment on the performance of the actor. Particularly, a commenting feature may be included so as to allow the user to write or record a comment that can be posted. The comments can be a score or other instructions for remarking on the performance of one or more activities preformed in the event. More particularly, in various instances, a control panel of the dashboard may provide a variety of tools that allow a user, such as a coach, to provide specific commentary to the performer with respect to his or her conducting of a series of activities that the performer engages in when participating in the performance.

Figure 9C:
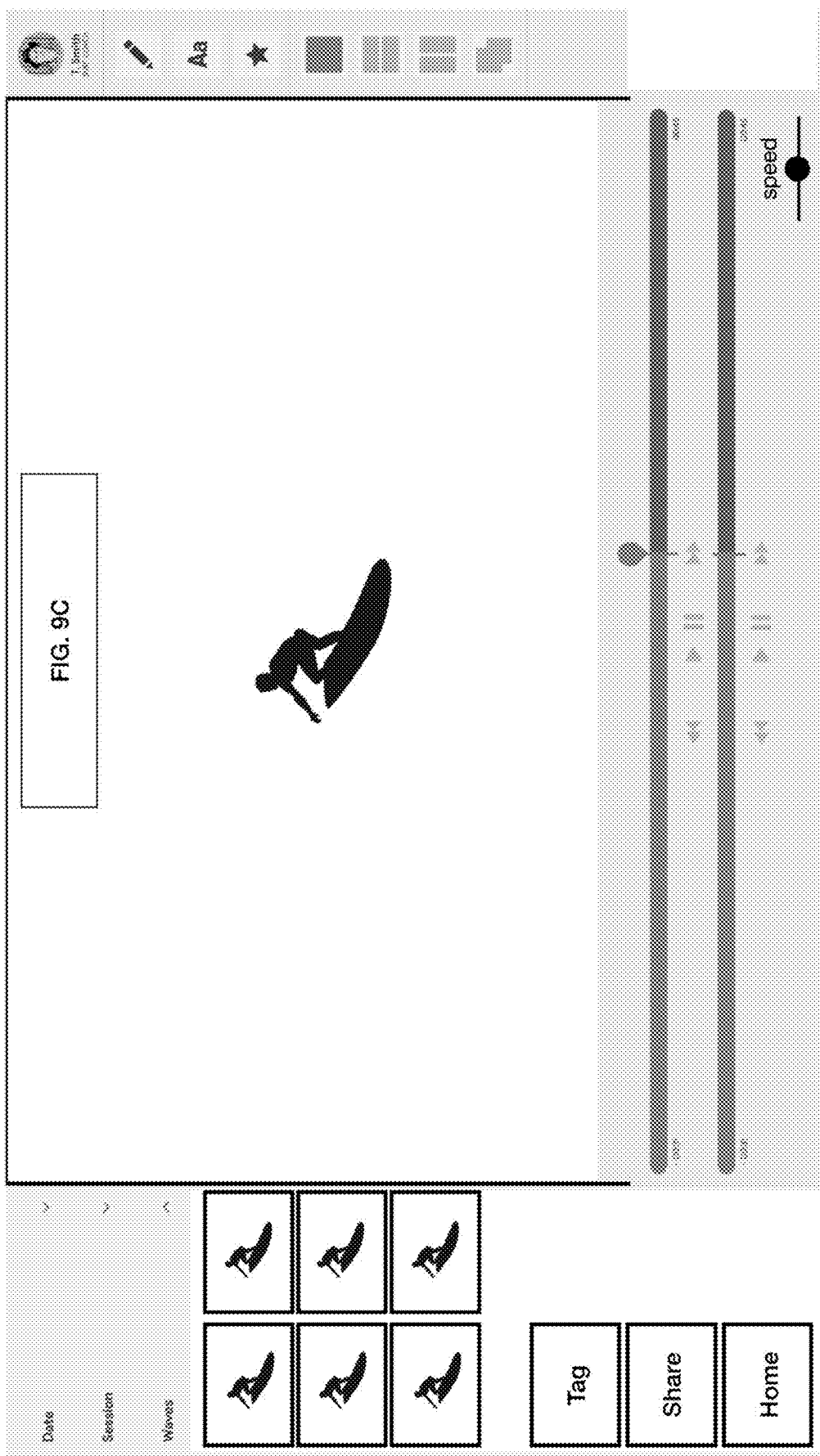
FIG. 9C presents another embodiment of an exemplary interactive display panel displaying a selected video, where a tools panel allows a user to interact with the displayed video.

Specifically, as can be seen with respect to FIGS. 9B and 9C, typically the selected videos may be selected on the basis of having some commonality, so as to compare the one with the other, but in some instances the videos can be somewhat or completely be unrelated. So being, in various instances, the commenter and/or coach may add written or spoken dialog comments to be embedded with videos, such as via use of the one or more tools provided. Likewise, where the viewer is not a coach, the viewer can additionally comment and/or score the actions of the two performers, such as where the purpose of viewing the two videos in conjunction with one another, e.g., side by side, is for the purpose of determining, e.g., judging, who did it better, so as to better score the content.

In such an instance, as can be seen with respect to FIG. 9C, two control features may be presented for controlling the playback of the images either separately or in conjunction with one another, such as by selecting a linked/unlinked button. Likewise, as depicted in FIG. 9A, the viewer can score the activities or the complete performance itself, for each separate video presentation. Additionally, the coach or viewer can also tag the various participants or their activities and/or may point out areas of focus that need to be attended to so as to enhance the performer's performance in the activity and/or overall event. Different scores can also be imbedded based on each activity, maneuver, or routine that the performer engages in, which at the end of the performance may be summed to give a final score for the performance.

As indicated in FIGS. 9B and 9C, a "tools" menu may be presented, such as in a separate and/or associated panel, whereby one or more tools may be made accessible to the viewer so as to allow them to interact with a presentation, such as a video clip or sequence of photos, e.g., digital photos, so as to allow the viewer to comment on the content of the presentation. Particularly, the interactive display of the graphical user interface, e.g., of the HUD, or other display of another computing device of the system, may present a filmed clip, e.g., of a performer performing an activity in an event, and further present a tools menu, whereby the tools menu provides a number of tools by which the viewer can use to interact with, e.g., comment on, a performance of the activity by the performer in the event.

In certain instances, the tools menu may include a pen or marker feature, an eraser, a paint brush feature, a letter and/or a font feature, an underline, italicize, or bold feature, a microphone, a flag, a zoom in or out feature, a systems preference feature, a discard feature, one or more hot keys, such as an icon symbol, such as a star or happy face, and the like. In one particular instance, the workspace may provide a controller by which to view the content and/or may allow for playing, rewinding, and fast forwarding the material. Likewise, in various embodiments, a record option may be provided so as to allow a user of the system to record a message that may be associated with the content, which can then be transmitted, e.g., to the performer in the content being viewed.

Particularly, a writing or marking tool may be provided whereby the coach can draw on the images being viewed and/or embed a dialog box, e.g., for typed out text, which can be embedded into the video, still frames, or other content. Also, where a video image is stored, one or more still frames may be captured from the video such as by use of a still frame capture tool. Likewise, where a series of still frames have been captured, a video or automation may be formed by linking the still frame images together, such as by an automation tool. One or more hot keys may also be provided, such as to allow quick comments to be applied to the images, or a portion thereof, such as to quickly highlight sections, e.g., actions, of interest. A variety of configurations of hot keys can be present, such as one or more emojis and/or avatars, a star sign, a plus, a minus, a number, a smiley or frowning face, a +1, a −1, an up or down arrow, and the like.

An additional feature of the platform is that a plurality of images and/or videos can be selected to be played in a plurality of view panels, such as within the same workspace, such as in a side by side or top to bottom configuration. A dual or multi panel workspace can be generated by clicking on a respective icon representation in the tools menu. In such an instance, a plurality of view panels may be generated at the dashboard workspace whereby the various panels of the workspace can be engaged with independently or in a corresponding fashion with one another.

Hence, as depicted in FIGS. 9B and 9C, the workspace within the dashboard may include two or more separate panels, e.g., display portions or boxes, by which selected images can be presented, e.g., side by side or where one is on top of the other. In such an instance, the images or videos can be played right next to one another so as to be able to view and compare one video with the other so as to compare one performer against another doing the same activity. Alternatively, images portraying the same performer performing the same activity at different times may be presented in respective view or engagement panels. Of course, the videos to be selected may be from a variety of different performers, performing a variety of different events, at a plurality of different times.

For instance, FIG. 9D presents two selected videos from a database of the system for viewing, scoring, and/or coaching. In this instance, the videos are of two different surfers surfing on the same wave at different times, so as to allow the coach and/or judge, commenter, and/or viewer to view and compare the two performances in a coordinated fashion. In this instance the videos are displayed with one video being on top of the other. It is to be noted that although the event happens to be a surfing competition, in other instances, the event may be any event that includes a repetitive performance whereby one performer or actor can be compared to another in substantially the same or similar circumstances.

As depicted, each view panel may be associated with an independent control panel that can be manipulated independently, or may be configured for being coupled together so as to be manipulated, e.g., controlled, together. In various instances, a highlight surrounding the active box being controlled may be highlighted in a color to indicate an activity being performed in that designated workspace. Specifically, in various instances, one or more of the view panels may be outlined in a highlighted color, which highlighting is useful for indicating if a panel of a workspace is hot or active, and if the work space has multiple panels, which of the panels are active and/or hot, and if multiple control panels, which control panels correspond to which view panels.

Figure 9E:
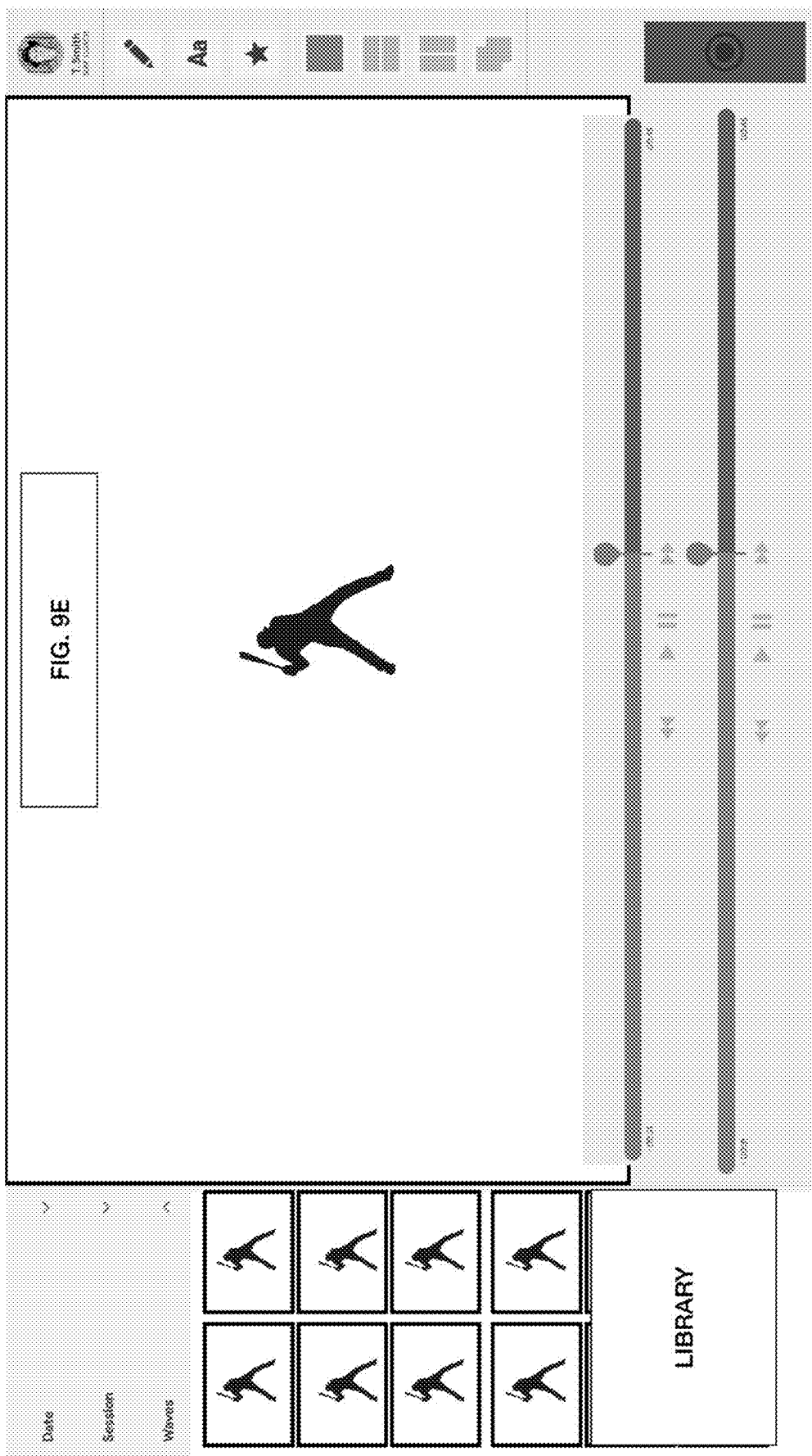
FIG. 9E presents the exemplary interactive display panel of FIG. 9C, but where the plurality of selected videos a displayed in a side by side split screen view.
Figure 9F:
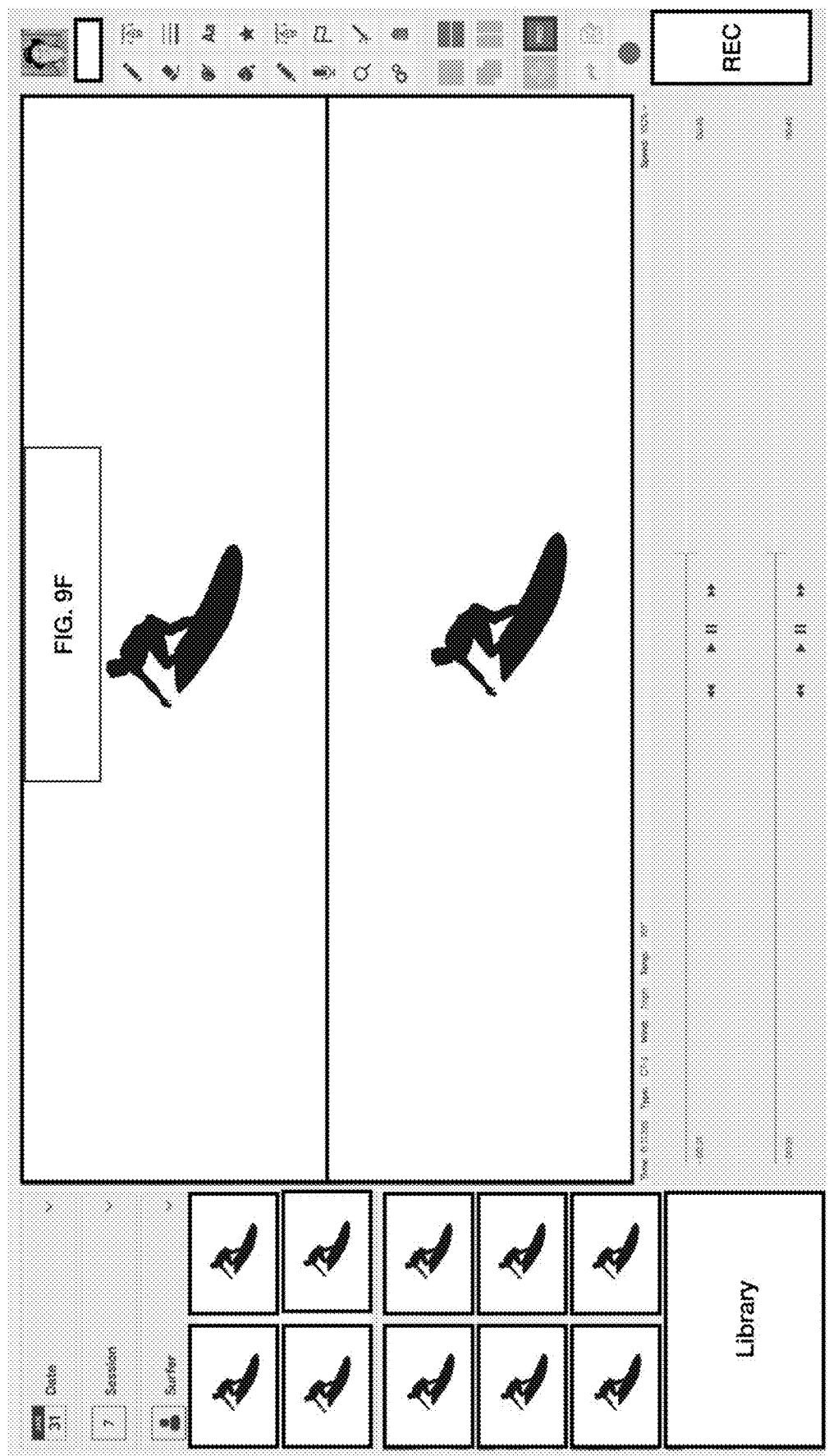
FIG. 9F presents the exemplary interactive display panel of FIG. 9D, with an embedded comment box presented at the control panel.

Exemplary embodiments of the coaching platform are clearly illustrated at FIGS. 9E and 9F, where in FIG. 9E the event is surfing, whereas with FIG. 9F the event is baseball, specifically, batting practice. As can be seen with reference to FIG. 9E, the platform may include a workspace that includes a plurality of actionable engagement panels in a configuration where one screen is presented on top of the other. However, in various embodiments, the view panels may be presented side by side or in a layered fashion. Likewise, presented in FIG. 9E, a plurality control mechanisms are provided for controlling respective display panels, where each panel includes a slider that can be engaged therewith so as to control the viewing and flow of the presented videos. In such an instance, the slider can be translated forwards and backwards so as to navigate through the video play.

As depicted, one or more of the videos may be annotated with comments which can be embedded, or otherwise be associated with the video, and may be automatically populated with messages or commentary expressing one or more comments from a coach or evaluator. For instance, the presence of the comments can be demarcated in the slider by one or more indicators that can be activated by clicking thereon so as to pull up the message. Alternatively, the messages may automatically be called when the play slider activates them through playing.

The messages may be a text message within an embedded text box, such as by employing one or more writing or typing tools, or may be a spoken message that is recorded, e.g., by activating a record button, and associated with the playback. Hence, in a manner such as this, the dashboard interface may be configured for receiving comments, commentary, scores, and the like, in text, graphics, or dialog form, and can embed the commentary data into the playable images. The commentary can be associated with a time stamp so as be displayed or accessed at a given time during the playback such that the comments are made relevant to the actions taking place. Of course, the comments can be accessed and scrolled through separately from the video as well.

Additionally, as can be seen with respect to FIG. 9F, the event is batting, where the participants, e.g., batters, are batting in different circumstances under different conditions, but performing the substantially same motion, e.g., swinging a bat at a pitch. It is to be noted that although the activity of swinging a bat is depicted, any form of repeatable motion may be captured and be played back, such as for comparing the activity of one performer against that of another performer. For instance, the activity may include swinging a club, e.g., golf club, a racket, e.g., tennis racket, throwing a ball, e.g., pitching or passing, shooting a basket or at a goal, and the like.

As can be seen, a library of selectable videos may be presented, which may include both amateur and pro clips. In this instance, a first clip is selected whereby a professional batter has been chosen to be compared to an amateur batter, such as a little league player, who is in need of coaching. In such an instance, a coach can view the two activities, side by side, compare the images, and provide comments on the videos. The comments can be imbedded into the video and the recorded performances can then be viewed with the embedded comments, such that the performer in need of coaching can view the video and listen to the coaching again and again and can control the speed of playback. Additionally, if the student has questions or comments, they can then re-embed the questions or comments into the video, which can then be relayed back to the coach. In various instances, the commented on videos may be transmitted, e.g., from the coach to the student or vice versa, and/or the changes may be made and saved into the database itself.

Figure 9G:
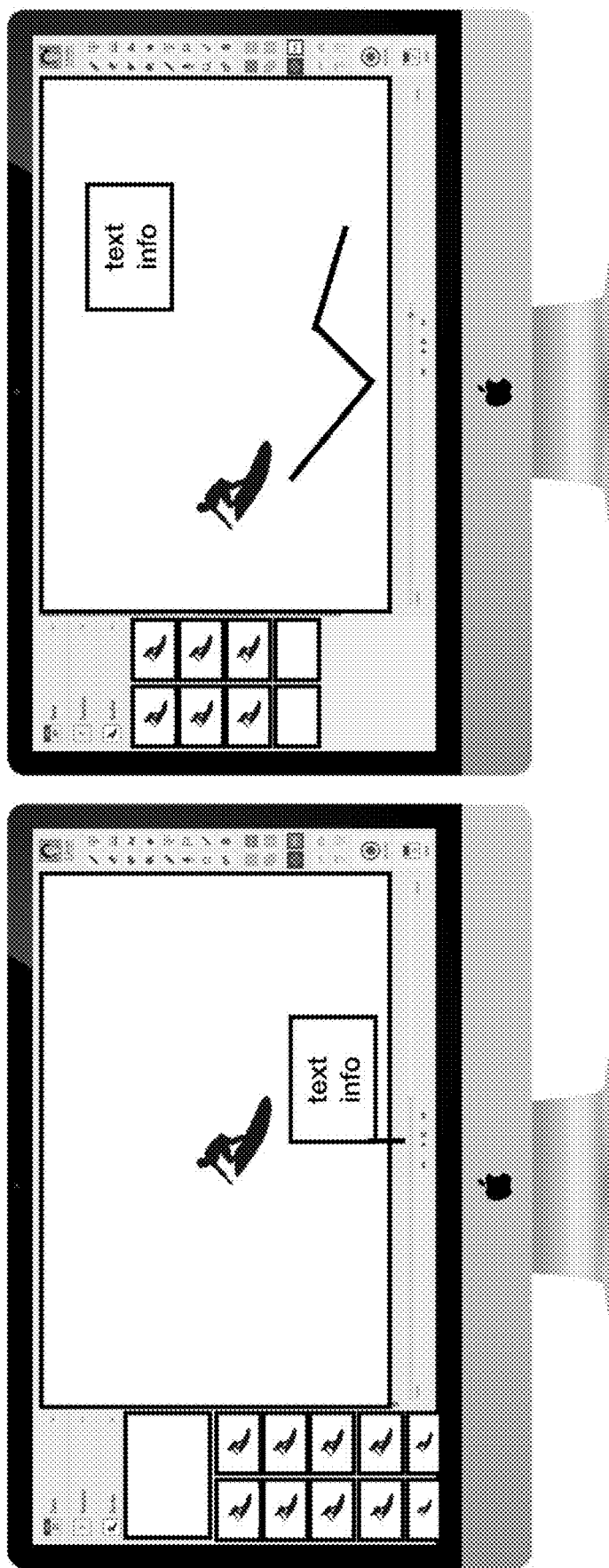
FIG. 9G presents an exemplary computing devices of FIG. 9A, with embedded comment boxes presented within the presentation panels.

With respect to FIG. 9G, a plurality of client computing devices of the system are presented, where each computing device may be coupled together via a network connection and thereby associated with the system server running one or more of the applications of the system, such as where one computing device may be employed by a first user, such as a performer in need of instruction, and the other computing device is employed by a coach so as to provide instructions to the performer, such as where the computing devices are positioned remotely from each other and/or the system server. As can be seen with respect to FIG. 9G, an imbedded text or dialog box can be associated with the play time, such as by being embedded with a time lock that is accessible via the play controls, and/or the dialog box may be embedded into the actual images, e.g., video, so that it can be more closely aligned and associated with the video images. Likewise, a drawing tool can be used to draw on the actual images so as to better illustrate coaching principles.

Hence, in this manner, the performer being coached, such as an armature participant, can view his or her performance, in comparison to another performer, such as a professional, whereby one or more of the videos includes comments from the coaching highlighting differences between the two performances so as to instruct the armature as to how to be a better performer. In various instances, the performer being coached can view the video, read the comments, and can further embed the video with content, such as questions regarding the instructions provided by the coach, such as in an embedded text box. Further, in response to the comments entered by the performer, embedded with the video, and sent back to the coach, the coach can then access the video and comments, and can further respond to the questions, such as by accessing a drawing tool and drawing specific directions on the video, e.g., in response to the performer's questions, which can then be re-embedded into the video and sent to the performer being coached for further viewing.

FIGS. 10A-10E provide further implementations of a dashboard environment including one or more workspaces, or workspace interfaces. As can be seen with respect to FIG. 10A, the server system may include one or more processing engines that can be configured to operate in a coordinated manner so as to form a processing hub. In various instances, the processing hub may be arranged to generate an engagement studio, such as where the studio is further configured for engaging with a client computing device of the system so as to produce a dashboard interface. In particular embodiments, the dashboard interface may produce a workspace that may be presented at a graphical user interface that is displayable at a display of the client computing device.

Particularly, the workspace interface may be adapted for facilitating a user of the client computing device so as to allow the user to access the engagement studio, so as to search and select content to be viewed and/or engaged with, such as via the workspace interface. In certain embodiments, the content may be video content that may be interacted with for the purpose of providing commentary on the subject matter contained within the video. In a specific implementation, the dashboard may be presented as a coaching interface that may be accessed for the purpose of providing coaching, or other instructions, to another user of the system, such as to a subject of the video content performing one or more actions that have been captured by the video.

As depicted on FIG. 10A, the engagement studio has generated a dashboard at a client computing device of the system whereby the dashboard includes an exemplary workspace for the searching and viewing of content. In this instance, the dashboard interface includes a variety of panels, such as a search panel, an engagement panel, a control panel, and a tools panel. For instance, a search panel may be presented, whereby one or more menus by which to structure a search may be interacted with so as to configure various search criteria. In this instance, a date range, a session identifier, and a participant selector have delimited the search criteria.

The tools menu provides a variety of tools that can be used to engage with content presented at the workspace. For example, the tools menu may include a marking instrument, such as a pen feature, a hand selector or pointer, a plurality of view options, such as for layering workspace panels, displaying the panels side by side, and/or one on top of the other. In various instances, the workspace may be adapted for scoring the selected content. For instance, as depicted, a score matrix is provided whereby a viewer, such as a coach, can access the score matrix and perform one or more scoring operations for one or more images being engaged with via one or more workspaces of the system.

A control panel may also be provided, such as for controlling the playing, or other engagement, with the selected content. As indicated, the control panel can control one or more videos being played at one or more engagement panels of the workspace. However, in this instance, the control panel includes embedded coding that provides underscoring for various of the activities that are performed by the actor in the event. For instance, the system can perform an action or routine identification protocol whereby various actions, maneuvers, and/or routines being performed can be identified and can be notated within the control panel to indicate where during the playback a given routine takes place. This identification and tagging, e.g., of performers and the actions they take during their performance, can be made by the system itself, or by a viewer employing the display panel to watch the video.

Accordingly, the control panel provides apparatuses for controlling the playback of the video such as for the purposes of annotating and/or otherwise provide feedback to the performer of the video. Such feedback may involve an analysis of the video, and the breaking down of the video into its component parts, where the component parts correspond to actions taken by the actor engaging in various functions during the performance, such as where the functions may include one or more maneuvers, routines, and the like being performed. In particular embodiments, this analysis is performed such that the system, or a user thereof, can define the performance by the actions taken by a performer thereof. Alternatively, the routine and a time by which they are to be performed can first be determined, and then the video content can be processed in such a manner that each maneuver is demarcated along the playback so as to highlight the period within which the maneuver is supposed to be performed.

In any of these instances, the playback control panel may be segmented into sections of interests, where each segmented section can be used to highlight what a viewer, e.g., an evaluator and/or coach, should focus on when viewing the performance. Specifically, in various instances, a segmented playback control panel may be configured to facilitate the scoring and/or coaching of a performer performing in an event, whereby a score may be given to each segment of the video so as to illustrate how well the performer performed the designated maneuver or routine of maneuvers. Particularly, as depicted, the performance and its playback can be segmented into a variety of classifications for the various maneuvers that make up one or more routines of a performance, which maneuver can be any action taken in a performance, but in this instance, includes a start action, e.g., a takeoff, a first maneuver performed, e.g., a cutback, a second maneuver, e.g., a barrel, a third maneuver, e.g., a transition, a fourth maneuver, e.g., a floater, a fifth maneuver, e.g., another barrel, a sixth maneuver, e.g., a kick out, and the like. A panel screen size toggle can also be provided. Further, also provided is a record and tag feature that can be used to provide specific instructions with respect to specific maneuvers that are performed. Additionally, one or more markers or anchors can be dropped into the video so as to highlight one or more areas of focus, which can then be commented on.

Accordingly, FIG. 10A presents a graphical user interface whereby a scoring functionality and/or an entered score can be embedded into the video, or other image clips, based on a routine of set activities that are to be performed, where each activity is to be performed at a certain time and/or in a certain order. In such an instance, a separate score may be entered for each separate activity of the performance, which scores may then be summed at the end so as to derive a final score. Further, as displayed at FIG. 10D, two or more separate performances can be viewed at the same time whereby they can each be scored separately and individually, or they can be scored together as a team. It is to be noted, that the performance need not be in accordance with a preset list of activities, and in some instances, the system itself can recognize the maneuvers or activities being performed and can organize the scoring boxes so as to prompt the scorer to recognize the maneuver that can then be scored.

Consequently, in various instances, a control panel may be presented, such as where characteristic data describing one or more characteristics of one or more actions being implemented in the event, heat, and/or athletic performance may be presented. For instance, a control panel may be presented where the control panel is segmented so as to designate the timing of the playback during which the one or more actions take place. Likewise, a score panel can be provided whereby scores for the various segments can be entered and/or displayed. For example, the scores corresponding to a selected performance of an athlete may be presented, such as where the scores represent one or more of the viewers score, the crowd score, and/or the judges score reflecting the various different evaluations of the performance, e.g., for the performance as a whole, or for one or more segments thereof.

Figure 10B:
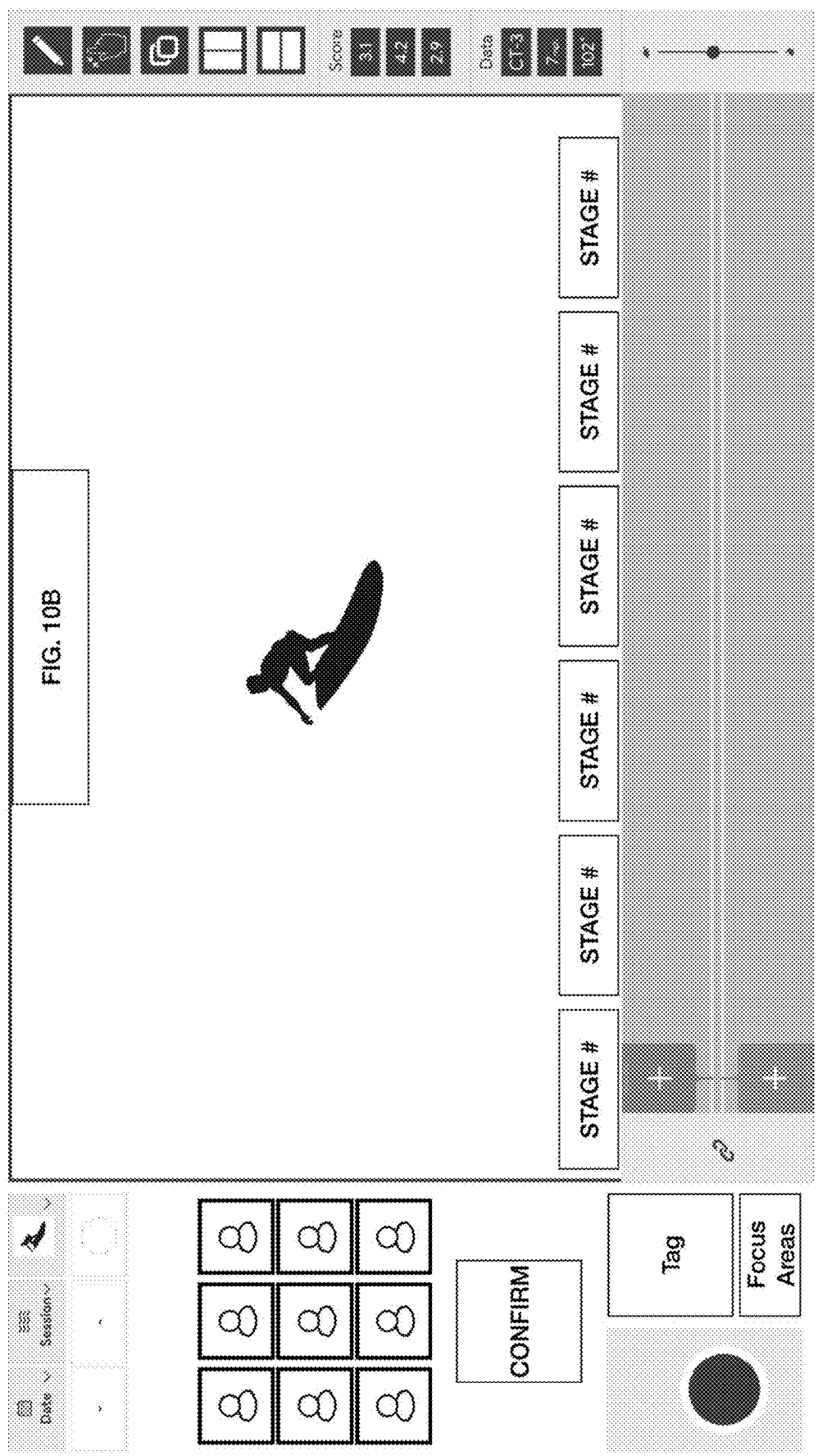
FIG. 10B presents the exemplary interactive display panel of FIG. 10A, with the results of a search being presented at a display panel at the left hand side of the graphical user interface.

Particularly, as depicted in FIG. 10B, one or more predetermined scoring categories can also be provided and be associated with a playback toggle of the score panel, such as where the score panel demarcates one or more activities engaged in by the performer. In this instance, the score panel indicates a performance start, e.g., takeoff, a paddle characteristic, e.g., paddle speed or efficiency, a stand, pop up, or drop in, a stance, a trim, a barrel, an air, and/or other activity or trick. These activities can be represented as one or more menus that can be presented at the score panel so as to show the activities engaged in during the performance. The score panel can be used to actively score the event, such as on a segment, e.g., maneuver, by segment basis, or can be used to display previously entered scores. For instance, as the video is played a previous viewers score for each segment may be presented, and/or the present viewer, e.g., coach, may be allowed to score the performance for the first time, or to adjust previous entered score, such as via a toggle.

Figure 10C:
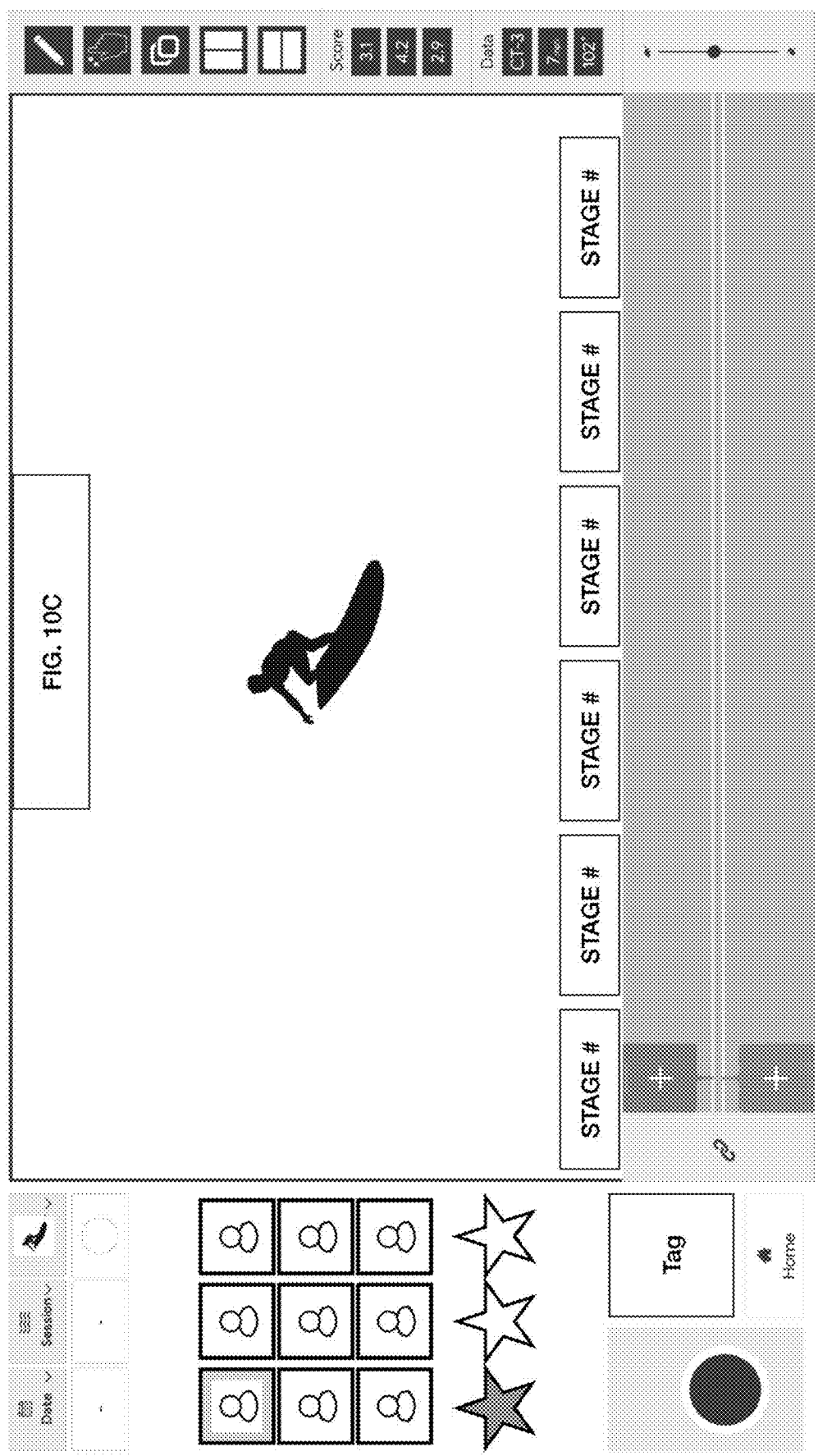
FIG. 10C presents an exemplary interactive display panel similar to FIG. 10B, further including a set of quick evaluation keys at a display panel at the left hand side of the graphical user interface.
Figure 10D:
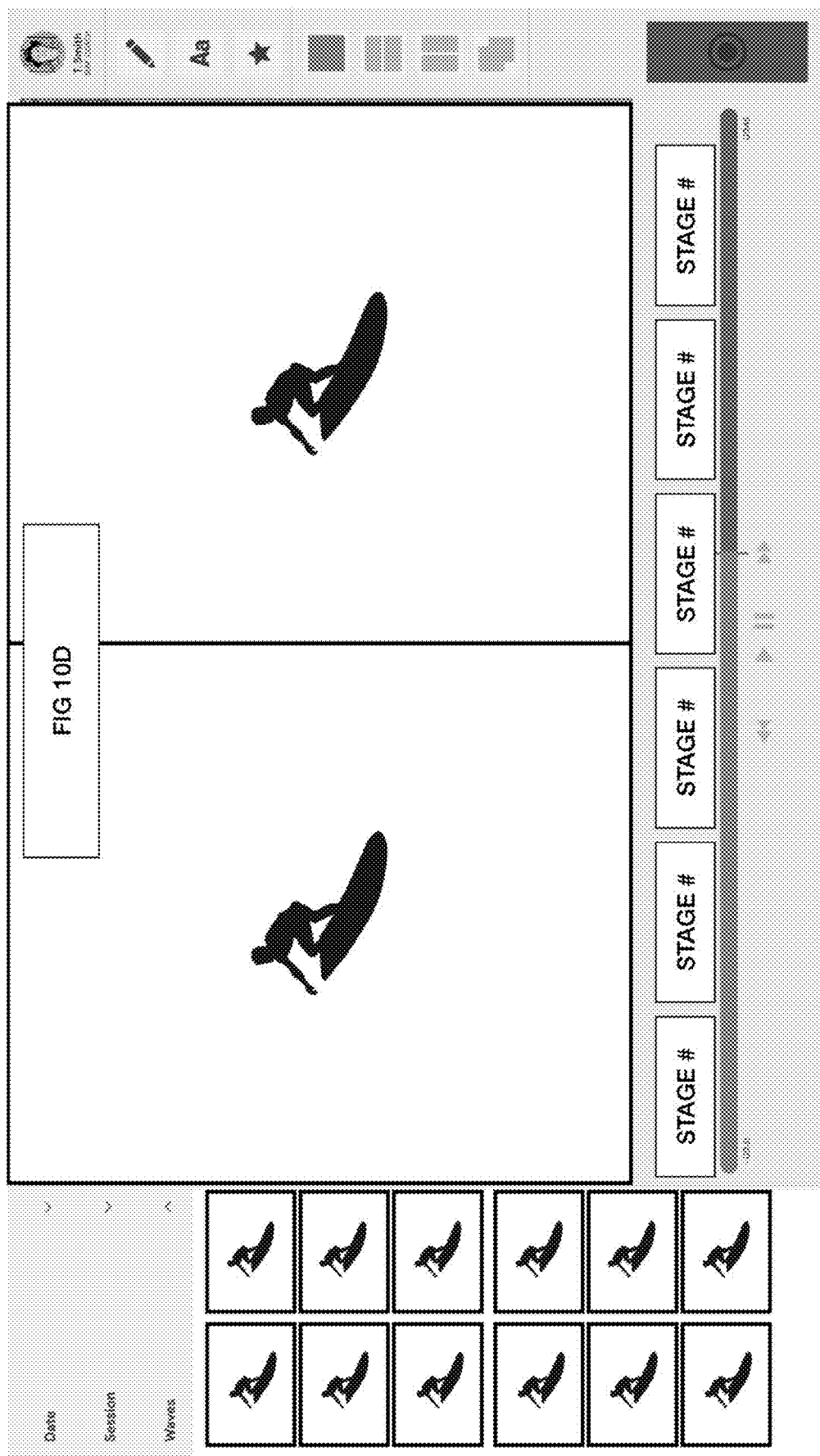
FIG. 10D presents an exemplary interactive display panel similar to FIG. 9E, further including a set of tools for annotating selected videos at a display panel at the right hand side of the graphical user interface.
Figure 10E:
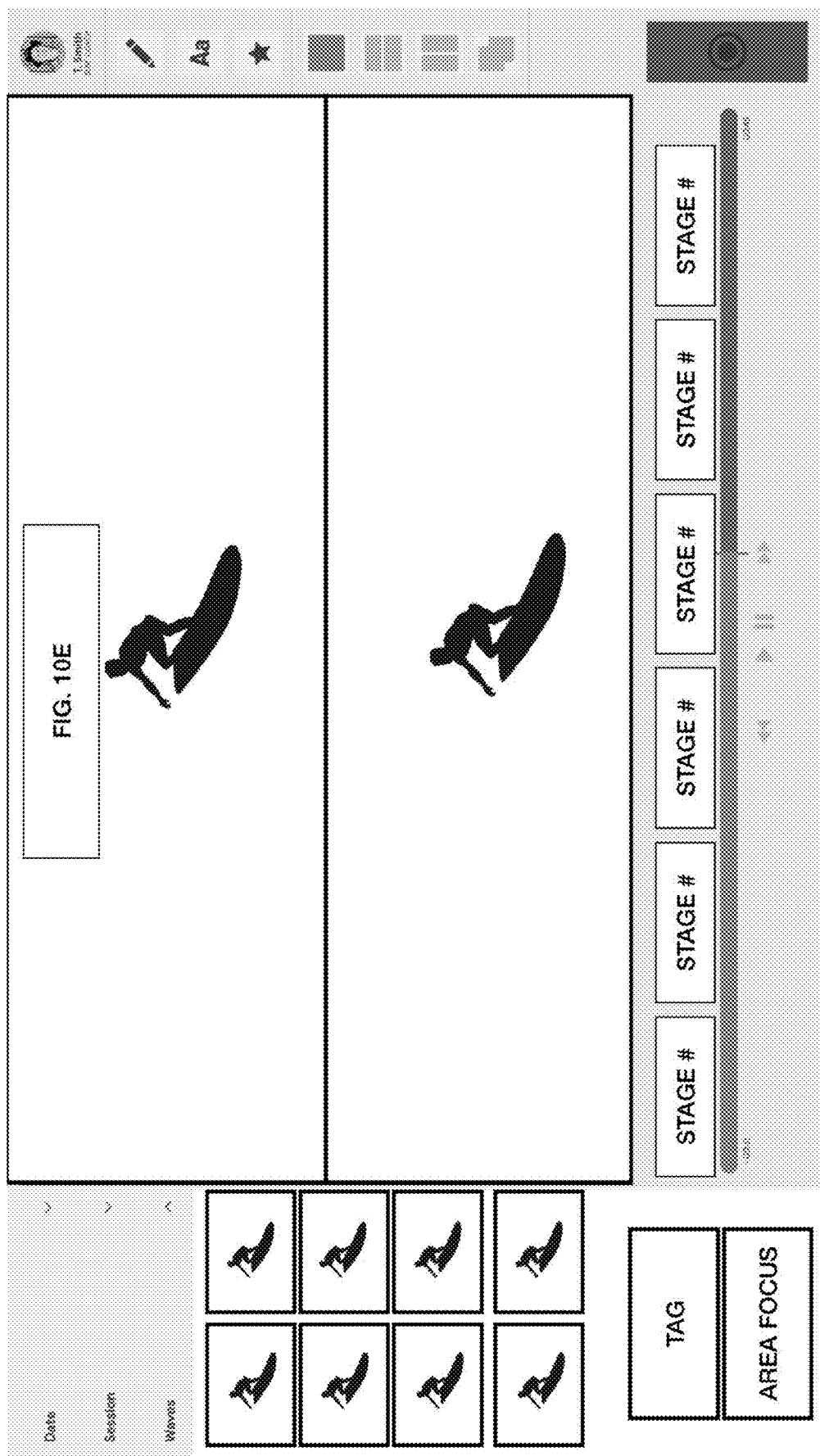
FIG. 10E presents an exemplary interactive display panel similar to FIG. 10D, but this time with the videos being displayed top over bottom.

Specifically, FIGS. 10B and 10C show a coaching and/or scoring interface that allows a user to select which video, of a library of videos, to be viewed. Although, in one instance, a single video may be selected and presented at a view and/or engagement panel, in other instances, a plurality of videos may be selected, such as in a plurality of engagement panels whereby the two videos may be played in comparison to one another. As depicted in FIGS. 10D and 10E, once selected, the videos can be played one by one, or in corresponding fashion, such as side by side, and each section of the activity, such as the beginning, middle, end, etc. can be scored one against the other, segment by segment. A speed of replay may also be selected, such as to allow the clip to be played back in a slower or faster mode than the actual speed at which the event occurred.

FIG. 10C provides a graphical user interface where the performance is broken down into segments, and a menu of quick comment icons is provided so as to allow a user to quickly point out the relative performance level of the performer during a specific moment of the performance. As depicted, the quick comment icon can be a set of keys or symbols, in this instance represented by stars, whereby the coach or other viewer can select a number of stars that can be selected as to evaluate the activity at that time of the performance. The quick comment menu may include a menu of activities or maneuvers to be engaged in by a performer when performing a routine, where a coach or scorer can easily select an icon representing their evaluation of the performers performance of the activity, in this instance, from one to three stars, where one stars indicates a low level of performance, and three stars indicates a high level of performance. More levels may be included, such as 4 or 5 stars, and the icon can be changed, such as to be represented by heats, diamonds, or other emoticons, etc. This quick score menu is useful because it is intuitive and easy to use by the scorer, and further useful to the performer for determining which area of their performance they did relatively well on, and which areas to focus on so as to improve their overall performance, such as via extra practice.

In this manner, the viewer, e.g., a coach or spectator, can control the playing of the clip, and can then interact with a control or score panel, or can interact with the clip itself, so as to provide feedback to the performer. For instance, the coach may view the performance, e.g., of a participant, and use the quick key symbols, e.g., stars, or the tool bar, to select a tool by which to interact with the clip. For example, the pen or pencil tool may be used to allow drawing on the display interface, a type tool can be used for the typing of comments, e.g., by the viewing coach, and a highlight or graphics feature, e.g., tools, may be used to highlight or otherwise demarcate a feature to be commented on. Particularly, one or more graphical tools may be provided such as where the tools menu may include a tool that is configured to apply a graphical indicator on the presented content, e.g., one or more videos. Additionally, one or more graphical tools may include a tool to separate content into a plurality of presentation panels, two present two videos via two presentation stages, and/or to merge two of the videos into a common presentation screen, such as where on video is superimposed over another. As can be seen, a current or previously entered score menu may be presented, so as to allow the viewer to see one or more of the judge's scores, the crowd score, and/or the score from another grouping, such as a home viewer's scoring. Various environmental data setting forth the conditions of the event, e.g., weather conditions, wind or flow conditions, and the like, can also be presented.

As depicted at FIG. 10D, the display screen can actually be a split display screen so as to allow one clip from one performer to be viewed, commented on, and/or compared on one screen part, e.g., a first engagement panel, against a performance by another performer being displayed on another engagement panel. In this manner, the performance of one performer can be easily compared against the performance of another user. In particular instances, the performances to be displayed and compared may be from the same performer, however, at different times and/or at different events or heats. In such instances, a plurality of screens may be provided, and a corresponding plurality of control interfaces may be presented. In such a manner, the flow and/or control of one performance may be viewed and/or controlled independently of another, or the plurality of performances may be configured such that they may be compared along the same timing. In various instances, the view and/or engagement panels may be configured for being displayed side by side one another, as depicted in FIG. 10D, e.g., where a plurality of different videos are being viewed side by side, such as for commenting and scoring, or as depicted in FIG. 10E, the plurality of view and/or engagement panels may be displayed one on top of the other.

Figure 11A:
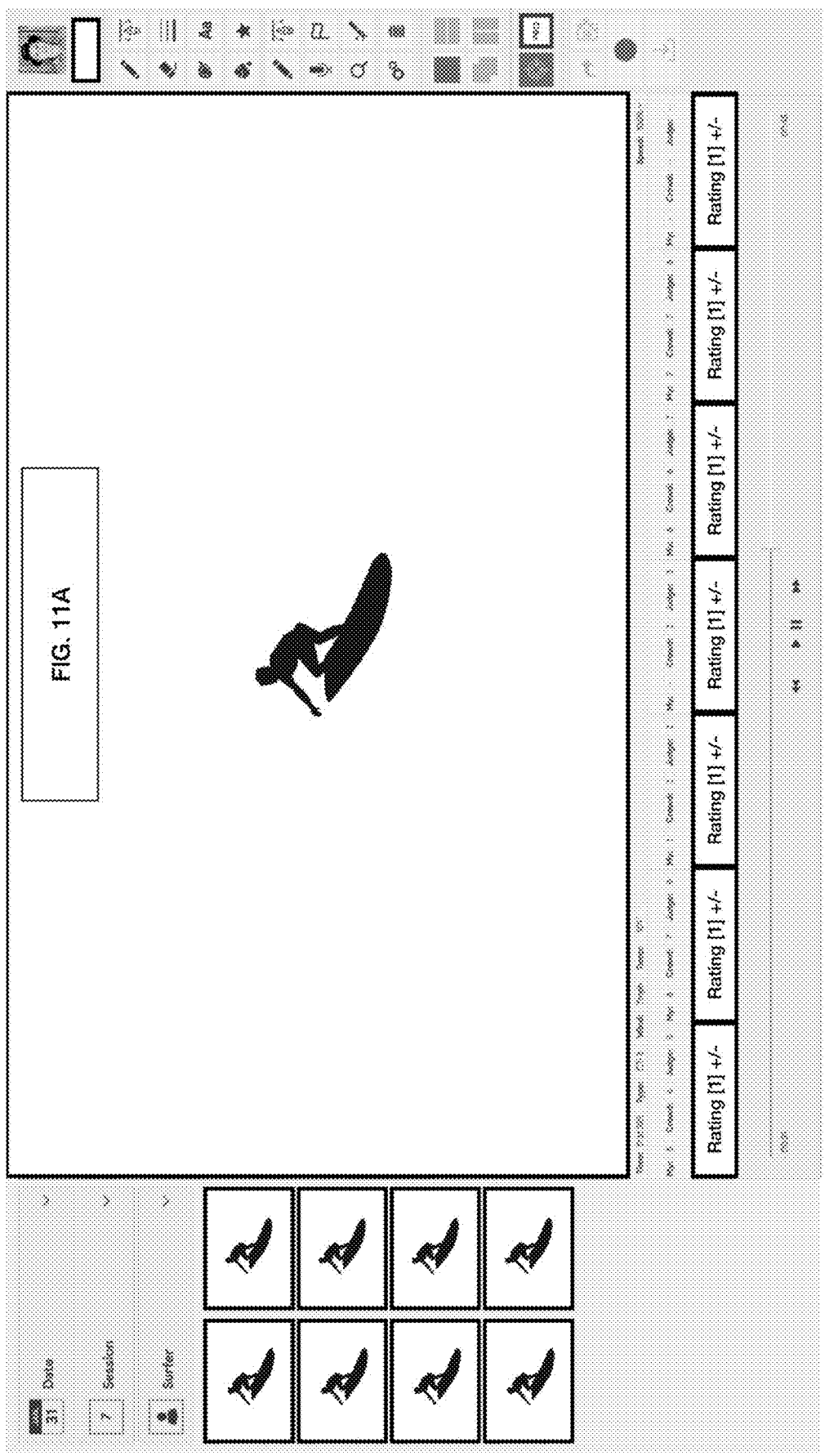
FIG. 11A presents an exemplary interactive display panel having a tools panel positioned at the right hand side of the graphical user interface and a score panel positioned at a bottom portion.
Figure 11B:
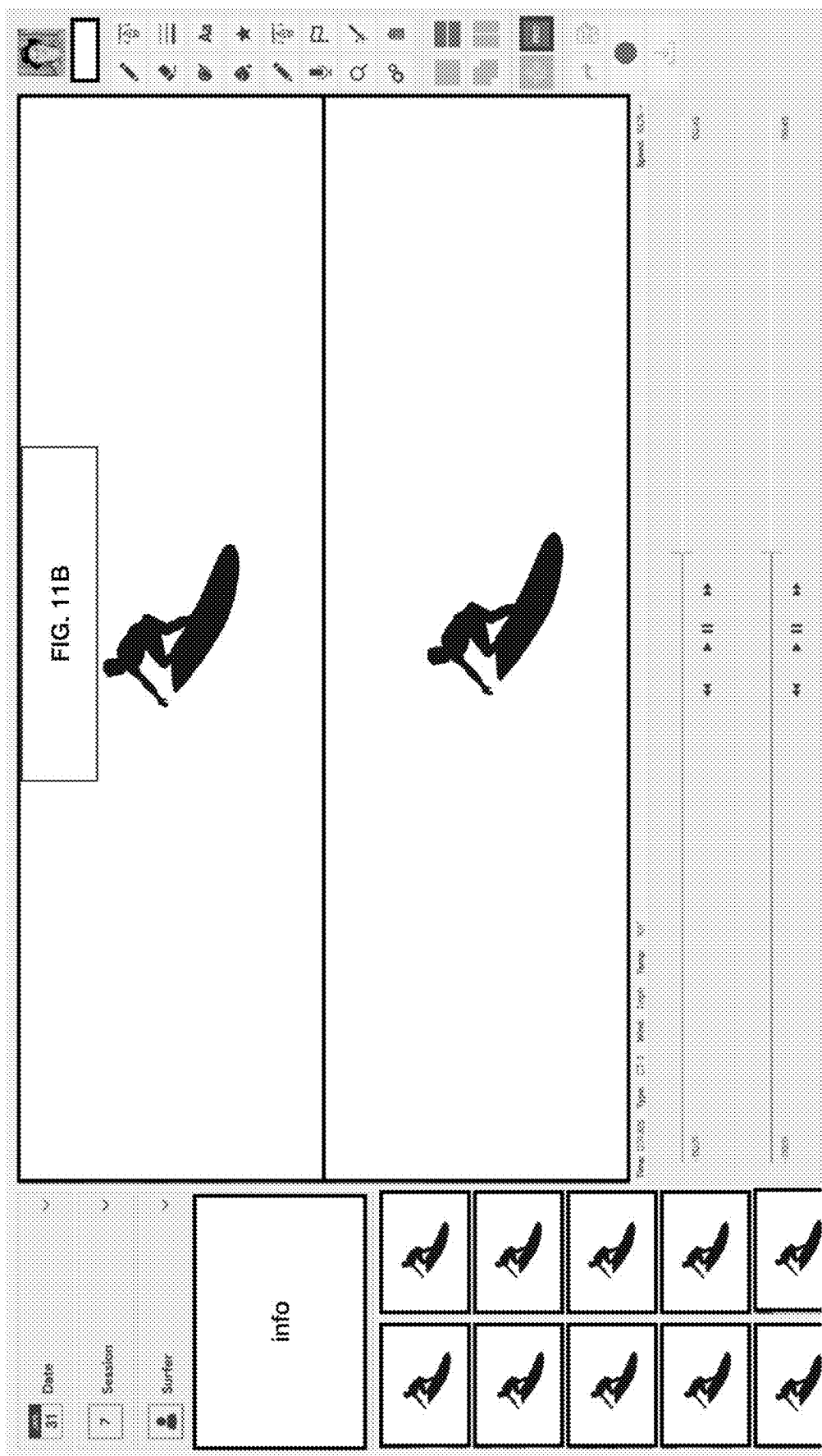
FIG. 11B an exemplary split screen interactive display panel having a tools panel positioned at the right hand side of the graphical user interface, where one of the display panel displays a video having been annotated.

FIGS. 11A-11C provide devices and systems that may be used for producing content, which content, once produced, can be engaged with, such as by being annotated or otherwise embedded with data, and can then be distributed. For instance, the generated and/or annotated content can be distributed in any suitable manner such as by being displayed, e.g., at a display of a computing device of the system, and/or may be sent to one or more recipients, for example, by being texted, emailed, and/or otherwise transmitted to one or more recipients. As indicated above, in particular embodiments, a computing device of the system, such as a remote system server, a desktop computer, a tablet computer, a handheld mobile computing device, and the like may be configured for generating a platform by which a user can interact with content collected by the system in a variety of different manners.

For instance, as can be seen, FIG. 11A provides a user interface where a coach, or other user, such as a judge or spectator, is enabled to engage a computing system of the disclosure for the purpose of evaluating a performance of a competitor, or other actor, of an activity in an event. In the embodiments of FIGS. 11A-11C, the systems provides a computing device, e.g., server, that is configured for being connected, e.g., over a network interface, with an electronic display device that is arranged for providing an interactive graphical user interface to a user of the system so as to generate a studio platform. In such an instance, the user can interact with the studio platform so as to engage with collected, or otherwise generated, content.

For example, the platform may be adapted for producing a dashboard interface having one or more panels by which to select, view, and engage with selected content by use of one or more tools, such as for annotating, commenting on, and/or scoring that content. As depicted in FIGS. 11A-11C the dashboard interface may include one or more presentation panels or screens that are generated by the interactive graphical user interface. In such an instance, one or more of the presentation screens may be configured for presenting one or more videos of the performance of the activity and/or one or more tools for engaging that activity.

Specifically, one panel may be a searchable library panel, another may be a tools panel, and a third panel may be an engagement panel, e.g., configured as a workspace area. For instance, as depicted, a structured and searchable library may be generated, whereby content, e.g., one or more videos, may be presented for selection by a user of the electronic display, or other computing device. The videos for selection may be collected from one or more video collection systems that are in communication with the electronic display, and have been formatted for display in the interactive graphical user interface, e.g., at an active panel of the workspace.

Accordingly, the videos available for selection may be represented, e.g., as a preview or thumbnail, in a video selection region of an interactive graphical user interface, and may be presented for individual selection by a user, such as for interactive presentation in one of the one or more active presentation panels of the workspace for engagement therewith. In various embodiments, the one or more presented videos may be tagged, e.g., by the computing device, with one or more identifiable tags so as to allow the videos to be easily searched and retrieved. As can be seen, in particular embodiments, the one or more identifier tags may include one or more of a participant of the activity, a date of the activity, a time of the activity, and a category of the activity, by which tags the repository may be searched so as to delimit the search criteria and retrieve identifiable content for presentation and selection.

Further, as depicted, a tools panel containing one or more graphical tools generated by the interactive graphical user interface may be presented. In an instance, such as this, each of the one or more graphical tools may be configured for being selected for engagement with by a user so as to receive an input from the user, such as for annotating the one or more videos of the performance of the activity that has been interactively presented by at least one of the one or more presentation screens generated by the interactive graphical user interface. Particularly, by activating, e.g., clicking on, one or more of the tools, as depicted in FIG. 11B, a user can interact with the selected content presented at the active panel of the work space, such as to insert a text box that may be associated with one or more images within the selected content, whereby the user can type out one or more messages to be reviewed by a recipient, e.g., a performer being coached, of the annotated video.

Likewise, in addition to adding a text box, one or more lines may be drawn and added to the video, so as to further highlight areas of improvement, and one or more other texts or image data may be added, such as by being embedded within or super imposed within the image. Hence, the one or more graphical tools presented herein is configured to generate an annotated video based on the input from the user, such as where the tools menu may include one or more of a pencil or pen, such as for making one or more marks at the engagement panel, a line thickness menu for selecting the thickness of the marks to be made, an eraser for erasing remarks, a type feature and/or letter size selector, a star, flag, or other icon selector, a magnify feature, a send feature, and a systems preference feature may all be presented for selection at the tools menu. A discard or trash feature may also be presented. Additionally, a microphone feature may also be included for recording an audio and/or video message. Also depicted is an active screen configuration selector for allowing a user to select the configuration of the display panels, such as in a single or multiple screen view, such as where multiple view panels may be provided side by side, one on top of the other, or in a layered format.

Accordingly, in various instances, engagement with one or more videos may be by a variety of different tools, and for a number of different purposes, such as for annotating and/or scoring the subject matter contained therein. Hence, as can be seen, a control panel is presented whereby the control panel has been subdivided into segments, where each segment represents a particular schema, e.g., of activity, or maneuver engaged in by the performer, but also includes an engagement box representing the performers score for the performance of that maneuver for that segment. In such an instance, a plurality of scoring boxes can be presented such as to present various scores being attributed to the performer with respect to scoring each particular maneuver performed.

For instance, in various embodiments, the user's entered score, the crowd's score, and the judges' scores can all be presented, such as with respect to each section of the selected video. Additionally, as depicted, in various embodiments, a scoring matrix may be provided such as to allow the user to score, or adjust a score, attributed to the performer for each segment of the video. Particularly, an interactive score panel may be presented where the score panel is divided into segments that can be individually classified as to maneuvers, whereby each maneuver can be scored by the user. In this instance, the event is a surfing event, and the maneuvers include a take off, a paddle, a pop up, a stance, a trim, a barrel, an air, and other such maneuvers, such as a cut back, a floater, a kick out, and the like. Of course, other maneuvers or activities to be performed in any other routine may also be presented.

Likewise, as depicted, a score adjustment toggle may also be included so as to allow the user to score and/or adjust the scores given at each individual segment. A video play mechanism is also included for controlling the playing of the video or other displayed content. Further, the system may include a repository in communication with the computing display, or other computing device, for storing the annotated video corresponding after its production, such as where the annotated video may be classified or otherwise be categorized with the one or more identifier tags, such as for storage and/or distribution from the computing device based on one or more user selections of at least one of the one or more identifier tags.

For example, FIG. 11B provides a crowd-source communication engagement and distribution platform, which in this instance, includes a studio server that is in communication with a client computing device, such as over a communications network. For instance, in one embodiment, the server may be configured for generating a user dashboard interface at the client computing device where a system user, e.g., a coach, can select, watch and/or re-watch a selected video, and in this instance, can score and markup and/or comment on the content so as to better illustrate to a performer, or other instructee, how to better improve their performances of one or more activities in a routine performed in an event. Particularly, in various embodiments, the server computer may be provided for receiving, storing, and/or serving content, including digital image content, e.g., via a wired or wireless network interface, to the client computing device. Specifically, the digital image content can be collected, processed so as to be tagged, and may be stored and/or retrieved based on the tagging, such as where each content item may be individually tagged with one or more identifiers, e.g., by an event identifier, a participant identifier, a viewer identifier, an activity, participant, and/or other identifier by which the content can be categorized and stored in a structured library of the system.

As indicated, one or more client computing devices may be provided for communicating with the server computer for receiving selected portions of the digital image content, such as where the selected portions may be requested by each client computing device based on a user selection of one or more of the embedded tags, e.g., event identifier, the participant identifier, the viewer identifier, and the like. For example, each of the one or more client computing devices may include a client application and an interactive graphical user interface for respectively rendering and displaying the received selected portions of the digital image content. In such an instance, as depicted, the client application may be configured for providing one or more tools so as to control the displaying of selected portions of the digital image content and to receive user feedback related to the displayed selected portions of the digital image content in the form of user interactions provided via a window in the interactive graphical user interface. The client application may additionally be configured for enabling each of the one or more client computing devices to communicate the user interactions to the server computer via the network.

Accordingly, FIG. 11C presents a graphical user interface that provides an interactive panel displaying a video library containing a wide variety of videos from a number of different performers in an event. Specifically, the video panel presents various performances of performers engaging in activities as a participant in a variety of events. A user of the system can, therefore, engage the video menu panel so as to select a particular performer and/or video to be commented on and/or scored by a judge, scorer, or other viewer. In this instance, a plurality of videos have been selected and the retrieved images have not been scored. However, in other instances, one or both of the selected videos for being viewed may have been previously scored, or one selected video may have been scored and a second selected video, for display and engagement with, may need to be scored and commented on, such as where the first video may be used as a model by which to engage with and/or score the second video.

Accordingly, in one instance, a first video may contain a routine of activities previously performed with a score that has already been determined, which scored video can be played and compared to a performer in a second video, so as to better illustrate to the second performer, the activities to be improved upon, and/or to better allow the scorer or commenter to more accurately score and/or annotate the performance and its activities. As indicated, the graphical user interface may present a plurality of engagement panels at a multiplicity of different computing devices. For instance, a first computing device may be employed by a viewer, e.g., coach, that is to comment on the performance of a performer of an event. Likewise, a corresponding graphical user interface may be presented at a second computing device being employed by a viewer, such as a performer, who is interested in receiving input on their performance, such as by the first viewer, e.g., coach. In this manner, the interactive, crowd-source communication platform may be employed in a method so as to allow a performer to view their performance, such as at a GUI presented on a first computing device, at a first time, and at the same or a later time, the performance may be viewed at a second computing device by a second viewer, whereby where the second viewer may be a coach or other commenter who views the event and takes one or more actions with respect thereto. In this instance, the coach can engage the tools menu so as to interact with the displayed clip, such as to demarcate actions and provide instructions that can be highlighted so as to give feedback to the performer with respect to their performance.

However, in other instances, such as depicted in FIG. 11C, the graphical user interface may present a plurality of engagement panels at a single computing device, whereby the viewer, e.g., coach, may view a plurality of selected videos at a dashboard work space where one video is displayed in one presentation panel, and a second video is displayed at a second presentation panel of the workspace. In this manner, the interactive, crowd-source communication platform may be employed in a method so as to allow a coach, or other commenter, to view the performance of one performer in one presentation panel, and further view a second performance, by the same or a different performer, in a second active presentation panel. In such an instance, a coach, using a single computing device, can view a plurality of performances, in a plurality of dedicated engagement panels, and thereby compare one with the other and/or score and/or comment on one or both of the presented content. Particularly, a coach can view and interact with presented content in one or more engagement panels, such as by engaging with one or more tools presented at a tools menu so as to interact with the displayed clip, such as to demarcate actions that can be highlighted so as to give feedback to one or more performers with respect to their performance. Further, as indicated above, in these instances, the one or more tools provided by the client application generating the tools panel may include a tool to synchronize the playing of two or more portions of the digital image content on one, or two, or more client computing devices, such as a desktop computer, a tablet computer, a mobile phone, or a personal digital assistant, and the like.

Further, as depicted in FIGS. 11A and 11B, the graphical user interface may present a further ribbon and/or panel such as for presenting various event and/or score related data, such as where a score panel may display a scoring tool but also a score ribbon displaying scores given to the performance of an athlete or performer for the activities performed in a given performance. For instance, the score ribbon may provide one or more of the crowd score, and/or the judges score reflecting the various previously attributed evaluations of that performers performance. In various instances, the score panel may be locked, such that no further engagement thereby is permitted, or the score panel may be open for further engagement, such as for further scoring or comment by the viewer. Particularly, a panel of the dashboard may include an interactive scoring screen portion for allowing interactive scoring and/or commenting on the content being viewed.

For example, a view panel containing one or more predetermined scoring categories can be provided whereby the score panel demarcates one or more activities that can be engaged in by the performer and used by the evaluator to score the performers performance. Particularly, the score panel may include a series of categories such as including a performance start, e.g., takeoff, a paddle characteristic, such as paddle speed or efficiency, a stand or pop up, a stance, a trim, a barrel, an air, or other activity or trick menu can be presented, so as to show a previous viewers scoring in this regards, and/or allowing the present viewer, e.g., coach to score the performance for the first time or to adjust previous entered score, such as via a toggle. A speed of replay may also be selected, such as to allow the clip to be played back in a slower or faster mode than the actual speed at which the event occurred. Various condition indicators may also be presented such as ambient or water temperatures, wind speed, water conditions, wave size, competitor physiology condition, and the like.

Consequently, in view of the above, presented herein is a client application for directing operations of a computing device, whereby the client application is configured for allowing a user of the computing device to provide comments and/or coaching on a performance of a performer in an event. Particularly, as illustrated at FIG. 12, a studio system is provided wherein the system may include a plurality of client application programs that may be distributed to a corresponding plurality of computing devices, e.g., a heads up display, desktop or lap-top computer, or mobile computing device, such as a table, smart phone, and/or intelligent watch, where each device has an interactive display, such as where each client application program is configured to present a graphical user interface, e.g., at an interactive display, of the computing device. Specifically, a coaching graphical user interface may be presented at a display of a first and/or a second computing device whereby the display is configured to communicate and/or correspond between the two different devices in such a manner that an interaction performed at one display is displayed at the second display, such as substantially contemporaneously so as to thereby allow for the distributed and real-time coaching of the performance of a performer of the event, such as via corresponding client applications running on the respective first and second computing devices.

Likewise, as indicated, the client application may present one or more application tools for one viewer of the event to communicate, such as through one or more inputs with another viewer, such as via the presented graphical user interface. Accordingly, in addition to a first and second computing device, the coaching platform may include a suitably configured server system connected with the plurality of client application programs, such as via a communication network. In such an instance, the server may be configured to synchronize the displaying of the events on the two or more different computing devices, such that transmission at a graphical user interface of an action entered at one display at one computing device may be seen, substantially contemporaneously, on the screen of the second computing device, such that presentation to each of the plurality of client application programs for display, e.g., in the interactive display, is viewable by each device at substantially the same time.

Accordingly, in various embodiments, a user interface is provided where a user of the system, e.g., viewer and/or coach, may engage with and/or comment on and/or score a variety of sections of one or more selected videos. For instance, in exemplary embodiments, the coaching platform may provide a graphical user interface by which a user may navigate through one or more menus, such as a menu of libraries of videos and/or a menu of tools that may be employed for a variety of purposes, but notable herein, for performing one or more coaching operations, such as at a graphical user interface presented at a display of a computing device of the system. Particularly, in various embodiments, a method of evaluating a performance of an activity of a performer in an event is provided, whereby the method may include one or more of the following steps.

Specifically, the method for evaluating the performance may include the implementation of a capturing and/or storing step by which a server, having a network internet connection for coupling the server to one or more of an image capturing device and/or a repository, captures and/or stores one or more images, e.g., videos, of the activity in the repository. In various embodiments, the method may further include the tagging of one or more images within the videos so as to classify the content and better allow the videos to be categorized, sored within the repository, as well as searched and retrieved therefrom. Hence, each of the one or more videos may be tagged by the server with one or more activity-related identifiers.

Additionally, in various embodiments, the server may be coupled, via the internet connection, to one or more electronic display devices that are capable of generating an interactive graphical user interface (GUI) such that one or more videos being processed by the system may be communicated to the electronic display devices for presentation thereby via the generated GUI. For instance, in various embodiments, the server may include one or more building engines, such as a library builder, and the method may include presenting, by the library builder of the server, a search menu that is configured for allowing a user to access and search the repository such as based on the associated one or more activity-related identifiers.

In such as instance, the method may include identifying, by the library builder and in response to a search query, a selection of one or more videos related to the search query, and further may include the library builder generating a structured library containing a representation, e.g., a thumbnail, of the selection of the identified videos. In particular embodiments, the videos, or other content, identified by the search query, may be presented in a library panel of the interactive graphical user interface of the electronic display device by which each of the videos may be presented for selection from the structured library, such as by a user input received by the interactive graphical user interface. Hence, the method may include a user, or the system itself, selecting one or more videos from a structured library of a repository of the system.

In various instances, the system server may include, or otherwise be associated with, a presentation building engine, such as for generating one or more interactive presentation panels in the interactive graphical user interface. In such an instance, the method may include retrieving, by the presentation module, a selected video from the structured library for presentation in one of the one or more interactive presentation panels. The server system may further include a tool module for generating one or more graphical engagement tools, and the method may, therefore, may include providing, to the user, one or more graphical tools in a tool panel in the interactive graphical user interface. For instance, each of the graphical tools presented in the tool panel may be configured to receive an input, e.g., from a user of the system, for controlling the presentation of one or more selected videos, such as where at least one of the graphical tools may be adapted for annotating a selected video being presented in one or more of the interactive presentation panels.

In such an instance, a user of the system may select a video to engage with, the system may then generate an engagement panel in which the selected video may be displayed, e.g., via the GUI, and then the user, engaging the one or more presented graphical tools, may then interact with the selected video. In view of this, the system may include a compiler, and, hence, during the interaction process with the video, the method may include receiving, by the compiler, annotations to the selected video to generate an annotated video for storage in the repository in accordance with the one or more activity-related identifiers. Likewise, once stored, the method may further include retrieving the stored annotated video, which may then be distributed to one or more recipients.

Particularly, in view of the forgoing, a method of evaluating a performance of an activity may be provided, wherein the method may be executed by a server having a network internet connection to communicate with an electronic display device that generates an interactive graphical user interface. Specifically, the method may include storing one or more videos of the activity in a repository, where each of the one or more videos have been tagged, e.g., by the server or a user of the system, with one or more activity-related identifiers. The method may further include presenting a search menu associated with the one or more activity-related identifiers, and identifying, in response to a search query, a selection of the one or more videos related to the search query.

Once a search query has been initiated, the method may then include retrieving one or more results in response to the search query, and generating a structured library that contains, as a result of the search query, a representation of a selection of one or more videos in a library panel of the interactive graphical user interface of an electronic display device. In such an instance, each of the videos may be made selectable from the structured library, such as by a selection input that may be received from a user of the system by the interactive graphical user interface. In response to receipt of the selected videos one or more interactive presentation panels may be generated, e.g., at the interactive graphical user interface, and the selected videos may be retrieved from the structured library for presentation in at least one of the one or more interactive presentation panels.

Further, as indicated, the method may include providing one or more graphical tools in a tool panel in the interactive graphical user interface. In such an instance, one or more of the graphical tools may be configured to receive an input for controlling the presentation of the selected video, such as where at least one of the one or more graphical tools may be adapted for annotating the selected video being presented in one or more of the interactive presentation panels. Consequently, once a tools menu has been generated or otherwise presented, a user may engage with the one or more tools to annotate the presented video, and thus, the method may include receiving annotations to the selected video to generate an annotated video for storage in and/or distribution from the repository in accordance with the one or more activity-related identifiers.

Accordingly, as can be seen with respect to FIG. 12, provided herein is a crowd-source communication platform for communicating digital image content and feedback related thereto with a plurality of client computing devices via a network. In various instances, the client computing devices for implementing the crowd-source communication platform may be one or more of a variety of computing devices including a heads up display, a suitably configured studio server, a desktop and/or laptop computing device, and a mobile computing device, such as a tablet, a mobile phone, and/or a smart watch, through which one or more of the methods and functions set forth herein may be implemented. Particularly, FIG. 12 provides an overview of the underlying system components whereby a fan, coaching, and/or engagement platform may be promoted and more easily engaged with, such as for allowing better scoring and/or commenting and/or coaching by both fans, judges, coaches, and others.

In particular embodiments, the platform may include a server system that may include and/or otherwise interact with one or more server computers. The server system may be configured to receive content, such as digital image content, via a network, and may further be configured to individually tag collected digital media content with one or more of identifiers, such as an event identifier, a participant identifier, and a viewer identifier. A memory may further be included for storing the tagged digital media content. In such an instance, the platform may be configured to receive one or more requests from one or more client computing devices, and in response thereto, the server may query the memory for content identified by the request, such as with respect to one or more of the event identifier, the participant identifier, and the viewer identifier.

Consequently, in response to the request and query, the server may identify and serve the content, e.g., digital media content, associated with the request to the plurality of client computing devices, e.g., directly or via the network. For instance, the server system may be configured to serve the digital image content to each of the plurality of client computing devices sequentially or substantially simultaneously. In such an instance, the served digital image content may include video content, and the server system may be configured to serve the video content substantially in real-time of receiving the video content. Likewise, once served, the platform may further be configured for allowing the served content to be interacted with and, thus, the platform may further be configured to receive feedback data representing user interactive feedback with the served digital image content, so as to generate annotated content.

Specifically, in certain embodiments, the feedback data may include a graphical annotation to the served digital image content. Once generated, the server may then store the feedback data with the served digital image content in the memory. In various embodiments, the server may be configured for aggregating the feedback data, and to serve the aggregated feedback data to the plurality of client computing devices. In such instances, the feedback data may include a quantitative or qualitative score of the served digital image content.

For instance, as depicted in FIG. 13A, a graphical user interface where a variety of system analytics can be collected, compiled, and displayed, which can be used for a variety of different purposes, such as for bettering user engagement experience as well as for more targeted advertising. Particularly, the analytics may include various analytics that can be broken down and presented at a dashboard panel generated at the graphical user interface. Various analytics may be generated and displayed such as with regard to event particulars, particular campaigns being run, the various competitors and judges of the events of the system, and the like. Such analytics may include an analysis of the number of spectators attending and/or viewing the event, the number of countries, counties, or other locals represented, number of scores, comments, or other evaluations being entered, such as by judges and/or users, as well as the number of engagements being performed. These analytics may be presented in a variety of forms, such as via one or more graphs, such as a dot and line graph, a bar graph, a wave graph, an interactive map, and the like. Likewise, the number and identity of various social media engagements, such as posts referring to the event on FACEBOOK®, TWITTER®, and other social media modalities, can also be tracked and presented.

Accordingly, in various embodiments, the server system may be configured to receive content, such as digital image content, via a network, and may further be configured to individually tag collected digital media content with one or more of identifiers, such as an event identifier, a participant identifier, and a viewer identifier, and may be used for running one or more analytics such as with respect to the same. For instance, a memory may be included for storing the tagged digital media content, whereby the number of events participated in, the statistics related to that event, and a comparison with other participants and users may also be made. In such an instance, the platform may be configured to receive one or more requests from one or more client computing devices, such as with respect to one or more analyses sought to be performed, and in response thereto, the server may query the memory for content identified by the request, such as with respect to one or more of the event identifier, the participant identifier, and the viewer identifier. Consequently, in response to the request and query, the server may identify and serve the content, e.g., digital media content, associated with the request to the plurality of client computing devices, e.g., directly or via the network, and may run one or more of the requested analysis.

In various instances, the server system may be configured to serve digital image content retrieve and analyzed by the system, along with statistical data pertaining thereto to each of a plurality of client computing devices sequentially or substantially simultaneously. In such an instance, the served digital image content may include video content, an analysis of the content, and the server system may be configured to serve the video and analytical content substantially in real-time of receiving and/or analyzing the video content. Likewise, once served, the platform may further be configured for allowing the served content to be interacted with and, thus, the platform may further be configured to receive feedback data representing user interactive feedback with the served digital image content, so as to generate annotated content.

Specifically, in certain embodiments, the feedback data may include a graphical annotation to the served digital image and/or analytic content. Once generated, the server may then store the feedback data, and update the analytical content with the served digital image content in the memory. In various embodiments, the server may be configured for aggregating the feedback data, and to serve the aggregated feedback data to the plurality of client computing devices. In such instances, the feedback data may include a quantitative or qualitative score of the served digital image content, and can include feedback as to how the event was run, the level of engagement for each aspect of the event, especially with respect to the competitors and judges, and such data can be collated, aggregated, weighted, scaled, and summed, so as to be used by other event organizers so as to help them in the organization and running of other events.

Hence, in various instances, as can be seen with respect to FIG. 13B, another GUI may be presented that displays another view of analytics that can be collected and displayed by the system. It is to be noted that a system administrator may modify the system components and parameters, such as in response to various feedback, so as to better enhance system use and fan engagement. Additionally, the AI module of the system may employ these analytics automatically to achieve the same goals.

In view of the above, provided herein is a method of evaluating a performance of an activity, such as where the method may be executed by a server that is in communication with an associated client computing device, such as via a network connection. In various embodiments, the client computing device may be coupled with an electronic display device that generates an interactive graphical user interface by which a user of the client computing device may engage the client computing device so as to evaluate the performance of another. Likewise, one or more of the server and the client computing device may be associated with a database storing one or more videos of the activity to be evaluated in a repository, such as where each of the one or more videos may be tagged by the server with one or more activity-related identifiers.

In such instances, the method may include one or more of the following steps. For instance, the method may include presenting a search menu associated with the one or more activity-related identifiers. Via the search menu, a search query may be initiated and entered into the system such as where a selection of one or more videos related to the search query may be identified. As a result of the search query, the identified videos may be presented such as in a structured library, which may then be viewed so as to allow a user of the system to select a video of interest.

Particularly, a structured library may be generated whereby the library may contain a representation of a selection of the one or more identified videos. For instance, the videos may be presented in a library panel of the interactive graphical user interface of the electronic display device. In such an instance, each of the selection of the one or more videos may be selectable by a selection input to be received by the interactive graphical user interface. In various embodiments, one or more, such as a plurality of videos may be selected for viewing. For instance, in response to the one or more selections having been made by the user one or more interactive presentation panels may be generated in the interactive graphical user interface.

More particularly, once one or more videos have been selected from the structured library, one or more presentation panels may be generated by the server, such as for presenting the selected video(s) for viewing and/or engagement with in one or more of the interactive presentation panels. Accordingly, the method may include providing one or more graphical tools in a tool panel in the interactive graphical user interface, such as where each of the graphical tools may be configured to receive an input for controlling the presentation of the selected video. For instance, in various instances, at least one of the one or more graphical tools may be configured for annotating the selected video, which may be presented in one or more of the interactive presentation panels. Hence, the method may include receiving one or more annotations to the selected video(s) so as to generate an annotated video for storage in the repository in accordance with the one or more activity-related identifiers.

In view of the above, in one aspect, provided herein is a system for evaluating, processing, and/or annotating content, such as video content. In various embodiments, the system may include one or more of a client computing device a structured database, and/or a server system. For instance, a client computing device may be included, such as where the client computing device has a display device that is coupled therewith. In various instances, the electronic display generates an interactive graphical user interface by which a user of the system may engage the computing device so as to participate in the evaluation process. In particular embodiments, the client computing device may include a communications module for receiving and transmitting content, and further configured for receiving and transmitting user inputs into the system, such as with respect to annotations directed to engaging the selected content so as to evaluate a performance of an individual participating in an event. In certain embodiments, the user inputs may be transmitted to a server of the system.

Particularly, a server may be included whereby the server may be configured for receiving user inputs and for performing one or more annotative operations such as for annotating, or otherwise engaging with selected content. For example, for these purposes the server may include one or more processing engines. More particularly, a first set of one or more processing engines may be included whereby the first set of processing engines may be configured for generating and/or presenting a search menu to the graphical user interface of a the display of the client computing device. A search may then be performed whereby one or more search terms may be entered into the system such as for the identification of one or more videos to be viewed and/or engaged with.

A second set of processing engines may also be provided whereby the second set of processing engines receive the search query and identifies one or more tags that pertain to one or more classifications by which one or more videos and/or their content may be stored in a library of the system. Accordingly, a dedicated search engine may be configured to perform a search of one or more libraries of a database of the system, such as based on the identifying tags, and may further be configured for retrieving a selection of videos that meet the parameters of the search query, such as for presentation to one or more presentation panels of the GUI of the client computing device. Particularly, a search engine may be provided for presenting the identified videos, or other content, which can be presented as a structured library to a user of the system for selection thereby, such as in a displayed library panel that includes a selection of the identified videos presented for selection by a user.

In various embodiments, the generated library may contain a representation, e.g., a thumbnail, of a selection of the one or more identified videos. In such an instance, a user can select one or more videos for engagement, whereby a further processing engine of the system may then retrieve the selected videos, may generate a presentation panel at the GUI by which the videos may be presented to a user for engagement. Particularly, once one or more videos have been selected from the structured library, one or more processing engines may generate one or more presentation panels that may be generated, such as for presenting the selected video(s).

An additional set of processing engines may be provided and configured for generating a tools panel by which tools panel one or more graphical tools may be interacted with so as to engage the presented content and provide one or more comments thereof. For instance, in various embodiments, each of the graphical tools may be configured to receive an input for controlling the play and engagement with the presentation of the selected video. For example, one or more processing engines may be configured for receiving and/or implementing one or more annotations to the selected video(s) so as to generate an annotated video for storage and/or distribution in the repository in accordance with the one or more activity-related identifiers. Accordingly, further processing engines, such as for compiling the annotations with the video, for formatting the same, and distributing the content, may also be included.

In various embodiments, a computing device of the system, such as including one or more processing engines, may be configured for determining one or more likelihood propositions. For instance, the system may be configured for determining a likelihood that a given score or other evaluation has been influenced by bias or other relevant factor.

Likewise, one or more statistical analyses may be performed, such as for determining an average, a mean, a mode, a standard deviation for a collection of scores and/or other evaluations being entered in to the system.

The results of these scores and/or attendant analyses may be compared to scores and evaluations that have previously been given, e.g., by one or more scorers or evaluators, and can further be compared to historical records measuring the same factors, e.g., from the same or different scorers and/or evaluators. The results of these comparisons can be employed for a number of different purposes, such as for determining bias, appropriate score corrections, predictions as to what future scores will be, guidance as to how to improve one or more scores, and the like. In this manner, a number of different social factors pertaining to the backgrounds and prior activities of the scorers and/or performers, collectively commonality factors, may be collected, analyzed by the system, and employed for determining one or more outcomes.

In view of the preceding, likelihoods regarding various outcomes may be determined. For example, particular event or performance outcomes can be determined, or at least may be predicted, based on prior outcomes and the conditions that have led to the achievement of those outcomes. For instance, past performances from a performer, past scores from a scorer, past conditions and environments, can all be analyzed, determined, and used as one or more factors in making one or more future predictions as to one or more new outcomes. Health conditions of various performers in the event can also be determined, and used in determining and/or predicting one or more outcomes. Additionally, a number of data, e.g., scores and/or evaluations, entered into the system from different sources, e.g., from judges, scorers, or other evaluations, may be received at a system server, may be aggregated, compiled, and used to determine and/or predict bias, outcomes, and the like. One or more of these analyses may be performed for the purposes of determining one or more odds of one or more outcomes being predicted to occur.

Further, a likelihood determination may be made with respect to determining a competitor in an event, a scorer or other participant in the crowd, or a given occurrence of a particular condition. Such a determination may be made via an image, e.g., facial, recognition analysis. Particularly, an identification of a participant in an event may be made by the system, such as where the system may analyze a variety of prior instances of the performer from a plurality of different captured content, such as photos and videos. In various embodiments, the identification may be made based on a number of different cognizable features of the participant or their surroundings, as well as the attributed name or other identifiers associated with the participant, such as via time of performance, color of jersey, location, event information, identifiable tags or electronic devices, and the like.

In various instances, image data may be analyzed so as to determine the identity of participants, conditions, and/or other factors based on system recognizable features that can be used to make an identification determination. The system may also be configured for determining the likelihood that a given participant captured in an image is going to improve or falter or maintain the same level of performance throughout the event. So being, the physiological and/or environmental condition data may be fed into the system and may be used to make one or more predictions based on these conditions, and/or to give one or more suggestions to the performer and/or a coach thereof. Particularly, the various physiological data of participants can be retrieved by the system, compared to historical data, and then the results of that comparison can be used to make one or more predictions about their performance.

Likewise, the same type of analyses may be performed with respect to the environmental surroundings and conditions within which the competition is taking place, such that one or more predictions of the environment and/or how the environment will affect the competitor in their performance. For instance, various biological, physiological, and/or environmental data may be collected, analyzed, and determined by the system. Such data may be used in determining whether or not conditions will be favorable for the event and/or the biological and/or physiological conditions of the participants with respect to their performance. Additionally, such data may be employed so as to determine whether these conditions will sustain the performer throughout the performance in the event, e.g., based on environmental and/or biophysical data collected by the system, and the like. Consequently, the system may be configured for determining a likelihood that a given performer will win a heat, a round, an event, and what score they will need to get in order to do so, a likelihood that a given routine will result in a higher or lower score if performed in the competition, and the like.

Additionally, various system functionalities and/or methodologies may make use of one or more likelihood determinations, as described herein, such as with respect to determining where an active part of an event is, what an optimal point of view for capturing that action would be, identifying a capturing device having the optimal point of view, and selecting that device as being a primary device for capturing and streaming content of the event. Hence, the system may be configured for determining the likelihood that a given user device will capture data, e.g., image content, that is deemed to be of particular value to the system, its users, and the event viewer, e.g., so as to determine which cameras to use to capture and display captured content. Although the preceding has been described with respect to the methodologies of capturing and evaluating image content of the events and their participants, the configuration and implementation of other methodologies described herein may also be executed in like manner.

In view of the above, all of these systems, methodologies, and their processes can be implemented and evaluated by the AI module of the system. For instance, various data may be collected or otherwise retrieved by the system, the data may be parsed and employed as one or more data points within a structured database, and a mapping function may be performed so as to map one or more of relationships between the data points and the factors and/or the conditions leading to them. These factors and conditions as well as their relationships may be employed so as to make one or more predictive outcomes.

Specifically, various relationships between data points and their conditions may be defined and weighted, where previously known or determined instances of one or more relevant occurrences of a condition may be used to increase or decrease a weighting of a likelihood that the same or similar preconditions will result in the same or similar post conditions given an occurrence of a predictive event. In various instances, when making a likelihood determination an extreme likelihood, e.g. of an event occurring, may be within a range from about 95% to about 100%, a high degree of likelihood may be within a range from about 90% to about 94%, a good degree of likelihood may be within a range from about 85% to about 89%, a moderate degree of likelihood may be within a range from about 80% to about 84%, an average degree of likelihood may be within a range from about 75% to about 79%, a below average degree of likelihood may be within a range from about 70% to about 74%, a low degree of likelihood may be within a range from about 65% to about 69%, a very low degree of likelihood may be within a range from about 60% to about 64%, and an extremely low degree of likelihood may be within a range from about 50% to about 59%.

For example, the server system may include an artificial intelligence module that includes a machine learning component as well as an inference engine. Particularly, the system may include an inference engine that may be configured for accessing one or more libraries of a structured database and determining a number of known instances between one or more conditions and relationships between the one or more conditions and using those known conditions, relationships, and the instances between them so as to make one or more predictions about unknown conditions, relationships, and/or instances. Specifically, such data may include a time, a location, and one or more other conditions, such as commonality factors, which data may be stored in a structured database in a manner to generate one or more relationships therebetween.

In view of these data points and relationships, various instances between them can be weighted, and one or more predictions, such as to the likelihood that bias is present may be determined, such as with respect to the presence of bias in a generated score. Such analysis may be performed in a manner that compares a present performance, or instance, with prior performances and/or instances. In such an instance, for each known instance, a weighting for their respective relationships may be increased, where the greater the weighting the greater the likelihood is determined to be. As indicated, such likelihood determinations may be made with respect to a variety of factors herein disclosed, such as with regard to performing a bias analysis, an identification and/or tagging analysis, an outcome or betting analysis, e.g., a calculation of odds of an outcome, a system configuration analysis, such as an analysis regarding which input device to allocate as a primary device.

In various embodiments, the server system, such as an inference engine thereof, may be configured for identifying one or more conflicts between various of the data within the system along with the results of its conditions and/or analysis, and generating a flag of the conflict for further analysis by the system and/or its users. When such a flag has been identified, the system may further be configured for performing a search of one or more databases of the system so as to identify one or more data that may be used to correct the conflict. In particular embodiments, where a flag has been identified, and where a search has either identified or not identified corrective information, one or more user prompted inputs may be generated and presented to a system administrator for correcting the conflict and/or re-calibrating the system in view of the conflict.

With respect to the artificial intelligence module, in one aspect, a cloud accessible artificial intelligence module is provided, and is configured for being communicably and operably coupled to one or more of the other components of the processing pipeline disclosed herein. For instance, the AI module may work closely with a suitably configured workflow management system so as to efficiently direct and/or control the various processes of the system disclosed herein. Accordingly, provided herein, is an AI module that is configured for acting as an interface between one or more characteristics of an individual and one or more activities they engage in, e.g., either one or more performances or one or more evaluations they make of those performances, such as with respect to performing a scoring and/or coaching operation. These analyses may be performed for a number of different purposes, such as for determining bias, betting, odds, and the like, as well as for determining the identity of a participant, such as based on a recognition of their images and/or the actions they take.

For instance, in various instances, the system may be configured for receiving input data, such as data entered into the system as a response to one or more performances, which data may include an individual's performance data, as well as evaluation data entered in to the system with regard to an evaluation of the respective performance. In such an instance, the workflow manager system may be configured for receiving and analyzing the input data, and other such data, and performing one or more analyses on the data so to determine one or more correlations there between. For example, in various embodiments, the methods and/or systems herein disclosed may be adapted for correlating an individual's personal characteristic data to their performance and/or evaluation data they enter into the system. Such data may include a variety of past activity data, past social engagement data, and/or the like.

Specifically, as described herein, in various implementations, the system may be configured for determining when an evaluation being made involves bias, or includes any other relationship of question or interest. In further implementations, the system may be configured for autonomously identifying and/or tagging a performer in a captured performance. Additional implementations may include the prediction of one or more outcomes as well as the generation of instructions for improving or otherwise enhancing that outcome. These predictions may be used for generating odds and/or for use in configuring a betting module by which one or more bets may be placed as to one or more outcomes, where a payout is determined and weighted by one or more of odds as determined by the system.

Accordingly, presented herein is a system for searching a database, such as a structured database, identifying one or more results fitting a search criteria, and correlating data. For instance, a variety of data may be correlated, such as personal characteristic and/or social network data, event, heat, round, and/or other competition data, environmental and/or condition data. Additional data may be evaluated and considered, including past activity and/or scoring and/or performance data, such as a score or annotation data, which may be entered or otherwise collected data, or it may be captured or retrieved data, such as from one or more images.

Such data may be correlated with respect to past, historical information, with regard to a single actor, e.g., evaluator or performer, and/or between different actors, in the present or with respect to past performances. In various embodiments, components of the system may include one or more of a server, including a processor, a database, such as a structured database, one or more sources for actor related data, a search browser, and the like. In particular embodiments, the system may be configured to encrypt data files as that data is uploaded, or otherwise entered into the system, so as to ensure the maintenance of privacy. The data files, e.g., records and/or index files regarding past actions and performances, may be transmitted from each source of generation or storage to a repository using any suitable transference protocol, and may be searchable, such as via a browser. The browser may be configured for searching the plurality of files, such as via use of the one or more index files. The server may be a plurality of servers.

In various instances, the system may be configured for running a plurality of workflows, and may, therefore, include a workflow manager for implementing one or more of the analyses described herein, which in some instances, can be implemented in a processing pipelined configuration. Accordingly, as disclosed herein, the system may not only be configured for receiving user data, e.g., performance or evaluation data, but in various instances, the system may further be configured for correlating the received data with a database of stored performance and/or evaluation data. For instance, the AI module may be configured for analyzing one performance in relation to another, such as with respect to the performance of one or more activities in a routine of activities, whereby the two performers can be classified such as with respect to the degree of correspondence between them.

Particularly, two or more performances can be compared one with another and the percentage similarity, e.g., correspondence, between the two or more performances can be determined, collectively, and with respect to each maneuver performed in a routine of maneuvers. Likewise, various evaluations made from one or more evaluators may also be compered, such as with respect to evaluations made across performers or amongst the same performer across heats and/or events. The workflow manager of the system may be configured for implementing one or more deterministic rule systems, concurrently with respect to a multiplicity of events, at a multiplicity of different regions, so as to derive results data pursuant to its analysis of the performance and evaluation data.

For example, in certain embodiments, the system may include a variety of different databases, which various databases of the system may be configured so as to have a relational architecture, which may further be adapted to include one or more constructions. These constructions may be represented by one or more table structures. A series of tables, for instance, may be employed by which correlations may be made by the WMS in an iterative fashion. Particularly, in various use models, a first correlation may be made with respect to an individual's activities, e.g., their evaluations and/or performances, across times and/or across events, which may be included in one or more tables. Another table may then be employed to correlate the individual's activities with respect to another actor and/or other's activities, such as where the activity can be an evaluation and/or a performance and/or the like. Likewise, with the appropriate feedback entered into the system, a further table may also be included and used to correlate the activities amongst various different individuals, at a variety of different times and/or dates, such as in determining the level of correspondence between them.

A key may be used to correlate the tables, which key may be accessed in response to question prompt or command. The key may be any common identifier, such as a name, a number, a nickname, a handle, a phone number, and the like, by which one or more of the tables may be accessed, correlated, and/or a question answered. Without the key, it becomes more difficult to build correlations between the information in one table with that of another.

Accordingly, a useful aspect of the present technology is a data structure for answering a query, wherein the data architecture may be structured and searched in response to a query. In a typical architecture the database may be a relational database, such as a Structured Query Language (SQL) database, which may be implemented via a relational database management system (WMS). For example, in one implementation, the SQL database may be a document based database, such as where one or more tables, e.g., look up tables (LUT), form a structure wherein data may be stored, searched, relations determined, and queries answered. Particularly, in various embodiments, a documents or table based database may be presented, searched, and used to determine relationships from which answers to one or more queries may be determined.

For instance, typically, SQL databases have a relational architecture. These constructions may be represented by a table structure. A series of tables, for instance, may then be employed by which correlations may be made in an iterative fashion. For example, with respect to the correspondence analyses discussed herein, a first correlation may be made with respect to a performers performance, such as with respect to one of their goals in the performance, and with respect to a first evaluation being made on that performance. Then the evaluated performance of the performer can be compared to that of another, such as a performer having achieved a higher, e.g., the top score, and the correspondence between the two performers can be determined and analyzed.

A result of the analysis may be a determined correspondence for a number of actions taken by one performer in comparison to another, along with a determination accounting for why the score of one performer differed from another, such as based on an evaluation made by a third party evaluator, or by the system itself running an evaluation protocol on a databases of images of performers having been scored for performing the same or similar activity. This data may then be used to provide feedback and/or instructions to the one performer versus the other such as with respect to improving their performance. Another table may then be employed to correlate the individual's performance goals with those of others and stepwise methodology for improvement can be suggested by the system, with identified figures providing examples of performance improvements to be made. Likewise, as indicated above, a further table may be used to correlate the progress of the individual, across performances, towards improvement of their performance, e.g., across a single or multiple events.

A further data architecture that may be used to structure a database of the system is a data tree, where various data elements may be stored in a compressed, but correlated fashion, and/or in a hash table, as described herein above. In certain instances, the database to be deployed by the system may have a graph based architecture, which database may be structured and used to determine the results for one or more queries. Particularly, a knowledge graph architecture may be employed to structure the database, so as to enhance the performance of computational analyses executed using that database. In certain instances, the sophisticated algorithms disclosed herein, are adapted for structuring the infrastructure of a relational database so as to enable more efficient and accurate searching such as via performing graph based analyses, as well as for performing table or tree based analyses.

Consequently, in one aspect, a device, system, and methods of using the same to build a searchable, relational data structure, such as described herein, are provided. For instance, in one instance, the machines and methods disclosed herein may be employed so as to generate and/or otherwise collect data. Specifically, the machines and methods disclosed herein may be used to generate a searchable data structure for storing that data in a relational architecture. In various instances, additional data may be generated or otherwise be transmitted into the system, such as via a suitably configured API, which data may also be configured for being stored in the relational data structure, such as other characteristic data of a performer and/or evaluator.

For instance, in another aspect of the disclosure, the system may include an artificial intelligence (AI) module that may be configured to provide a more comprehensive analysis on generated and/or provided data. For example, the AI module may be configured so as to implement one or more machine learning protocols on the data attained by the system that are devised to teach the AI module to perform one or more correlations, such as between various activities taken by one performer in comparison to another performer, and/or one performance in comparison to another performance, and/or with respect to scores given to the respective performers by the same or different judges or evaluators. Specifically, the AI module may be configured for receiving one or more inputs, e.g., of captured images, and may be adapted for building and structuring a database.

For instance, in a first step, data, such as image and/or characteristic data of a performer or evaluator, may be collected, cleaned, and then be prepared for analysis. In various embodiments, the data may be labeled and/or categorized, such as with respect to one or more classifications. For example, a skimmer may be implemented for the purposes of structuring the database, such as for providing a relational structure to the database. And once the database is structured, it may then be populated with data, in accordance with determined or inferred relationships.

In certain instances, a machine learning protocol, as disclosed herein, may be employed so as to determine relationships between data points entered into the database. Such relationships may be determined based on known facts, and as such the learning may be supervised learning, e.g., such as where the data entered into the database is categorized in accordance with one or more categories and/or labels. Particularly, known factors may be used to label, categorize, and store data, which may be informed by the query being sought to be answered. Hence, knowing factors by which to label and categorize the data being stored makes building the storage architecture more efficient.

In other instances, the learning may be inferred, such as in an unsupervised learning. For instance, in certain instances, the data to be stored may not be known, relationships between the data may not have been determined, and the query to be answered may also not be identified. In such instances, the data to be stored is unsupervised, and as such, patterns in data to be stored and their relationships, such as commonalities between data points, may be determined, and once determined such patterns may then be used in forming the architecture that structures the data storage. For example, in various embodiments, the AI module may include programing directed at training the system to more rapidly, e.g., instantly, recognize how an output was achieved based on the type and characteristics of the input received. The system, therefore, may be configured for learning from the inputs it receives, and the results it outputs, so as to be able to draw correlations more rapidly and accurately based on the initial input of data received.

Typically, the input data may be of two general types. In a first instance, the data may be of a type where the output, e.g., the answer, is known. This type of data may be input into the system and used for training purposes. This data may be any form of known data, but in various instances, may be image and/or evaluation data pertaining to an activity, such as a performance, where the performance and/or its component parts have known scores and/or other evaluations associated therewith. The second type of data may be data where the answer is unknown, and therefore, must be determined. This data may be any form of data, but where one or more aspects of the data is not known, which in various instances, may be image and/or evaluation data pertaining to a performance where an evaluative score is not known.

In various instances, one or more of these two types of data may be compared one with itself, such as to train a model, such as for evaluating and/or scoring a performance, where the outcome is known, and/or the two types of data may be compared one with another such as to apply the model developed with known scored items so as to evaluate a performance with activities that have not been scored. In this manner, one or more known categories of improvement can be identified and highlighted by the system, such as with respect to providing known image data as to how an improvement in performance can be made and by what degree. Hence, effect data, such as feedback data may be elicited from an evaluator with respect to what extent the change in how an activity is performed leads to an increase or a decrease in score for the individual performer.

Particularly, in combining these two datasets, the AI module may be configured for determining the various interrelationships between them. Accordingly, at the heart of the AI platform may be a structured architecture, such as a graph based database, which may be configured for receiving data from a plurality of different sources, such as from a variety of different performances from the same or a variety of different performers, as described herein. This data may then be used to train the performer, and may also be used to train an evaluator thereof, such as where their entered evaluations may be compared against a pool of other evaluators having viewed and scored the same performance.

More particularly, this effect data may be used to enhance the AI module's ability to learn from the first type of input data, condition data, so as to better predict the outcome for the second kind of input data, inferred performance improvement data, so as to be better correlate performance activities with performance scores, such as in a positive or negative manner. Specifically, based on historical evidence, the AI module may be configured to learn to predict outcomes based on previously observed data, such as with respect to various of the individual users of the system experiencing the same or similar conditions or affects from having performed the same or similar activities and received the same or similar scores. Differences with respect to the preceding can likewise be analyzed.

More specifically, a performance and/or evaluation platform is presented herein, wherein the platform is configured to correlate images of performances with evaluation data pertaining to those various performances. In such an instance, one or more user profiles may be generated for various of the users of the system, such as various competitors in a performance, and/or evaluators tasked with judging those performances. These user profiles may be generated by subjecting one or more of the users to an interview process designed to elicit answers pertaining to one or more of goals of a performance and/or evaluation, and/or the system may perform one or more searches for online, public content about the actor, which can then be employed by the system in generating a user profile. This data may then be used for a variety of purposes, such as for identifying the performer, e.g., tagging them within an image, and/or for determining bias, and the like.

As indicated, the system may be configured for employing the received data in one or more learning protocols, such as for machine learning. Particularly, the machine learning component of the disclosure is useful in enabling the system to learn to identify images and identities and actions within images, such as with regard to identifying performers, the actions of performers, the scores and evaluations input, all of which can be used to characterize the different actors of the various methods disclosed herein so as to identify one or more trends and/or characteristics thereof. Machine learning takes place by training the system to instantly recognize how an output was achieved based on the type and characteristics of the input received.

The present system is configured for learning from the inputs it receives, e.g., images, scores, and other evaluations, and the results it outputs, so as to learn to draw correlations more rapidly and accurately based on the initial input of data received, the results of which can then be employed by an inference engine of the system so as to make one or more inferences, or predictions based thereon. In implementing the ML protocol of the system, the ML component receives a first set of data wherein the outcome is known, and this data is employed by the system to generate one or more rules by which a result may be obtained, and once obtained compared to the known outcome.

For instance, the ML component may receive scored and evaluated content of known performers, and this material can be used to predict the performances of unknown performers with regard to their actions, and can then be error corrected by receiving known scores for those performances, whereby the predicted score can be compared to the received known scores. Consequently, the system is configured to train itself to better recognize correlations between data points, e.g., actions leading to scores, within the database more accurately, e.g., with less false positives, and more efficiently, and to make predictive outcomes.

In such a manner the machine learning algorithm may learn identities and behaviors, determine accuracy and competence in performance, and may be used by the artificial intelligence module to analyze further sample sets with respect to answering one or more search queries, such as a query requiring the AI module to infer correlations between nodes or datasets and/or the relationships between them. Hence, once the AI machine learns the behavior, the learned behavior may then be applied to a second type of data, such as an inference engine, that is used to answer one or more unknown variables. Particularly, known scores and evaluations associated with known performers engaging in known activities can be used to score and evaluate other performers engaging in the same or similar activities.

The more the machine learns from the first type of input data, the better the inference engine becomes at predicting the outcome for the second kind of input data. Specifically, based on historical evidence, the artificial intelligence module may be configured to learn to predict or otherwise infer outcomes based on previously observed data. With respect to scoring and evaluations, known scores and evaluations of known performers can be used to predict how future evaluators should evaluate activities, such as for determining bias and/or training a user how to score and evaluate, and/or can be used to train the machine itself to learn to perform a scoring and/or evaluation process. In such an instance, the self-reported conditions and effects profiles of subjects with regard to their scoring and evaluations may be assessed along with a description of the actions they took and how they evaluate their performance with regard to those actions taken. Particularly, in order to combine these two, their interrelationships may be determined.

Accordingly, in a first step, a graph database or knowledge graph may be constructed. For example, in this instance, the knowledge graph may be composed of three typical elements, which basically include a subject, a predicate, and an object, these may form nodes, and the relationship between the nodes must be determined. Any particular data point may be selected as a node, and nodes may vary based on the queries being performed.

There are several different types of relationships that can be determined. For instance, relationships may be determined based on their effects, e.g., they are effect based; or they may be determined based on inferences, e.g., relationships that are unknown but determinable, and hence they are inference based. Particularly, each effect and/or relationship may be characterized by different properties or characteristics, which characteristics may be used to generate weights, probabilities, make assumptions, and the like. Such properties may be used to populate the knowledge graph with data points that may form the nodes of the graph. Where a probability determination is to be performed, a very high degree of probability may be within a range from about 95% to about 100%, a high degree of probability may be within a range from about 90% to about 94%, a good degree of probability may be within a range from about 85% to about 89%, a moderate degree of probability may be within a range from about 80% to about 84%, an average degree of probability may be within a range from about 75% to about 79%, a below average degree of probability may be within a range from about 70% to about 74%, a low degree of probability may be within a range from about 65% to about 69%, a very low degree of probability may be within a range from about 60% to about 64%, and an extremely low degree of probability may be within a range from about 50% to about 59%.

More particularly, to better determine causal and/or predictable outcomes the various different relationships may be weighted, such as based on the degree of certainty, number of commonalities, number of instances sharing the node, number of common relationships, and the like, such as with respect to identifying individual's their actions, and the evaluations of those actions, as described herein. In various embodiments, a schema may be formed, such as where the schema is an architecture that is used to give structure to the graph. Hence, the construction and implementation of a dynamic knowledge graph may be at the heart of the wellness analysis platform.

For example, with respect to constructing the knowledge graph, any particular data point may form a node. For instance, on one side of the graph actions to be taken, e.g., performance routines and/or scores entered, may form one set of nodes, and the accuracy of those actions taken may form a second set of nodes. In between these two nodes may be a third node, e.g., a series of third nodes, such as one or more conditions, properties, characteristics, personality traits, all of which may be employed so as to infer and/or build relationships between the two nodes that can be used to determine how the first node is related to second node, e.g., is caused thereby. Accordingly, in between these nodes are the relationships that may be determined.

Specifically, when building the knowledge graph, participant data input into the system, such as from an individual's performance or evaluation of a performance, images related thereto, and uploaded data, e.g., social media and network connections, family history, environment, psychological conditions, etc. that may be encrypted and securely transferred electronically to the system may be used to generate personal profiles therefore. Actions taken by the participants and the results thereof, e.g., effects, can then form a second and/or third node of the graph, such as with respect to an evaluation being made based on the factors of the first node.

Once these two/three nodes have been established one or more further nodes may be input into the system, from the presence of which the relationship(s) between the original nodes may be determined.

For instance, in one example, a first node may be represented by the actions and/or goals of a first person or a population of people, and a second node may be represented by a condition or characteristic and individual has for improvement. In such an instance, one or more third nodes may be input to the system and generated within the graph, such as where the third node may be a score or evaluation of an activity that can be a model used to improve the activity so as to achieve the recited goal and/or the like. A series of relationships may then be determined by analyzing various points of connection between these three items. Likewise, this process may be repeated for multiple individual's having the same or similar goals and/or experiencing the same or similar conditions. Hence, in a manner such as this, the correlation between individuals' performance and the activities and/or scores that affect those goals may be determined.

Accordingly, a step in building a performance analysis graph is to define the anchor nodes, these represent the two bounding elements between which all the various commonalities may be defined and explored. A further step is to define all the possible known correspondences between the two or three anchor nodes, which may be represented in the graph as a further node. These known correspondences may be built around detailing the effects caused by and/or the characteristics of one node or the other. These may form the known and/or observable relationships between the nodes. From these known relationships, a second type of relationship may be explored and/or determined which relationships may be built on inferences. Further, to better determine causal and/or predictable outcomes the various different relationships may be weighted, such as based on the degree of certainty, number of commonalities, number of instances sharing the node, number of common relationships, and the like, such as where there is a correspondence between the performance of one actor with that of another, for instance, where one may be used as a model for the other.

Hence, in various embodiments, the construction and implementation of a dynamic knowledge graph is at the heart of the clinical genomics processing platform. As indicated, the various processing platforms of the global system may be coupled together, so as to seamlessly transfer data between its various components. For instance, as indicated, the receiving and transferring of captured image, scoring, and evaluation, e.g., raw data, to the artificial intelligence module may be performed in a substantially seamless manner, such as via a hyper-interconnect.

Particularly, the AI module may be configured for receiving the input raw data, e.g., captured images, scores and evaluations thereof, and the like, and for taking the raw data and using it to generate one or more nodes, e.g., personalized to the individual participant, within the knowledge graph. Further, as indicated, the AI module may be configured for receiving input data from one or more other sources, such as from an image capturing or scoring device employed at an event, and the like. In various instances, the image and/or evaluation data include data pertaining to the performers, participants, their identities, performances and actions taken, and the like. This data may be used to more fully develop the individualized nodes of the disclosure, and for taking that data and using it to generate one or more nodes and define one more relationships there between within the knowledge graph.

Furthermore, the system may further be configured for retrieving data about one or more participants and/or the actions they take, and/or the images within which they have been captured, which data collected may be used to generate a further set of nodes within the knowledge graph. The system may retrieve pertinent image and evaluation data, such as by direct connection via a network interface, a suitably configured API, an association with one or more social media interfaces, and/or may include a skimmer or search engine that collects data, e.g., online data, that pertains to the various participants, events, actions, and/or images for insertion into and consideration by the knowledge graph.

Additionally, once the knowledge graph architecture has been constructed, it can continually be updated and grown by adding more and more pertinent data, from one or more individual's, into the knowledge structure, building more and more potential nodes and/or relationships. In such an instance, the bounding nodes may be of any combination of nodes, and as such, in certain instances, may be user selectable. For instance, in various embodiments, the system may be configured for being accessible by a third party, such as by the individual themselves, an event and/or system administrator overseeing the administration of the system, a third-party user, and the like. In such an instance, the user may access the AI module, e.g., via a suitably configured user interface, upload pertinent information into the system and/or determine the relevant nodes by which to bound an inquiry, e.g., by clicking on or drag and dropping them via the dashboard interface, and may formulate a relevant question to be answered by the AI module. Accordingly, the user may review and/or select the bounding nodes, and then allow the system to generate an appropriate knowledge map employing the selected nodes, and determine the relationships between the nodes, from which relationships various inquiries may be queried and answered, or at least be inferred, e.g., by the AI system.

For example, in one use model, a user may be a participant in an event, a judge or a coach, or other interested third party, or the like who desires to know how a certain performance and/or evaluation thereof affects one or more results achieved at a later time, such as at a later performance and with respect to one or more conditions that may be promoting and/or preventing the participant reaching their goals. Consequently, the participant or the system itself may collect and upload input data, such as regarding a performance and/or a performer thereof, which may be in the form of one or more captured images or scores or evaluations, a description of the same, and/or the circumstances surrounding the event, performer, and/or performance. With this data the AI module may generate a suitable knowledge graph (and/or add to an already existing knowledge graph), from which knowledge graph the bounding nodes may be selected and various relationships between the nodes may be determined. Further, in various instances, a participant's performance, characteristic, condition, and/or history data, may be correlated within the knowledge graph with the various scores and/or evaluations that may be known or expected to be associated with those factors from which data points within the graph and various respective relationships may be determined, inferences assessed, and predictions made.

Specifically, in various embodiments, an overseeing event and/or system administrator and/or performer or coach may capture, upload, and/or review one or more captured images, or other content, with respect to an individual performance within an event and/or may perform one or more evaluations of the performance, and enter the data into the system so as to build out the performer's and/or evaluator's personal profile within the system, such as with respect to the activities they participate in within the system. This data may then be employed to define one or more goals of the individual and/or delineate one or more conditions that the individual may be experiencing, such as a condition that may be preventing them from reaching their goals, such as where the condition may be an action that if changed can help them advance their goals. From these data one or more nodes within a knowledge graph characterizing that individual may be generated and one or more nodes representing one or more actions to be improved upon may be populated and be evaluated for formulating an individualized plan of improvement to be engaged in by the individual at a predicted or otherwise determined methodology so as to help that individual meet their performance goals.

Particularly, with this data the AI module may generate a suitable knowledge graph (and/or add to an already existing knowledge graph), from which knowledge graph the bounding nodes for the individual, their conditions, goals, and one or more activities to be evaluated and/or improved, may be selected and relationships between them determined. A workflow for an improvement calculation may be worked up, entered into the system, a query may then be run, and a predictive model may be initiated on the data to determine one or more relevant query results that are particular to the individual's personal characteristics, goals, and performance activities with respect to the generated work up.

Accordingly, the present system may be configurable so as to account for the personal characteristics of an individual, both with respect to their personal conditions and their performance goals, as well as with respect to various images that can be used to express their current performance level and the level of performance they should be at, such as to reach those goals. Likewise, the system may include a large database of performance images, condition data, and the characteristics that describe them, which may be known to be beneficial in positively affecting one or more known desirable outcomes. This data may serve as a set of first nodes of a knowledge graph, and may be built from a wide variety of successful performances, which can be aggregated, a composite built, and that composite can be used to compare to a set second nodes related to the performance of a performer in their desire to achieve better results with regard to the actions they take in the implementation of their performance, such as where a third set of nodes may be represented by their improvement goals. The system, therefore, may analyze the performance based characteristics of the performer in relation to the model performance characteristics, and may determine various conditions and/or characteristics that can affect, e.g., improve, one or more conditions that may be predicted to effectuate the desired improvement, based on an analysis performed by the system, such as based on one or more inferences made by the system.

In any of these instances, these characteristic data may be uploaded into the system and may be populated into one or more knowledge graphs of the system, whereby various nodes may be identified and/or correlated from which data correlations and various relationships may be determined, inferences assessed, calculations performed, and predictions made and/or reported. For instance, in such a manner, this data, as well as any other relevant data, along with all properties relevant to a particular query to be analyzed, may be uploaded into the system and be used to form a constellation of nodes, which nodes may be employed to determine various relationships pertinent to the individual, such as by querying the system and allowing it to generate the appropriate connections from which an answer may be inferred. Once populated in a manner such as this, one or more queries may be run against the data so as to isolate various sub-profiles that may then be mined for relevant relationships and/or correlations.

Specifically, these characteristic data may then be employed by the AI module so as to determine one or more correlations and/or to perform one or more calculations with respect thereto. These calculations may be made so as to thereby derive and propose an identity and/or performance profile, e.g., for a performer in an event. In various instances, an analysis may be performed with respect to determining one or more conditions or activities that can be improved on, and may further calculate a proposed model for effectuating that improvement, such as for each activity desired, so as to help the individual achiever their performance goals.

The results of the performer's attempt to improve their performance activities may also be entered into the system and tracked over the course of time. In various embodiments, these results may be used to generate a collective knowledge graph of a plurality of improvement steps from a plurality of individuals, and/or for each individual over a longer period of time. In such an instance, pertinent data may be entered into the system, and any relationships between them may be determined by the AI module. Relationships between two or more characteristics in a subject, or between subjects, may then be determined. For example, in such a manner as this, a subject's earlier conditions and/or characteristics may be correlated with their later performance characteristics. This may be done for a single individual or multiple individuals, e.g., forming a population of individuals.

Particularly, in one use model, a relationship between two properties, e.g., property A: an individual's performance characteristics and conditions, and property B, one or more characteristics and conditions of a model performer engaging in a model performance, may be determined by the system. Specifically, a series of historic data for each property, e.g., of an activity and/or a condition associated therewith, may be entered into the system, e.g., 1,000 readings of each. The machine learning platform of the system may then analyze the readings, and/or determine one or more correlations and/or relationships between the two properties. Any of a number of correlations may be made such that if a given property, e.g., condition A, is entered into the system, the predicted property, e.g., outcome improvement B, may then be output, such as by being inferred, taking the predictive weights between the two into account.

In such an instance, when evaluating the inputs with reference to properties A and B, a relationship between the two may be determined by the artificial intelligence processor. For instance, if given a new input for property A', such as the performance of the performer at a later time, is entered into the system, both performances A and A' can be compared with respect to ideal performance B, and the relationships between all three nodes can be determined and may then be used to predict what the outcome of new performance A" will be, given that these various properties are in fact mathematically related. This machine learned relationship may, therefore, be employed to determine when the various properties of A, A', A", and B are in alignment with one another, e.g., everything is progressing as it should, and, may further be used to determine when things are not functioning in alignment, such as when the predicted outcome is not observed, and thus, is indicative of their being a problematic state in the improvement of performance.

In certain instances the relationship between two or more properties are not linear, but rather may be more complex. For instance, in certain embodiments, the artificial intelligence module may be configured to model more complex processing of relationships in a manner similar to a neural network, such as in a deep learning protocol. Accordingly, although in some instances, the relationships may be configured in a linear array, such as to form a direct linkage between the properties, in other instances, the relationships may be layered one on top of the other so as to form a stacked, e.g., neural, network of information. Hence, in particular instances, the relationships may be formed in a multiplicity of stages and/or levels, where one level of information is connected to the next level of information, such as in a deep learning protocol.

Additionally, the relationships between the various properties from one, or the same, level to another may be strengthened, and therefore given greater weight, or weakened, and consequently given less weight, by the machine learning protocol engaged. Accordingly, as information is processed and allocated across the properties in the different, or same, levels of the system, at each stage, a variety of different points are being given greater and greater, or lesser and lesser, weights, such that when given a particular input, the AI module may more efficiently predict a given outcome more accurately based on the various different levels of weighted historical information. For example, the AI system may be adapted so as to process information in a layered or multi-staged fashion, such as for the purpose of deep learning.

Accordingly, the system may be configured to evaluate data in stages. Specifically, the AI module may be adapted such that as it examines various data, such as when performing a learning protocol, stage by stage, level by level, where each connection between data gets weighted by the system, e.g., based on historical evidence and/or characteristics of relationships. The more stages and/or levels of learning that are initiated within the system the better the weighting between junctions will be, and the deeper the learning.

Further, uploading data in stages allows for a greater convergence of data within the system. Particularly, various feature extraction paradigms may also be employed so as to better organize, weight, and analyze the most salient features of the data to be uploaded. Additionally, in order to better correlate the data, one or more users may input and/or modulate basic weighting functions, while the system itself may employ a more advanced weighting function based on active learning protocols.

Particularly, a deep learning protocol may be employed in training and implementing a search function of the disclosure as discussed herein. More particularly, deep learning is a paradigm where increased levels of datasets are employed in generating an answer to a query. If there is only one stage of learning involved, when answering a query, the network architecture may be configured as a neural network. However, if the determination implements a multi-stage learning process, when deriving an answer to a query, the architecture may be configured as a deep learning network. The more stages there are, where each stage includes a weight, the deeper the learning will be. But, with each stage added, the computing power required to make the data converge becomes greater and greater. Specifically, with each additional data set being processed, another node is generated, which increases the level of future processing power.

With respect to the present disclosure, when running a deep learning protocol, the process may first implement a feature extraction protocol. In the deep learning protocol salient features may be extracted and considered in comparison with similar features stored in a database of previously extracted features. In such an instance, each feature represents a characteristic that may be categorized into one or more classes or labels, which labels may be used to recognize patterns whereby the machine can therefore be trained to recognize the reoccurrence of those patterns in other representations, and thereby draw conclusory predictions based on those recognized patterns.

Accordingly, in order to perform machine learning there may be a library of functions that is generated. This is useful, for instance, where an anchor characterization may be identified, such as of a problematic condition. Subsequent analysis or distribution need not involve analysis or distribution of the entire subsequent characterizations, but rather, only data pertaining to any differences or divergence from the anchor, such as in response to an administered wellness agent. This is termed herein as feature extraction, the preferential analysis of the anchor characterization, or in some instances, only the deltas.

In various instances, methods disclosed herein are directed to using labels, e.g., pointers, to categorize and structure a database, such as for use in the artificial intelligence module to analyze data therein. In such machine learning the data may be first cleaned and prepared for feature extraction, e.g., such as with respect to image capture data and the various characteristics and features included therein. Such data, once extracted may be captured with respect to an individual, a group of individuals, a population, and may be based on one feature, a plurality of features, etc. thereby building a library of features as data is coming into the system. And once the data is in the system must train the machine to build the graph assembly so as to generate potential levels of correspondences. Such correspondence can fall within ranges, for instance, where a substantial amount, e.g., of correspondence or similarity, may be within a range from about 95% to about 100%, a high degree of correspondence may be within a range from about 90% to about 94%, a good degree of correspondence may be within a range from about 85% to about 89%, a moderate degree of correspondence may be within a range from about 80% to about 84%, an average degree of correspondence may be within a range from about 75% to about 79%, a below average degree of correspondence may be within a range from about 70% to about 74%, a low degree of correspondence may be within a range from about 65% to about 69%, a very low degree of correspondence may be within a range from about 60% to about 64%, and an extremely low degree of correspondence may be within a range from about 50% to about 59%.

As indicated, the AI system may be configured for answering a query, such as from a coach, evaluator, and/or a performer seeking to improve their performance, with respect to evaluating and improving performance. Accordingly, when performing a search function by the AI repository or database, the database may be configured as a relational database, wherein the architecture of that database is such that it is structured as a table or tree, or the architecture may be configured such that data is stored therein in a graph form, such as a knowledge graph, as described above. Additionally, when performing a search of the database, the search may be an effect based or an inference based search query.

An effect based search is typically one where the outcome is known and/or expected, whereas in an inference based search, the outcome is not known. Although table based searching is useful, it is based on known relationships that are categorized by tables, which may be searched by using the known key. Such searching is generally effect based searching, where the answer is known, and the relationship with its query simply needs to be identified, e.g., via the use of the key. Inference based searching, on the other hand, is where the relationship between two or more data points is unknown, but to be determined based on the building of a knowledge graph and the learnings of the system with respect to other relationships and the rules of those relationships, allow for new relationships to be discovered and otherwise unknown outcomes to be determined.

As such, it is the generation and implementation of the knowledge graph is a useful feature of the present search function in an inference based learning schema upon which the machine learning and inference engines, as herein described, are primarily built. Hence, as data flows into the database, it is formulated into one or more of these, or another, such structure. The data, e.g., where its relationship to other data is known, may then be employed to train the search function of the system to determine data points and/or relationships between data points where the relationship was not heretofore previously known, that is a key is not required to determine the presence of the relationship.

Specifically, once the known relationships have been determined, through a training process, the newly trained system, and the rules developed, may then be employed to infer other relationships, heretofore unknown, between the data points with a probability establishing the prediction that the inferred relationship is in fact an actual relationship. In such a manner, various performance data of a performer or scorer or evaluator may be entered into the system, as one set of a collection of data points. Likewise a set of characteristics of a variety of performance data of the same or different performers at a different time may also be entered into the system as well.

This data may be employed to build a knowledge graph whereby the various relationships, known and inferred, between these data may be determined, and the differenced and/or similarities flagged for further analyses. This may be done for one or a plurality of subjects, where the relationships and the learnings therefrom may be used to determine known outcomes, such as for training the system, and once suitably trained the system may then employ these learnings in determining heretofore unknown relationships so as to infer outcomes therefrom. Hence, known facts and relationships may be used to train the AI engine, which once trained may determine rules by which unknown relationships may be determined and outcomes based on those relationships may be inferred and/or otherwise determined, such as by a suitably configured inference engine of the system.

More particularly, an individual may be subjected to an interview process whereby one or more data points pertaining to one or more conditions affecting one or more of their performance goals is described and entered into the system. The system may then receive this data, and one or more features may be extracted, and one or more nodes may be formed, which as described above, and may be used to generate a knowledge graph. In various instances, the entered data may be reviewed by a coach or other performance evaluator, for review and/or identification, and/or for verification and authentication purposes, and thus, this data is known, and may therefore be fact-based data. Such data, for instance, may be entered into the system, such as through a graphical user interface presented on a client computer of the system.

In such a manner, one or more conditions pertinent to the individual, e.g., determined based on an analyses performed of one or more images capturing the performance, from one or more performer's, may be entered into the system such as via a remote interface, such as via an image capturing device that is coupled to an associated client computer. The condition data may be any data of significance to the individual affecting their performance goals, such as health data, condition data, environmental data, psychological data, social network data, and the like. Likewise, as discussed herein above, such condition data may also be uploaded into the system, such as annotated coaching data, and may then be correlated with one or more performance indicators determined to be relevant to one or more of the conditions, such as via the AI module of the system. In various instances, the system may be configured such that this data may be uploaded into the system automatically, from one or more sources.

Accordingly, the AI system server, e.g., the machine learning and inference engine implementations, may be positioned remotely from the location from where the performance data is uploaded into the system, but may be accessed locally or remotely as described herein. This data serves many purposes, one such purpose being the training of the AI module, and/or its use in one or more predictive models. In such training, known relationships and outcomes can be treated as if they are unknown, and consequently the machine may be made to determine the relationships and predict the outcomes anew, which training may continue until the system has learned to predict the right outcome.

Particularly, this training, e.g., two class-model training may be used for a sub-portion of the data, e.g., 50%, the training portion, and the other data may be used to test the learnings from the training portion to predict the known outcomes, with respect to the other 50% of the data. Hence, the first portion of the data may be employed to develop a training model, and the second portion of the data may be used to test the training models to enhance the accuracy of a predictive model. Once sufficiently trained may be employed to make other inferences and thereby predict other outcomes.

For example, once trained, the inference engine may be employed to search the database in response to a user enter query and based on the known and/or inferred relationship between the various data of the system an answer to that query may be inferred and an outcome predicted, e.g., a given request may be input into the system, and an answer may then be generated by the system based on the relationships between the data. One, two, three, or more inputs may be entered into the system, in addition to a query, and an output may be determined and returned by the system. For instance, a participant's, e.g., performer's or scorer's, performance profile may be correlated with their historical performance data and/or their future performance goals, and be uploaded into a database of potentially correlated data from other participants. The system may then perform a comparison between the performance data of one or more other performers, such as for use in training and/or the development of predictive models. Specifically, as indicted above, the data entered into the system may be used to train the system, and once trained the system may be employed to make one or more correlations or predictions, therewith, such as in response to a query.

Figure 14:
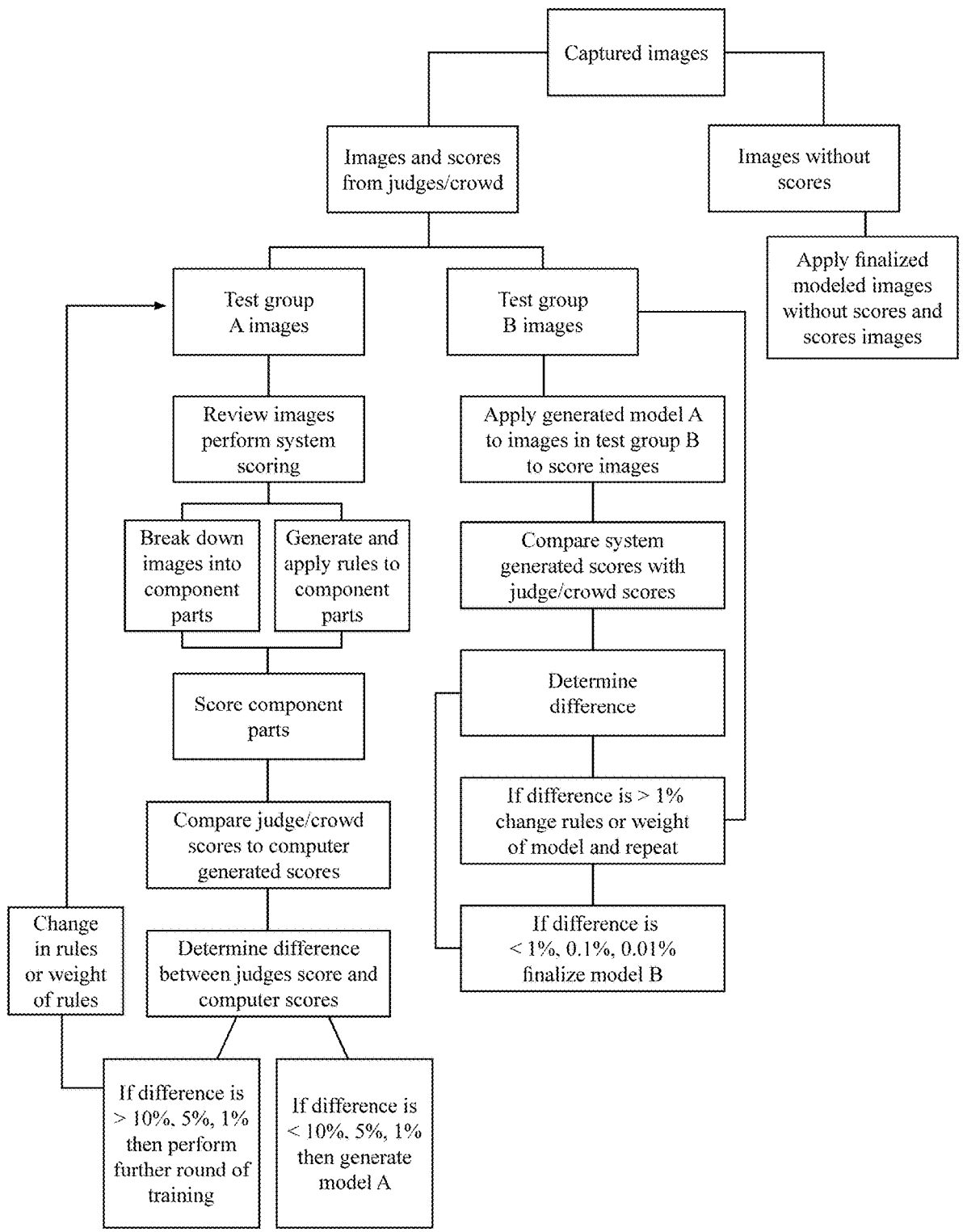
FIG. 14 presents a representation of an application of evaluating a scoring routine in accordance with the methods of the disclosure.

Particularly, as can be seen with respect to FIG. 14, in one embodiment, the system may be configured for performing a machine learning process on received evaluations and/or comments, in this instance scoring, so as to determine if one or more entered scores fall outside of a predicted range, and/or to implement a system generated scoring regime. For instance, at a first step, a series of captured images may be collected and may be split between images containing performances that have been scored and images containing performances that have not been scored. Of the set of scored images, this set may be divided into a first and a second test group.

In such an instance, the system can use a first, untrained model to generate a first set of scores for the images in the first lot. Specifically, the images may be broken down into component parts, and the rules by which to evaluate those component parts may be generated and applied so as to score those component parts as well as scoring the images over all. This machine generated score may then be compared to the score received by one or more of a judge, a crowd, or other evaluator. Where the difference between the score outcomes is great, such as greater than 40%, greater than 30%, greater than 20%, greater than 15%, greater than 10%, greater than 5%, greater than 1%, dependent on how the system is configured, then one or more changes to one or more of the rules and how the rules are to be weighted and applied may be changed and the process may be repeated.

However, where the difference is lower than 20%, lower than 15%, lower than 10%, lower than 5%, lower than 1%, dependent on how the system is configured, then a model may be generated based on the system configuration, whereby the model may be applied to the captured images in the second test lot. In such an instance, the model A may be applied to the images in the second test group so as to score those images and/or their component parts. These machine generated scores may be compared with the judge, crowd, and/or other evaluator scores, and a difference may be determined. If the difference is greater than 1%, greater than 0.01%, greater than 0.001%, greater than 0.0001%, greater than 0.00001%, then the model may be changed, such as by changing one or more rules and/or weightings associated therewith, and the model can be reapplied. However, where the difference is lower than 1%, lower than 0.01%, lower than 0.001%, lower than 0.0001%, lower than 0.00001%, then the finalized model B may be applied for use in a variety of different analyses, such as for determining when a predicted score by one or more judges is outside of a determined range, thus, indicating the potential for bias, or as in this instance, to generate one or more system produced scores for received content.

Accordingly, in various instances, the system may include an inference engine, such as configured as a neural network, that is adapted for receiving a plurality of inputs, performing an analysis of the data, and generate one or more correlations between the various data points. In particular instances, the system is configured for allowing the inference engine to be accessed remotely, such as via a cloud based interface accessed through a client computer, such as a HUD or other client computing device of the system. Once accessed, information pertaining to a particular subject may be uploaded onto the system, or if already uploaded may be accessed, such as by a generated identifier key.

For instance, once uploaded, the system may feed the subject's data into a knowledge graph of the system with respect to a given population of interest. Specifically, the system may receive the subject's data, and based on an initial analysis of the data may tag and store the data in relation to one or more populations to which the data may be fit. Such groupings may be made based on a number of characteristics, including performer condition data, such as age, weight, gender, medical conditions, prescribed medicines or treatments, social network data, demographics (national origin, ethnic/religious background, sexual orientation, etc.) and the like.

This data may be uploaded into the system, and may serve as nodes for generating part of a knowledge graph pertaining to a first performer, in relation to others in the defined population of interest, where each node may be defined by a number of properties. Once the pertinent group has been defined with respect to evaluating a performance of an individual vis a vis another individual, or the same individual at a different time(s), and the relevant properties characterized within the knowledge graph, the inference engine may then be employed so as to determine both known and inferred correlations between the various data points and/or their characteristics. Such inferences may be performed automatically, or in response to an entered query.

Particularly, in one use model, a coach may access the inference engine via a graphical user interface of a computer at his office, he may then select content to be viewed and annotated, which annotations along with the performer performance and condition information may be uploaded into the system as well. This information may be encrypted and transmitted to a central repository, e.g., server system, which may receive the encoded data, de-encrypt it, and use the data to build a knowledge graph, by pulling up data from other subject's that have correspondingly related characteristics, performances, and conditions so as to generate the nodes of the graph.

The coach or other evaluator may then enter a query by which to initiate a search of the data base, and the inference engine in response to the query can then define the relationships between relevant nodes, and form those known relationships either return an answer, or generate, e.g., infer, further heretofore unknown relationships by which an answer may be determined and returned to the coach along with a predictive quality score, e.g., a score indicating areas by which a performer performed well and other instances showing how the performance may be improved. Based on the confidence score and/or other pertinent factors the rules that the inference engine uses to define the various relationships between particular nodes in the knowledge graph may be adjusted to be stricter or more lenient as to what data points and which relationships will be considered as valid when making a given predictive model, e.g., which nodes may be considered as objects, which may be considered as subjects and predicates, and which may be correlated as objects.

Consequently, once the various relationships have been defined and weighted, a predictive query, such as in the form of an "If"/"Then" statement may be made, such as where the physician enters a query into the system, and the inference engine determines the "then" portion of the statement by employing a predictive model to generate a resultant outcome, such as based on a probability outlook. Hence, the coach may enter their subject's conditions and/or present characteristics along with their performance goals, and a proposed improvement plan, and the inference engine may then use that data to build a knowledge graph whereby the system may then return a proposed outlook for the subject with relation to them improving their performance by implementing the improvement plan, and/or may suggest alternative or supplemental methodologies to be engaged in that may be useful to implement in substitution or in addition to the originally proposed activities of the improvement plan. Particularly, the present system in this manner will be useful in determining bias in scoring, evaluation and improvement of performance, identification of performers, as well as predictability of performance events for one or more participants in an event, such as by taking into account one or more of their prior performances and comparing it with historical performances of themselves and/or others.

In various instances, certain aspects of the artificial intelligence module may be accelerated, such as by being implemented in hardware, such as by a suitably configured integrated circuit, such as by an FPGA, ASIC, Structured ASIC, and the like. For instance, in certain embodiments, the AI system may be configured to model a neural network, including a deep learning neural network, which may be formed of layers and layers or processing engines, where the more layers provided the deeper the learning configuration, and where each processing engine is trained in accordance with the methods disclosed herein to perform predictive analyses, which based on the number of layers may allow for exponential analyses to be performed.

One or more aspects or features of the subject matter described herein may be realized in digital electronic circuitry, integrated circuitry, specially designed ASICs (application specific integrated circuits), FPGAs (field programmable gated array), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, hardware, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT), or a liquid crystal display (LCD), or light emitting diode (LED) or (OLED) monitor for displaying information to the user and a keyboard and a pointing device, such as for example a mouse or a trackball, by which the user may provide input to the computer. In various instances, the display screen may be a capacitive sensing interactive touch-screen display. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), WIFI, and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

The methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Although a few embodiments have been described in detail above, other modifications are possible. Other embodiments may be within the scope of the following claims.

The invention claimed is:

1. A computing system for evaluating a performance of an activity, the system comprising:
    a repository storing one or more videos of the activity, each of the one or more videos being tagged with one or more activity-related identifiers;
    a server having a network internet connection to communicate with an electronic display device that generates an interactive graphical user interface, the server being coupled to the repository via the network internet connection, the server comprising:
        a library builder that presents a search menu associated with the one or more activity-related identifiers, and in response to a search query, accesses the repository, identifies a selection of the one or more videos related to the search query, and generates a structured library containing a representation of the selection of the one or more videos in a library panel of the interactive graphical user interface of the electronic display device, each of the selection of the one or more videos being selectable from the structured library by a selection input received by the interactive graphical user interface;
        a presentation module that generates one or more interactive presentation panels in the interactive graphical user interface, and retrieves a selected video from the structured library for presentation in one of the one or more interactive presentation panels;
        a tool module that provides one or more graphical tools in a tool panel in the interactive graphical user interface, each of the graphical tools being configured to receive an input for controlling the presentation of the selected video, at least one of the one or more graphical tools for annotating the selected video being presented in the one of the one or more interactive presentation panels; and
        a compiler that receives annotations to the selected video to generate an annotated video for storage in the repository in accordance with the one or more activity-related identifiers.

2. The computing system in accordance with claim 1, wherein the server is configured for analyzing the one or more videos and producing the one or more identifier tags, wherein the one or more identifier tags includes one or more of a participant of the activity, a date of the activity, a time of the activity, and a category of the activity.

3. The computing system in accordance with claim 2, wherein the one or more graphical tools includes a writing instrument, a highlight instrument, and an icon instrument, where each graphical tool is configured to apply a graphical indicator on the presented one or more videos.

4. The computing system in accordance with claim 3, wherein the graphical indicator is adapted for annotating the presented one or more videos.

5. The computing system in accordance with claim 4, wherein the tools module further includes a scoring panel for attributing a score to each of the one or more videos.

6. The computing system in accordance with claim 5, wherein a first and a second video may be selected for viewing at the one or more interactive presentation panels.

7. The computing system in accordance with claim 6, wherein when a first and second video has been selected for viewing at a single interactive presentation panel, the one or more graphical tools includes a tool to merge each of the videos into a common presentation screen such that the first video is overlaid with the second video.

8. The computing system in accordance with claim 7, wherein the interactive presentation panel includes two separate controllers, wherein a first controller is configured for controlling the first video individually and separately from a second controller that is configured for controlling the second video.

9. The computing system in accordance with claim 8, wherein the server is configured for dividing a presentation of each video into a segment of sequences, and the scoring panel is configured for scoring each sequence of each video on a segment by segment basis.

10. The computing system in accordance with claim 9, wherein the server is configured for determining a percentage of correspondence between each sequence of each segment of each video one with another, and comparing respective scoring between each segment.

11. A crowd-source communication platform comprising:
    a server computer for receiving, storing and serving digital image content via a network, the server computer tagging the digital image content with one or more of an event identifier, a participant identifier, and a viewer identifier to produce a structured library of digital image content;
    one or more client computing devices configured for communicating with the server computer via the network and for receiving selected portions of the digital image content from the structured library, the selected portions being requested by each client computing device based at least on a user selection of one or more of the event identifier, the participant identifier, and the viewer identifier, each of the one or more client computing devices having a display, a client application, and a graphical user interface for respectively rendering and displaying the received selected portions of the digital image content at an interactive presentation panel presented at the interactive graphical user interface, the client application providing one or more tools to control the displaying of the selected portions of the digital image content, and one or more tools to receive user feedback related to the displayed selected portions of the digital image content in the form of user interactions provided via a window in the interactive graphical user interface of each respective client computing device, the user interactions including annotations to the selected portions of the digital image content, the client application of each of the one or more client computing devices further configured to communicate the user interactions and annotations to the server computer via the network.

12. The crowd-source communication platform in accordance with claim 11, comprising a plurality of client computing devices coupled to the server computer via the network, whereby the client application of each client computing device is configured for displaying the selected portions of digital image content in a manner such that the selected portions of the digital image content are the same.

13. The crowd-source communication platform in accordance with claim 12, wherein the client application of each computing device is configured such that annotations made at a selected portion of the digital image content displayed at one client computing device appears at a corresponding selected portion of the digital image content displayed at the other client computing device substantially simultaneously.

14. The crowd-source communication platform in accordance with claim 13, wherein the annotations comprise one or more of a text message presented at a text box or a written graphic configured for being associated and displayed with the selected portion of the digital image content being displayed.

15. The crowd-source communication platform in accordance with claim 14, wherein the one or more tools may include a record button for recording an audio or video message that may be associated and played with the selected portion of the digital image content being displayed.

16. A computing system for evaluating a performance of an activity being performed by one or more performer participating in an event, the system comprising:
a computing device connected with an electronic display configured to provide an interactive graphical user interface;
one or more presentation screens generated by the interactive graphical user interface, each of the one or more presentation screens for presenting one or more videos of the performance of the activity, the one or more videos being selected by a user of the electronic display from a selection of videos collected from one or more video collection systems in communication with the electronic display and formatted for display in the interactive graphical user interface, the selection of videos being represented in a video selection region of the interactive graphical user interface for individual selection by the user for interactive presentation in one of the one or more presentation screens, the selection of videos being tagged by the computing device with one or more identifier tags;
one or more graphical tools generated by the interactive graphical user interface, each of the one or more graphical tools being configured to receive an input from the user for annotating the one or more videos of the performance of the activity interactively presented by the one of the one or more presentation screens generated by the interactive graphical user interface, at least one of the one or more graphical tools being configured to generate an annotated video based on the input from the user; and
a repository in communication with the computing device for storing the annotated video corresponding with the one or more identifier tags for distribution from the computing device based on user selection of at least one of the one or more identifier tags.

17. The computing system in accordance with claim 16, wherein a first and a second video may be selected for viewing at the one or more presentation screens.

18. The computing system in accordance with claim 17, wherein when a first and second video has been selected for viewing at a single presentation screens, the one or more graphical tools includes a tool to merge each of the videos into a common presentation screen such that the first video is overlaid with the second video.

19. The computing system in accordance with claim 18, wherein the computing device is configured for comparing the first video to the second video and determining a percentage of correspondence between them.

20. The computing system in accordance with claim 19, wherein the computing device is configured for identifying one or more areas of improvement of the performance being performed by the performer.

21. The computing system in accordance with claim 20, wherein the performance includes one or more scores, and the computing device is configured for corresponding an improvement in at least one of the one or more areas of improvement of the performance with an improvement with the one or more scores.

22. The computing system in accordance with claim 21, wherein the system identifies one or more routines that if implemented in the performance will likely lead to an improvement in the one or more scores and autonomously presents to the presentation screen of the graphical user interface a suggestion that the one or more routines be implemented in a subsequent performance.

23. A method of evaluating a performance of an activity being performed by a performer in an event, the method being executed by a server having a network internet connection to communicate with an electronic display device that generates an interactive graphical user interface, the method comprising:
storing one or more videos of the activity in a repository, each of the one or more videos being tagged by the server with one or more activity-related identifiers;
presenting a search menu associated with the one or more activity-related identifiers;
identifying, in response to a search query, a selection of the one or more videos related to the search query;
generating a structured library containing a representation of the selection of the one or more videos in a library panel of the interactive graphical user interface of the electronic display device, each of the selection of the one or more videos being selectable from the structured library by a selection input received by the interactive graphical user interface;
generating one or more interactive presentation panels in the interactive graphical user interface;
retrieving a selected video from the structured library for presentation in one of the one or more interactive presentation panels;
providing one or more graphical tools in a tool panel in the interactive graphical user interface, each of the graphical tools being configured to receive an input for controlling the presentation of the selected video, at least one of the one or more graphical tools for annotating the selected video being presented in the one of the one or more interactive presentation panels; and
receiving annotations to the selected video to generate an annotated video for storage in the repository in accordance with the one or more activity-related identifiers.

24. The method in accordance with claim 23, wherein the method further comprises presenting a scoring panel at the interactive graphical user interface, the coring panel for entering one or more scores for evaluating one or more aspects of the performance of the performer in the event.

25. The method in accordance with claim 24, wherein the method further comprises receiving a score entered at the scoring panel at the interactive graphical user interface, the score representing an evaluation of at least one of the one or more aspects of the performance.

26. The method in accordance with claim 25, wherein the method further comprises presenting a first and a second video in one of the one or more interactive presentation panels in response to a user's selection of the first and second video from the structured library.

27. The method in accordance with claim 26, wherein the method further comprises presenting the first and a second video in a single interactive presentation panel.

28. The method in accordance with claim 27, wherein the method further comprises overlaying the first video with the second video during presentation at the interactive presentation panel.

29. The method in accordance with claim 26, wherein the method further comprises generating a first and a second presentation panel for presentation of the first and second videos respectively.

30. The method in accordance with claim 29, wherein the first and second presentation panels are generated at a graphical user interface of a first and second computing device, and the method further comprises presenting the first and a second videos substantially simultaneously for presentation at respective presentation panels.

* * * * *